US012782944B2

(12) United States Patent
Burdick

(10) Patent No.: US 12,782,944 B2

(45) Date of Patent: Nov. 3, 2026

(54) ADAPTIVE ANTI-LASER SYSTEM

(71) Applicant: James Ahlemeier, Naples, FL (US)

(72) Inventor: Jonathan Ralph Burdick, St. Louis, MO (US)

(73) Assignee: James Ahlemeier, Fort Myers, FL (US)

( * ) Notice: Subject to any disclaimer, the term of this patent is extended or adjusted under 35 U.S.C. 154(b) by 30 days.

(21) Appl. No.: 19/082,073

(22) Filed: Mar. 17, 2025

(65) Prior Publication Data

US 2025/0306610 A1 Oct. 2, 2025

Related U.S. Application Data

(63) Continuation of application No. 18/385,334, filed on Oct. 30, 2023, now Pat. No. 12,253,862, which is a (Continued)

(51) Int. Cl.

| | |
|---|---|
| ***G05D 1/00*** | (2024.01) |
| ***B64C 27/68*** | (2006.01) |
| ***B64U 10/13*** | (2023.01) |
| ***B64U 30/24*** | (2023.01) |
| ***F41H 13/00*** | (2006.01) |
| ***G05D 1/617*** | (2024.01) |

(Continued)

(52) U.S. Cl.

CPC ............ *G05D 1/104* (2013.01); *B64C 27/68* (2013.01); *B64U 10/13* (2023.01); *B64U 30/24* (2023.01); *F41H 13/0087* (2013.01); *G05D 1/106* (2019.05); *G05D 1/1064* (2019.05); *G05D 1/617* (2024.01); *G05D 1/695* (2024.01); *G08G 5/34* (2025.01); *G08G 5/80* (2025.01); *B64U 50/19* (2023.01); *B64U 2101/00* (2023.01); *B64U 2201/102* (2023.01)

(58) Field of Classification Search

CPC ........ G05D 1/104; B64C 27/68; B64D 27/24; B64U 10/13

See application file for complete search history.

(56) References Cited

U.S. PATENT DOCUMENTS

| | | | | |
|---|---|---|---|---|
| 9,599,994 | B1 * | 3/2017 | Bogdanowicz ........ | G05D 1/104 |
| 10,690,543 | B1 * | 6/2020 | Wo ......................... | G03B 21/60 |

(Continued)

*Primary Examiner* — Redhwan K Mawari

(74) *Attorney, Agent, or Firm* — Burdick Patents, P.A.; Sean Burdick

(57) ABSTRACT

A method for protection of inflight aircraft during approaching-to-landing and takeoff/climbout phases of flight against handheld laser attacks includes two different drone types: a skeining drone and a swarming drone. One or more skeining drones are deployed close to the aircraft and/or one or more swarming drones are deployed further from the aircraft and closer to the beam source. Prior to the aircraft's traversal of a determinable approach point, a plurality of swarming drones are pre-deployed in loitering mode or else launched, and are subsequently directed toward the reckoned source of a trained beam while skeining drones are pre-deployed in a patrol mode or else launched, and fly closer to the aircraft. The skein classically shields the cockpit by flying a controlled interference pattern roughly parallel to the aircraft flightpath while the swarm saturates one or more determined and dynamically redetermined regions athwart the beam source location.

11 Claims, 26 Drawing Sheets

100

Related U.S. Application Data continuation of application No. 17/326,288, filed on May 20, 2021, now Pat. No. 11,815,914.

(60) Provisional application No. 63/027,865, filed on May 20, 2020.

(51) Int. Cl.

| | |
|---|---|
| ***G05D 1/695*** | (2024.01) |
| ***G08G 5/34*** | (2025.01) |
| ***G08G 5/80*** | (2025.01) |
| *B64U 50/19* | (2023.01) |
| *B64U 101/00* | (2023.01) |

(56) References Cited

U.S. PATENT DOCUMENTS

| | | | | |
|---|---|---|---|---|
| 10,902,732 | B2 * | 1/2021 | Srinivasan | G08G 5/21 |
| 11,531,357 | B1 * | 12/2022 | Nielsen | G01C 21/00 |
| 2004/0030448 | A1 * | 2/2004 | Solomon | F41H 13/00 701/24 |
| 2004/0068351 | A1 * | 4/2004 | Solomon | F41H 13/00 701/302 |
| 2004/0068416 | A1 * | 4/2004 | Solomon | F41H 13/00 446/454 |
| 2008/0190274 | A1 * | 8/2008 | Kirkpatrick | F41J 2/02 342/13 |
| 2014/0192367 | A1 * | 7/2014 | Jungwirth | G01J 3/50 356/402 |
| 2015/0226575 | A1 * | 8/2015 | Rambo | B64U 10/80 701/523 |
| 2016/0173338 | A1 * | 6/2016 | Wolting | H04L 41/122 709/223 |
| 2016/0210863 | A1 * | 7/2016 | Kohn-Rich | G01C 21/20 |
| 2016/0378109 | A1 * | 12/2016 | Raffa | G05D 1/0027 701/2 |
| 2018/0186464 | A1 * | 7/2018 | Woodworth | B64U 10/20 |
| 2018/0341262 | A1 * | 11/2018 | Yeshurun | F41H 11/00 |
| 2019/0026796 | A1 * | 1/2019 | Dinis da Silva de Carvalho | G06Q 30/04 |
| 2019/0031347 | A1 * | 1/2019 | Duan | B64D 39/06 |
| 2019/0118944 | A1 * | 4/2019 | Kimchi | B64C 15/12 |
| 2019/0196476 | A1 * | 6/2019 | Matsuda | B64U 10/13 |
| 2020/0035108 | A1 * | 1/2020 | Zelenka | B64D 45/00 |
| 2021/0356279 | A1 * | 11/2021 | Szigeti | G01C 21/3407 |

* cited by examiner

400

| | S | I | P | O | C |
|---|---|---|---|---|---|
| 401 | local sensors (e.g. Sk, Sw, recon UAV, or land-based) | local sensor data | detect beam, off-axis (local) | coordinates (GPS or other) | CCCL-B |
| 402 | remote sensors (e.g. SAT, recon airplane) | remote sensor data | detect beam, off-axis (remote) | coordinates (GPS or other) | CCCL-B |
| 403 | local sensors | local sensor data | detect beam, on-axis (local) | coordinates (GPS or other) | CCCL-A |
| 404 | remote sensors | remote sensor data | detect beam, on-axis (remote) | coordinates (GPS or other) | CCCL-A |
| 405 | local sensors | local sensor data | detect and track ground lateral motion, if any, of beam source | coordinates (GPS or other) | CCCL |
| 406 | CCCL | all sensor data | calculate beam source location, DFPs, and MFPs | CCCL commands to maintain or change course | DGCL |
| 407 | DGCL | command instructions | receive CCCL commands, convert them to UAV servomotor commands | servomotor commands for course correction, based on DFP waypoints | Sk-LEAD, Sw-LEAD |
| 408 | local anemometer(s) | changes in velocity of prevailing winds and/or crosswind(s) | real-time monitoring of prevailing winds and crosswinds | numerical values for wind speeds and directions | CCCL |
| 409 | local barometer(s) | ambient air pressure changes | real-time monitoring of air pressure | numerical values | CCCL |
| 410 | local thermometer(s) | ambient temperature changes | real-time monitoring of air temperature | numerical values | CCCL |
| 411 | local hygrometer(s) | ambient humidity changes | real-time monitoring of air humidity | numerical values | CCCL |

FIG. 4

500

| | Operating Mode | Description | Events | Notes |
|---|---|---|---|---|
| 501 | Ready Mode | One or more Sk-WINGs and/or one or more Sw-WINGs are positioned for launch. | ACKs and diagnostics signals | Periodic communication (ACKs, PINGs, etc.) between ready-to-launch WINGs and CCCL, to real-time monitor system readiness. |
| 502 | Normal Uneventful Patrol ("NUP") | No events of interest occur. Treated as default mode. If system is launched in NUP and event of interest occurs, system mode toggles to NEP or SEP as appropriate. | (no beam detected, zero wind speed, no malfunctions) | If NUP occurs as actual case, no events are logged. Unexpected data is logged. Used e.g. to move WINGs between launch pads. |
| 503 | Normal Eventful Patrol ("NEP") | Events of interest occur, but no attack determination made. If a suspect beam is detected, mode toggles to SEP. Example: a drone malfunctions and departs formation. | no beam detected; wind speed or other events occur | Unexpected events are logged, and expected data are logged for observed events (e.g. go-rounds, crosswind gusts) as appropriate. |
| 504 | System Engaged Patrol ("SEP") | System engaged subsequent to an attack determination. System can be launched in SEP, or it is placed into SEP mode after attack determination while in NUP or NEP. | beam detected (on-axis, off-axis, or both); other events may occur | Unexpected events are logged, and both expected and unexpected data are logged for such events as appropriate. |
| 505 | Maintenance Mode | Offline mode. Testing/diagnostics, general maintenance. This mode is used to install system patches and upgrades. | N/A | Troubleshooting, repairs, system upgrades, modifications. |
| 506 | Simulation Mode | Used for initial setup and configuration (creation of DFP templates). Templates can be modified from supplied default templates. Also for experimental use. | N/A | Used to customize system for specific airfields, and to build AI datasets for specific airfield areas prior to deployment. |

FIG. 5

1700

| | S | I | P | O | C |
|---|---|---|---|---|---|
| 1701 | CCCL | weather sensors data, aircraft flight data, beam data, Sk-WING flight data | maintains time-controlled Sk-WING flight path | time-controlled flight path | subject aircraft |
| 1702 | CCCL GPS data conversion module | beam source location converted to GPS coordinates, and/or (x,y,z) coordinates relative to e.g. PLOT POINT ZERO | communicate converted beam detection data | GPS data or other location data e.g. (x,y,z) coordinates required to derive DFPs and MFPs | DGCL |
| 1703 | DGCL | beam source location data, beam lateral movement data, flight path data, timing | issue flight commands for DFPs and MFPs | waypoint data, flight commands, clock synchronization data | Sk-WING |
| 1704 | system administrator | triggerable condition based on beam detection | launch Sk-WING | LAUNCH command | Sk-WING |
| 1705 | CCCL or Sk-O(s) or system administrator | triggerable conditions based on time-of-flight restrictions or mechanical malfunctions | end mission (or scrub mission) | RETURN TO BASE command or RETURN TO PATROL command | Sk-WING |
| 1706 | Sk-O(s) or system administrator | triggerable conditions based on geofencing restrictions or collision avoidance or time-of-flight restrictions or mechanical malfunctions | immediately terminate flight | DITCH command | Sk-WING |

FIG. 17

1800

| | S | I | P | O | C |
|---|---|---|---|---|---|
| 1801 | CCCL | weather sensors data, aircraft flight data, beam data, Sw-WING flight data | maintains event-controlled Sw-WING flight path | event-controlled flight path | subject aircraft |
| 1802 | CCCL GPS data conversion module | beam source location converted to GPS coordinates, and/or (x,y,z) coordinates relative to e.g. a designated patrol point | communicate converted beam detection data | GPS data or other location data e.g. (x,y,z) coordinates required to derive optimal hovering station | DGCL |
| 1803 | DGCL | beam source location data, beam lateral movement data, flight path data, timing | issue flight commands for intercept course | waypoint data, flight commands, clock synchronization data | Sw-WING |
| 1804 | system administrator | triggerable condition based on beam detection | launch Sw-WING | LAUNCH command | Sw-WING |
| 1805 | CCCL or Sw-O(s) or system administrator | triggerable conditions based on time-of-flight restrictions or mechanical malfunctions | end mission (or scrub mission) | RETURN TO BASE command or RETURN TO PATROL command | Sw-WING |
| 1806 | Sw-O(s) or system administrator | triggerable conditions based on geofencing restrictions or collision avoidance or time-of-flight restrictions or mechanical malfunctions | immediately terminate flight | DITCH command | Sw-WING |

FIG. 18

ADAPTIVE ANTI-LASER SYSTEM

RELATED APPLICATIONS

This application is a continuation and claims priority to U.S. application Ser. No. 18/385,334, filed Oct. 30, 2023, now U.S. Pat. No. 12,253,862, which is a continuation and claims priority to U.S. application Ser. No. 17/326,288 filed May 20, 2021, now U.S. Pat. No. 11,815,914, which claims priority to U.S. Provisional Application 63/027,865 that was filed on May 20, 2020, all of which are fully incorporated herein by reference.

BACKGROUND OF THE INVENTION

Field of the Invention

The present invention relates generally to airborne communications and countermeasures for protecting airborne platforms. Methods are provided.

Description of the Related Art

A problem associated with handheld lasers occurs when in-flight aircraft pilots are subjected to attack by operators of such lasers. Such attacks were first documented by military observers during the Bosnian Conflict in the 1990s. Laser attacks against aircraft during critical phases of flight, particularly takeoff and landing, place flight personnel, passengers, cargo, and aircraft at risk as well as undermine public confidence in general aviation. The spectrum of direct threat ranges from annoying (pilots distracted briefly) to significant (e.g. pilot disoriented, pilot eye injury) to disastrous (significant human injuries, loss of life, destruction of hazardous cargo, loss of plane, and similar damage to ground personnel and ground facilities).

Recently there has been a reported increase in the proliferation of small, handheld portable lasers and a proliferation of such laser attacks. The scope of the problem has continued to worsen, with an increasing number of reported attacks and increasing power of handheld laser devices.

Shielding pilots with special cockpit visors can ameliorate the problem and is attractive from a cost standpoint, however this technique may not sufficiently reduce the likelihood of harm. Other proposed solutions include adoption of instrument landing systems such as EVS (Enhanced Vision Systems) which provide a closed-circuit camera vision system for use by pilots during the landing phase of aircraft operation. EVS systems however represent a relatively new technology. EVS is expensive to deploy and maintain and cannot be readily used with many types of aircraft such as smaller planes and older planes with many hours of service remaining. Moreover, EVS is a complex system with numerous error conditions possible, and EVS systems are themselves also somewhat vulnerable to laser attacks. Wholly automatic landing systems which completely remove positive control of the aircraft from the pilot might solve or ameliorate the problem, but such systems suffer from myriad cost and complexity problems similar to those faced by EVS; and aircraft owners and pilots are, quite understandably, reluctant to relinquish control of their aircraft. Because of the cost, reliability, and other concerns such automatic systems are not widely used and are not expected to see widespread use in the foreseeable future. More recently, special goggles and canopies have been developed which demonstrate potential for eliminating or reducing the problem, however pilots have failed to enthusiastically adopt such technology because it presents significant distractions to flying despite having promise. The present invention protects a wide variety of aircraft including conventionally piloted airplanes, EVS-equipped planes, autonomous/semi-autonomous drones, helicopters, and other types of aircraft.

One way to deploy a beam-blocking object is to dispose a movable visor upon the aircraft cockpit windshield, which visor could be activated upon approaches to landing. However, such movable visor systems would be ineffective for blocking certain beams (particularly beams aimed from forward of the aircraft and beams exhibiting lateral motion of the beam source location) as well as blocking simultaneous attacks from multiple beam source locations. Moreover, such movable visor systems would present significant distractions to pilots during busy phases of flight such as takeoffs, approaches and landings. Such enhanced visor systems are not standard or optional equipment on most aircraft; are susceptible to electro-mechanical malfunction, typically have no backup systems, usually require cockpit personnel to operate, and the retrofitting of existing aircraft with enhanced visor systems would be largely cost prohibitive particularly when aircraft owners and pilots consider (possibly incorrectly) the likelihood that their particular aircraft will face a lazing attack. In theory, an enhanced visor system could extend a visor out beyond the windshield which may or may not result in less pilot distraction, but such a system would be costly to deploy across a broad spectrum of aircraft, would still be susceptible to mechanical failure, would require pilot actions during the sensitive phases of takeoff, approach-to-landing, and landing, and could likely result in potential hazards to navigation.

Because of the inherent dangers presented by handheld laser attacks against aircraft, and given the limitations associated with existing countermeasures such as visors, EVS, and special canopies and goggles, it would be advantageous to provide methods for blocking handheld laser beams that are being aimed at aircraft being piloted in either takeoff/climb out or approaching/landing phases of flight, which methods do not suffer from various aforementioned and other shortcomings of the prior art. What is needed is a cost-effective system which implements methods operable on behalf of many different types of aircraft, aircraft owners, pilots, passengers and cargo, to defeat handheld (and similarly sized) lasers being aimed at in-flight aircraft pilots and/or at aircraft EVS lensing. A system of this type is preferably modular, uses existing COTS components wherever possible, is scalable for use at many different types of airfield areas, and is readily adaptable e.g. for use in temporary (ad hoc) military airspaces or given other special requirements.

SUMMARY OF THE INVENTION

When a handheld laser beam is intentionally trained upon the cockpit of an in-flight aircraft it would be very advantageous to block the beam before it can reach aircraft cockpit personnel, thereby eliminating or significantly reducing the risk of the beam's adversely affecting safe piloting of the aircraft. Toward this end, it is determinable that a zeroth discrete point To exists in time, prior to which time $T_0$ no adversarial laser beam is trained upon an approaching/landing or taking-off/climbing aircraft (hereinafter "subject aircraft" at times simply "aircraft"); a first time $T_1$ (first discrete point) temporally following time $T_0$ at which time $T_1$ an adversarial laser beam is initially reported as trained upon a subject aircraft; and a second point in time $T_2$ (second discrete point) temporally following time $T_1$ after which time $T_2$ the reported laser can no longer be directly trained upon the aircraft cockpit (though the pilot may still be subject to glare from reflections for a brief period of time after $T_2$).

Of interest with respect to subject aircraft are a time $T_1$ at which a laser beam reportedly has begun to be aimed, and the time $T_2$ at which the laser can no longer be aimed with any harmful effects. $T_1$ occurs operationally as a result of a reported attack, and elapses between $T_0$ and $T_2$. $T_2$ may occur for various reasons, such as: (a) subject aircraft travels beyond the effective sweep of the adversarial laser beam; or (b) the adversarial laser beam is terminated by its operator, by security personnel, by environmental or terrain conditions, or due to a mechanical malfunction or power loss; or (c) the present invention is operated in a manner which causes blockage of the adversarial laser beam. Some methods presented herein are tailored to approach-to-landing phases of flight and may be appropriately modified for takeoffs (e.g. reversed patrol patterning).

Between $T_1$ and $T_2$ are any number of points in time (e.g. $T_{a1}$, $T_{a2}$, . . . , $T_{a(n)}$) at which the reported beam is either aimed toward the cockpit or is not aimed toward the cockpit; and at which times an aimed beam will either be generally striking its intended target or generally not striking its intended target; and at which times a non-aimed and/or non-striking beam might suddenly be re-trained upon, and therefore possibly strike, a subject aircraft. These points in time can be usefully treated as time segments rather than as time points. That is, rather than treating a strobing laser as a discrete segment of time-points per strobe, it is advantageous to simplify the entire strobing beam duration as a continuous beam defined by a pair of start-stop time points ($T_{a1}$, $T_{a(n)}$). Strobing can occur because of the way a laser beam is being operated (strobing mode, auto or manual), or simply because of the manner in which such lasers are commonly wielded ("wanding" the handheld laser back and forth, up and down, etc.). Typical trembling of a human hand while it holds a small, active laser can also produce a strobe like effect. For purposes of the invention, a strobing beam is deemed to be equally productive of risk of harm as would be a continuous, uninterrupted beam not subject to beam intermittence or periodic disruption.

The methods described herein for blocking this kind of laser beam include using two different types of drones: a skeining drone ("Sk-O") and a swarming drone ("Sw-O"). One or more skeining drones may be deployed as a coordinated wing ("Sk-WING") closer to an aircraft cockpit than the swarming drones are deployed. The skein(s) and swarm(s) are launchable prior to an aircraft's traversing a predetermined approach point ("approach point" or "PLOT POINT ZERO" or "P-P-0"), though in some embodiments one or more skeins and one or more swarms are already airborne and are deployed in a patrol mode prior to an aircraft traversing the approach point. As an aircraft nears the approach point, the invention may be engaged either in response to a detected hostile beam or as a preventive measure to defend against a potential hostile beam. Additionally or alternatively, a plurality of swarming drones ("Sw-WING") may be deployed toward a determined source location of an aimed beam, or toward a predicted source location of an aimable beam, while the skeining drones are deployed closer to the aircraft. In effect the skein classically shields a cockpit by flying a controlled interference pattern parallel to the aircraft's approach/landing path while the swarm optimally saturates one or more calculably determined regions and/or saturates one or more dynamically redetermined regions directly athwart the determined location of the beam source. Dynamic redetermination of optimal swarming regions occurs in near real time.

As compared with swarming type drones a skeining drone moves fast (at or faster than the speed of the protected aircraft). Generally, a skein is comprised of a relatively small number of drones whereas a swarm is comprised of a comparatively large number of drones. Typically, though very generally, a skein (Sk-WING) may be considered as comprising a number of drones which is at least approximately one order of magnitude less than the number of drones in a swarm (Sw-WING). For example, a skein might consist of four Sk-Os (including its leader drone Sk-LEAD) and its companion wing of Sw-Os might comprise some forty or fifty individual drones including a leader drone. In one preferred embodiment, multiple Sw-O lead drones may be operational so that the Sw-WING can quickly split its formation in order to operate against multiple beam sources.

Many factors to consider when using the inventive methods are unique to individual airfield areas, while some factors are not. How many drones should comprise each type of WING? How should Sk-WINGs and Sw-WINGs be best deployed for a particular set of runways? What are the precise blocking shapes (cross-sectional profiles) of the Sk-Os and Sw-Os? What are the precise blocking profiles of the two different types of WINGs? How susceptible is a given O-GROUP (a set of Sk-WINGs and/or Sw-WINGs operating in tandem) to off-course movement (e.g. from crosswinds, uncompensated torque, mechanical vibrations, system jitter, software errors, or hacking)?

The inventive concept embodied in the present application inheres as follows. A leader drone and follower drones fly in controlled formations and use their bodily masses to block a sensed incoming laser beam. Each WING's 2D profile is treated as a cross-section which can be adjusted throughout drone flight to optimize beam blockage based in part upon the current position and shape (i.e. current location and current cross-sectional blocking area) of the leader drone. Two or more follower drones form-up based on a Process-Integrative-Derivative (PID) algorithm and "follow the leader" (for Sk-Os using a Particle Swarm Optimization (PSO) algorithm, and for Sw-Os a linear algorithm) and the WING(s) executes various controlled maneuvers to maintain beam blockage. Each individual drone (either type, Sk-O or Sw-O) within a WING is generally identical to one another, except that within each WING one or more drones are tasked with leadership.

Sk-Os are optimized for: speed (must reach approximately 170 KAS, typically, for use with some commercial jetliners), near-space shielding of the cockpit, gust rejection, crosswind correction, stability in the presence of time-based jitter, relative lack of event-based jitter, and ability to ditch as faultlessly as possible. By contrast, the Sw-Os are optimized for: operational simplicity, low cost, stability in the presence of event-based jitter, and ease of maintenance/replacement.

The methods described herein assume availability of a system which can detect the laser beam using off-axis methods and/or on-axis methods. Beam detection is on-axis, off-axis, or both. Beam detection might occur via both general methods roughly simultaneously. On-axis detection, where a sensor is located directly along the axis of beam travel, is more well-known than off-axis detection. Local detection methods are more well-known than remote detection methods. Example: a beam is reported by a WING leader when the Sk-LEAD's machine-visual field is compared in real time against an onboard mosaic map of the airfield area.

A system may include beam location remote-sensed by satellite means; one or more detectors disposed on the subject aircraft to detect the beam off-axis; and wherein both detection types exist within one system. Although near-real-time interception of a reported beam may be impossible to achieve in a given initial instance, subsequent attacks against other aircraft which follow upon the initial beam sighting may prove more susceptible to the methods described.

A "WING" is a coordinated group of one drone type (Sk- or Sw-). A group of at least one Sk-WING and/or at least one Sw-WING is referred to as an "O-GROUP". Each type of WING has a leader drone, which is designated "LEAD". The leader drone of Sk-WING is designated "Sk-LEAD". The leader drone of Sw-WING is designated "Sw-LEAD". Follower drones (all drones in a WING excepting that WING's LEAD) are designated either "Sk-O" or "Sw-O" depending upon which type of WING they populate. Generally, a leader drone forms a blocking object and maintains a flight pattern which causes its WING to extend the blocking area beyond that of the leader drone, up to and including a calculated and/or predesignated threat dematerialization point ("TDP"). Herein, individual drones may be referred to as "Sk-Os" or "Sw-Os" or "IDUs").

Recent work in controlling semiautonomous drone swarms has advanced to a point where both numerical modeling and experimental validation has demonstrated that a swarm of thirty drones can seamlessly navigate confined spaces. Outdoors, a swarm of 119 drones has been flown.

A swarm is programmed to achieve an interceptive flight path initiated after beam detection. Navigational commands direct a Sw-WING to home-in on a beam source and in one preferred embodiment to form a special conical region which dynamically optimizes the cross-sectional blocking profile and adds an advantage of assisting security personnel with apprehension of adversaries who are operating harmful laser beams. For example, this can be done with a pivoting conical swarm of Sw-Os which points in the calculated position of an adversary, and may assist security personnel (the Sw-Os are sequenced from base of cone to apex such that to a stationed observer it looks like a cone that points to a last known observed beam source location). Sw-Os fly a convergence path whereas the Sk-Os fly an escort path. The conic-shaped swarm of Sw-Os can optionally fly a dedicated patrol path prior to converging on a beam source. Once interposed between cockpit and beam source the swarm loiters in position subject to event-driven jitter and other factors (e.g., swarm is directed to move laterally if detected beam source moves laterally).

Generally, a Sk-WING flies a dedicated flight path subject to time-based system jitter. A Sw-WING flies a less dedicated path more subject to event-based jitter. A PSO algorithm is used to optimize a Sk-WING flight path and a linear algorithm is used to optimize a Sw-WING flight path. Experimental results demonstrate somewhat counterintuitively that PSO algorithms work best for the type of work to be performed in the Sk-WING role and linear algorithms work best for the type of work to be performed in the Sw-WING role.

Once the Sw-Os are airborne and formed into an operational swarm (Sw-WING), the specific geometry of the units is less important to consider than is the general shape of the entire swarm. For example, although an individual Sw-O may, at a given moment, be in a position such that it fails to block the beam, the swarm at that point is optimized for redundant coverage. In other words, if a Sk-LEAD fails to block the beam at that moment, most likely the beam will be blocked by one or more of its follower Sk-Os and/or blocked by the swarm of Sw-Os.

Two different drone types are used, (1) Skein (Sk-O), and (2) Swarm (Sw-O) because although it may be useful for discussion purposes to generate a theoretical "hybrid case" (from a design standpoint, some envisioned combination of a Sk-O and a Sw-O) as a middle boundary region, it is surmised that consideration of such cases only serves to illustrate that the system and methods are based on an insight that use of such hybridized drones is an inferior technique and that two different types of drones, each role-optimized, is required. Due to the dissimilar nature of the roles (Sk-WING and Sw-WING), use of one common type of WING (comprised of same drones) for each role is suboptimal because a hybrid drone and/or hybrid WING would be "a jack of both roles and master of neither" particularly in cases involving lateral movement of a beam and/or simultaneous multiple attackers. For reasons which become clearer below, both roles are required.

Theoretical worst-case scenario considerations quickly illustrate why both Sk-Os and Sw-Os are both needed as opposed to only one type (either). Attack scenarios include but are not limited to: multiple attackers (multiple lasers), acting in concert or independently, possibly very many and controlled remotely; adverse conditions such as: night; low humidity (very low humidity makes off-axis detection more difficult) or heavy humidity (very high humidity makes controlling drones more difficult); winds; gusts; airport characterized by up-/down-drafts or subject to turbulent or microturbulent regions; remote sensing unavailable, e.g. due to instrument malfunction or cloud cover; airplane-based sensors are unavailable or faulty; attacking lasers are highly mobile and/or are trained erratically (e.g., beam source moves laterally in direction of landing aircraft's direction as attacker tries to outfly the protective drones possibly while also trying to egress the area); attackers use intermittent and/or strobing beams (e.g. strike and move, strike and move); attackers employ multiple cheap decoy lasers as distractors prior to and/or during use of high-power laser; beam source can be masked/obscured by ambient light sources (light from car, utility vehicle, plane, or airfield control tower); attacker is simultaneously trying to hack the system e.g. by denial-of-service (rapid interrogation) type attack resulting in loss of positive control by system administrators; system is subjected to disruptive attack by kamikaze drone(s); bird strikes; high-power lasers; various types of drone malfunctions (loss of power, software errors, hardware component failures); hostile laser beam is drone-mounted or otherwise airborne; systemic communication errors (transmission or receipt of incorrect flight commands and/or bad sensor data); midair collisions among drones; airfield personnel unavailable to co-operate the system when the system is either in a fully-controlled mode or in a semi-autonomous mode (shared control state); and, human controller commits error.

When the inventive system engages a trained laser beam, in some preferred embodiments the pilot senses no aspects of an attack whatsoever (other than information purposely reported to the pilot by air facility authorities), and sees nothing distracting in the direction toward the beam's source location with the possible exception of a smallish "blind spot" which is simply a drab occlusion occurring within the pilot's field of vision where the laser beam would otherwise be sighted.

BRIEF DESCRIPTION OF THE DRAWINGS

Herein the terms "-rotor" and "-copter" may sometimes be used interchangeably (a "quadrotor" UAV is a quadcopter), as are "UAV" and "drone". It is also to be noted that unless otherwise indicated the aeronautical term "WING" (rendered in all-caps) herein denotes a coordinated plurality of drone aircraft; whereas lifting surfaces, control surfaces and stabilizing surfaces (e.g. fins, port wing, starboard wing, rudders, flaps, ailerons, chines, strakes, etc.) are denoted specifically (e.g. "wings"). Such surfaces may also be described herein simply as "control surfaces".

Other systems, methods, features and advantages of the invention will be or will become apparent to one with skill in the art upon examination of the following figures and detailed description. It is intended that all such additional systems, methods, features, and advantages be included within this description, be within the scope of the invention, and be protected by the accompanying claims. Component parts shown in the drawings are not necessarily to scale and may be exaggerated to better illustrate the important features of the invention. In the drawings, like reference numerals may designate like parts throughout the different views, wherein:

FIG. 4 is a SIPOC diagram of preferred methods for operating various system sensor components with respect to determining a beam source location.

FIG. 5 is a spreadsheet diagram showing an exhaustive categorization of operational modes.

FIG. 17 is a SIPOC diagram of various preferred methods for operating a Sk-WING.

FIG. 18 is a SIPOC diagram of various preferred methods for operating a Sw-WING.

DETAILED DESCRIPTION OF THE INVENTION

Figure 1:
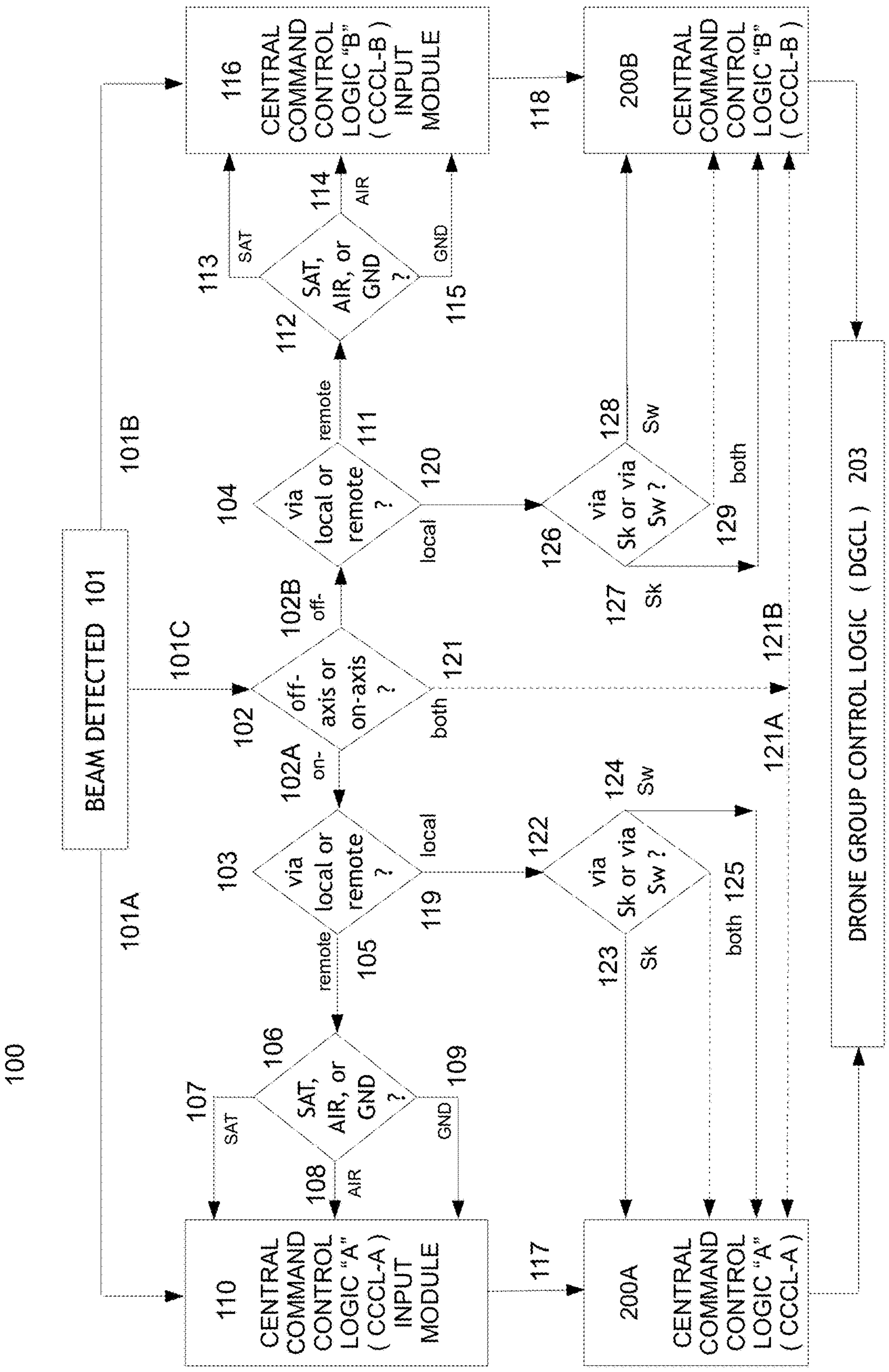
FIG. 1 is a flow diagram showing a coarse depiction of selected high-level operational methods used by the invention and information flow between various system components.

The present invention relates to methods for completely blocking or otherwise usefully obscuring of a handheld (or similar-sized) laser beam which has been detected as being aimed at or toward a piloted aircraft especially during the approach/landing phase of the aircraft's flight. The methods are adaptable for similar uses e.g. takeoff phase of flight, helipads, etc. FIG. 1 is a flow diagram showing a coarse depiction of selected high-level operational methods used by the invention and information flow between various system components. As seen in FIG. 1, system 100 at step 101A detects a potentially hostile beam. Such detection is performed by human operators, system sensors, or both. If a beam is detected by system sensors, at step 101 the sensors inform the system of a reported beam sighting in real time and can automatically place the system into a desired mode, or, if desired by system administrators, the sensors will alert the system administrators of a detected beam threat but sensor detection does not actuate other system components (possibly excepting ancillary functionality, e.g., alarm sounding, data logging, etc.). If the beam is visually sighted by human ground personnel, also at step 101A the operators key the system for a desired mode (see FIG. 5). If the beam is visually sighted by a pilot flying the subject aircraft, at step 101B the sighting is reported to CCCL-B. One way that human observers currently report lasers is via the aircraft pilots themselves reporting in real time that they are being lazed. In preferred embodiments of the present invention, pilots call out a brief signal as described below with regard to FIG. 25. If the beam is detected by system sensors, at step 101C the system will send data to logical block 102 and place the system in the appropriate operating mode. Risk-analytic methods of differentiating actual threats from false positives are generally well known as described in J. Riek, "Decision Making Biases, Threat Assessment and Hypothesis re-Evaluation in Information Warfare" and the inferential logic described therein is encoded within the system's Central Command Control Logic ("CCCL") for first-order analysis of sensed threats.

Figure 19:
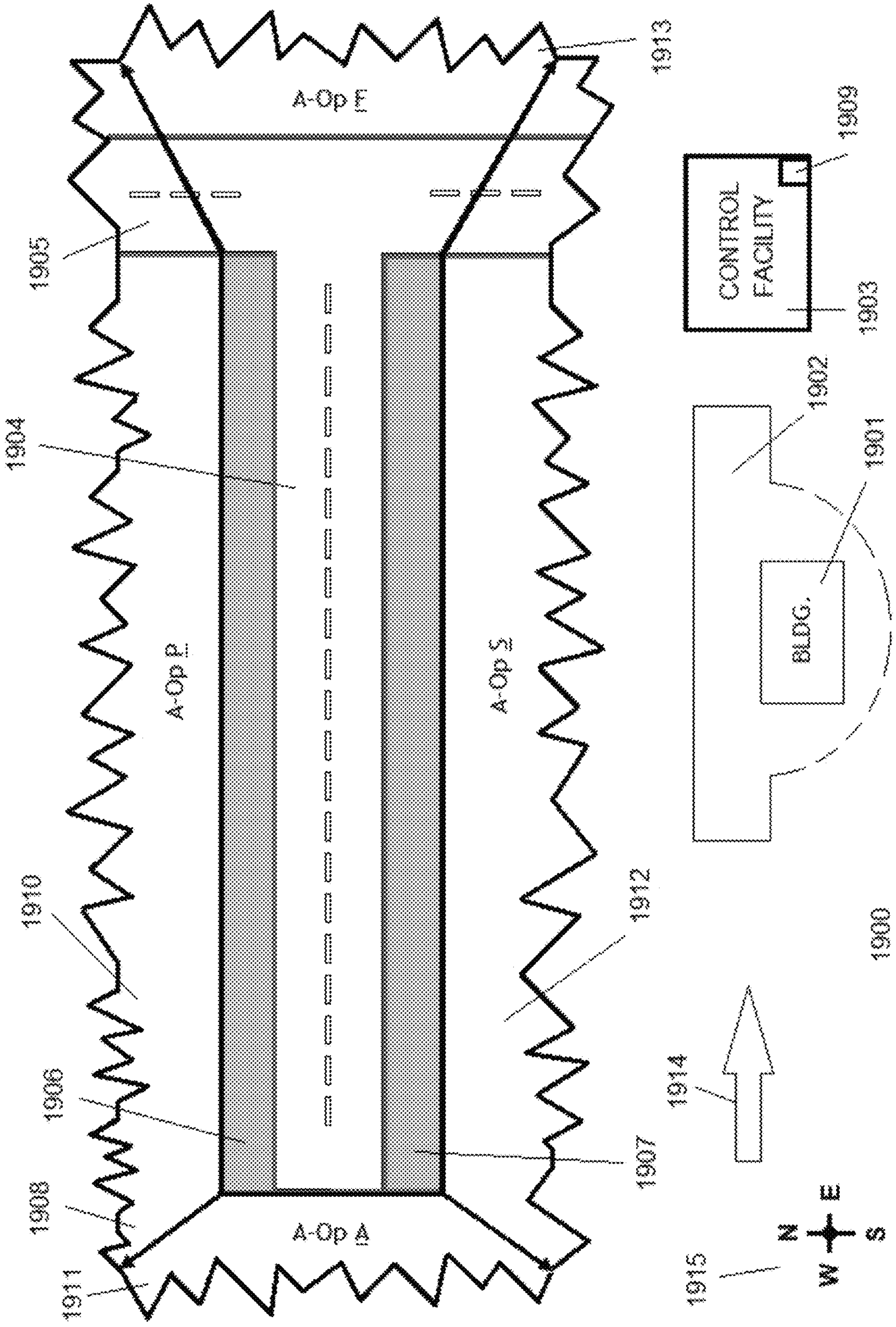
FIG. 19 is a diagram showing a bird's-eye view, from above a typical airfield area and its control facilities, of a typical local area of operations ("AOPs").

At block 101 of FIG. 1 the system considers the reported beam sighting as indicative of a hostile beam and treats the sighting as an event occurring at time $T_1$ wherein a potentially hostile laser beam is deemed as having been activated toward some restricted portion of the airfield (termed "AOPs" regions, see FIG. 19). As shown in decision block 102, this determination will be a result of system sensor indications which represent on-axis beam detection, off-axis detection, or both on- and off-axis detection. At step 102A, sensor signals indicative of on-axis detection are routed to decision block 103. At step 102B, sensor signals indicative of off-axis detection are routed to decision block 104. Each such group of one or more sensor signals, whether routed to block 103 or to block 104, is subsequently routed to an input module of a single Central Command Control Logic (CCCL) which in FIG. 1 is depicted as consisting of two separate logical components CCCL-A 200A and CCCL-B 200B which two logical components of CCCL receive via input modules 110 and 116 and process respectively sensor signals routed through decision blocks 103 and 104. Dotted line 121 logically depicts the case wherein both types of signals are present, i.e. when sensor signals have been routed to and through both decision blocks 103 and 104.

At block 103 it is known that on-axis beam detection has occurred via system sensors based within available local (located near or within the airfield area) system components (e.g. reconnaissance drones) or has occurred via remote components of the system (spaceborne satellites, distant airborne platforms, and any nonlocal ground-based assets) or has occurred via both local and remote sensors. Sensor signals indicative of remote detection are routed 105 to decision block 106. Sensor signals indicative of local detection are routed 119 to decision block 122.

At block 104 it is known whether off-axis detection exists via system sensors based only within local (AOPs) system components, only within system remote components, or within both system local and system remote components. Sensor signals indicative of remote detection are routed 111 to decision block 112. Sensor signals indicative of local detection are routed 120 to decision block 126. System sensor signals of all four types, when indicated, are characteristically routed to blocks 106, 112, 122, and 126.

At block 106 it is known that on-axis beam detection has occurred via one or more remote sensors. Most likely, on-axis beam detection will not occur via remote sensing; however, it is possible that an inadvertent, errant, premature, "practice", or otherwise ineffective beam (perhaps occurring at some point in time prior to that at which its wielder purposely aims the beam at a subject aircraft) will be detected on-axis by one or more remote sensors. Remote sensor signals from satellites are routed 107 to CCCL-A input module 110. Remote sensor signals from airborne platforms are routed 108 to CCCL-A. Remote sensor signals from ground-based assets are routed 109 to CCCL-A. Each type of signal routing 107, 108, and 109 may occur simultaneously, or in near simultaneity, with one or more of the other types of single routing during an incident.

At block 112 it is known that off-axis beam detection has occurred via one or more of the system's remote sensors. Such remote off-axis sensor signals from satellites, airborne platforms, and ground-based assets are characteristically routed (113, 114, and 115 respectively) to CCCL-B 116 for processing. Generally, further processing of signals by CCCL-A 200A and CCCL-B 200B occurs in order to derive output signals for transmission to Drone Group Control Logic (DGCL) 203 as further described below with regard to FIG. 2.

At block 122 it is known that on-axis beam detection has occurred via one or more of the system's local sensors. On-axis beam detection by such local sensors is deemed less likely to occur than is beam detection via other means (e.g. off-axis local sensing). However, particularly with respect to a reconnaissance UAV with mounted sensors, it is possible that detection of a hostile beam will be on-axis and local. It is also possible, though still less likely (due in part to preferred patrol patterns for use with airborne drones, described below) that on-axis/local detection of such beam would be via skeining drone (Sk-) based sensors. All sensor signals indicative of on-axis/local detection are routed 123 (for Sk-units) and 124 (for Sw-units) to CCCL-A 200A and thence to DGCL 203 as further described below with regard to FIG. 2. Signal routing for a type of (rarer) case in which local on-axis beam detection occurs via both Sk- and Sw-units with respect to a single beam sighting is depicted logically as dotted line 125. In some embodiments Sk-LEADs (and possibly Sw-LEADs) are equipped with on-axis detectors and photogrammetric maps of the airfield area.

At block 126 it is known by the system that off-axis beam detection has occurred via one or more of the system's local (based near the AOPs region) sensors. Off-axis beam detection by such local sensors is deemed less likely to occur than is beam detection via other means (e.g. off-axis remote sensing). Simultaneous or near-simultaneous off-axis beam detection via both Sk- and Sw-type units is deemed still more unlikely. However, such cases are real-world possible. All local sensor signals indicative of off-axis/local beam detection are routed 127 (for Sk-units) and 128 (for Sw-units) to CCCL-B 200B and thence to DGCL 203.

With further reference to FIG. 1 all sensor signals indicative of on-axis and/or off-axis detection of a hostile beam, whether detected by remote-based or by local-based sensors of the system, are routed to and processed by CCCL-A 200A and CCCL-B 200B for use by DGCL 203. Generally, further processing of signals by DGCL 203 occurs in order to derive output signals for transmission to all drones in operational WINGs. In some embodiments the signals for follower drones are calculated from signals derived for LEADs. Data is fused by CCCL as described below with regard to FIG. 2.

Figure 2:
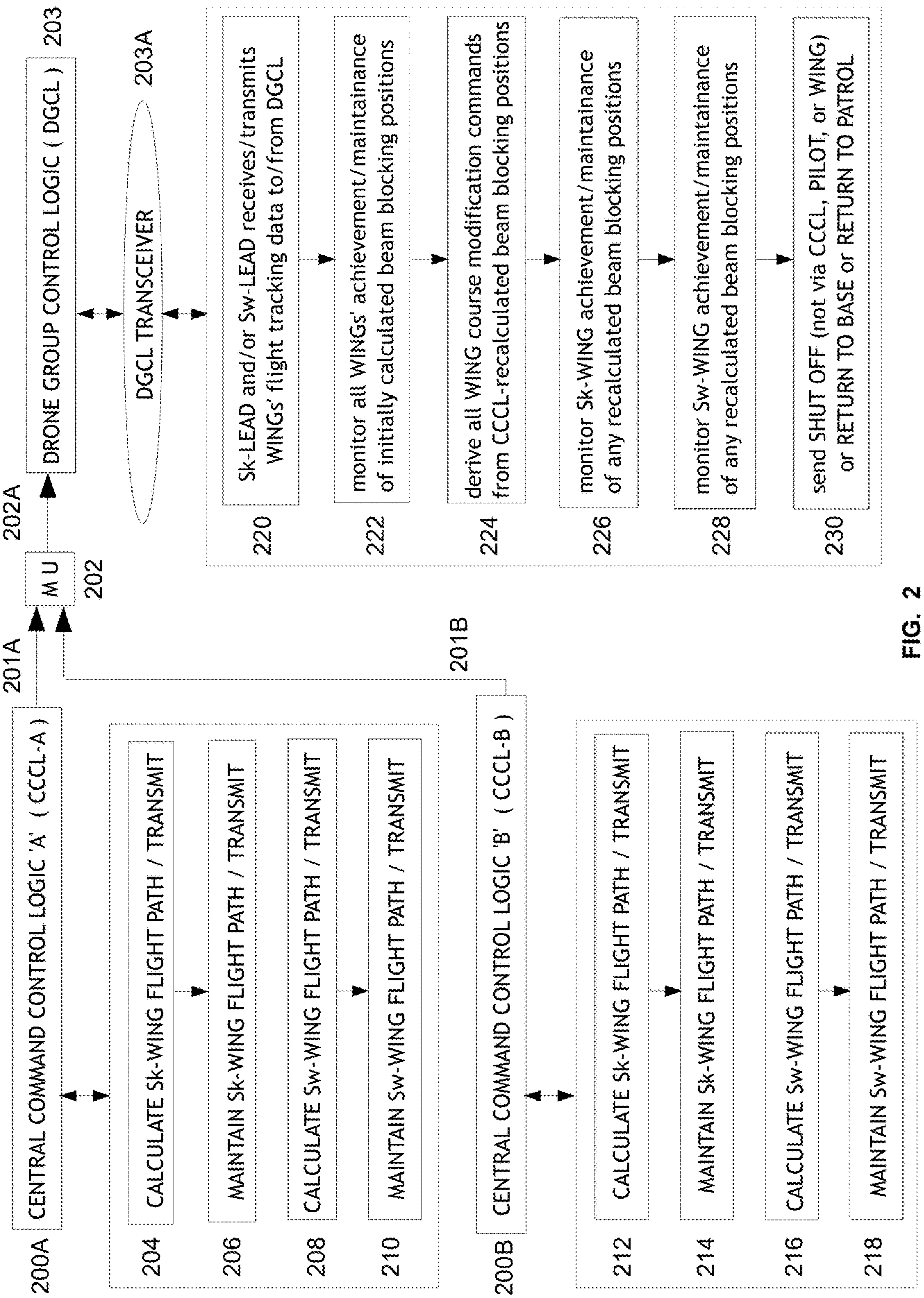
FIG. 2 is a flow diagram showing various aspects of Central Command Control Logic ("CCCL") and Drone Group Control Logic ("DGCL").

FIG. 2 is a flow diagram showing various aspects of Central Command Control Logic ("CCCL") and Drone Group Control Logic ("DGCL"). DGCL 203 output is in the form of command signals sent to an O-GROUP. CCCL-A 200A and CCCL-B 200B are shown as logically separate components but in preferred embodiments are contained within the same physical unit.

With further regard to FIG. 2, Central Command Control Logic 'A' (CCCL-A) 200A comprises memory-resident coded instructions which when executed by a processor cause an O-GROUP flight computer (not shown) to initiate and complete four different primary tasks (212, 214, 216, 218) one or more of which may recur throughout a mission and to transmit 201A resulting control data to Modular Unit (MU) 202. Central Command Control Logic 'B' (CCCL-B) 200B comprises memory-resident coded instructions which when executed by a processor cause an O-GROUP flight computer (not shown) to initiate and complete four different primary tasks one or more of which may recur throughout a mission and to transmit 201B resulting control data to Modular Unit (MU) 202. In preferred embodiments MU 202 comprises memory-resident coded instructions executed by a processor housed within the O-GROUP flight computer onboard a LEAD drone. Each set of four tasks is described below.

With further regard to FIG. 2, Drone Group Control Logic (DGCL) 203 receives all signal input as described above. At step 202, DGCL 203 generates coded instructions (hereinafter "instructions") for transmission to one or more LEAD drones. The instructions are received 203B by such LEAD(s) and when executed 204 cause the intended WING either to continue flying its user-programmed Default Flight Path ("DFP") or alternatively whether to fly a Modified Flight Path (MFP). At some point Tn in time, DGCL 203 receives input signals from CCCL (not shown) which input signals trigger instructions within DGCL 203 that cause a Sw-WING to execute one or more flight maneuvers resulting in a Modified Flight Path ("MFP"). The designation "MFP" distinguishes an MFP from every DFP which preceded it. Once an MFP has been achieved it is re-designated as the new DFP being used by DGCL 203. Further modifications of DFPs can occur in stages until a time $T_2$ at which point the aircraft is deemed by the system to be safe from attack. During this process, CCCL-A 200A and CCCL-B 200B execute eight primary tasks in addition to various subtasks thereof. Tasks 204, 206, 208 and 210 are executed by CCCL-A 200A. In task 204, a selected template-based Sk-WING flight path command set is calculated and transmitted to MU 202. In task 206, available data (especially wind direction and strength) from environment sensors is used to derive command sets required to maintain the Sk-WING flight path and the resulting command sets are transmitted to MU 202. In task 208, a selected template-based Sw-WING flight path command set is calculated and transmitted to MU 202. In task 210, available data (especially wind direction and strength) from environment sensors is used to derive command sets required to maintain the Sw-WING flight path and the resulting command sets are transmitted to MU 202. Tasks 212, 214, 216 and 218 are identical to tasks 204, 206, 208 and 210, respectively, except they are executed by CCCL-B 200B. CCCL-A 200A and CCCL-B 200B may each handle multiple simultaneous Sk-WINGs and Sw-WINGs.

With further regard to FIG. 2, CCCL-A 200A and CCCL-B 200B transmit their respective control data to MU 202. Coded instructions memory-resident within MU 202 when executed fuses the data transmitted thereto as further described below with respect to FIG. 4. Coded data resulting from the fusion is transmitted 202A to DGCL 203.

With further regard to FIG. 2, DGCL 203 is shown as a logical component separate and distinct from CCCL-A 200A and CCCL-B 200B however in some embodiments DGCL 203, CCCL-A 200A and CCCL-B 200B are contained within the same physical unit. DGCL 203 includes memory-resident coded instructions which when executed by a processor causes flight commands to be derived from the data transmitted by MU 202. The flight commands are then transmitted (not shown) by DGCL 203 to O-GROUP LEAD drones. DGCL 203 initiates and completes six different primary tasks 220-230 one or more of which may recur throughout a mission. In task 220, one or more Sk-LEADs and/or Sw-LEADs transmits tracking data to and from DGCL 203. In task 222, DGCL 203 monitors Sk-WING and Sw-WING achievement and maintenance of initially calculated beam blocking positions. In task 224 DGCL 203 interprets (if CCCL so calculates and transmits) modified flight path navigational commands for all Sk-WINGs and Sw-WINGs. In task 226 DGCL 203 monitors Sk-LEAD achievement and maintenance of recalculated beam blocking positions. In task 228 DGCL 203 monitors Sw-LEAD achievement and maintenance of recalculated beam blocking positions. In task 230, DGCL 203 issues final Sk-WING and Sw-WING commands (SHUT OFF, or RETURN TO BASE, or RETURN TO PATROL). SHUT OFF in task 230 is initiated by DGCL 203 (i.e. not by CCCL, a pilot, or a WING).

Figure 3A:
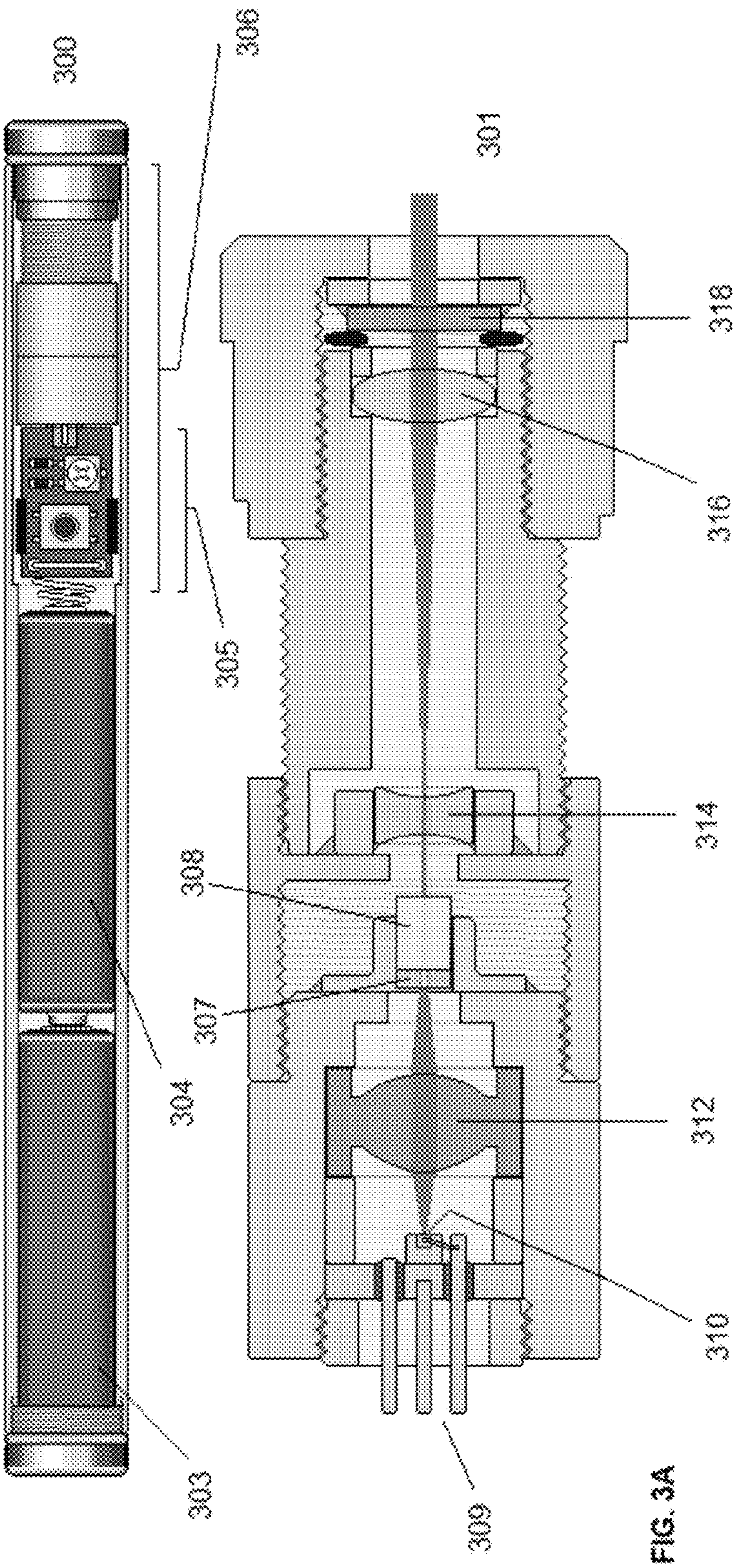
FIG. 3A is a cut-away view of a typical handheld laser and a component subassembly thereof.

FIG. 3A is a cut-away view of a typical handheld laser and a component subassembly thereof. FIG. 3A is adapted from COTS illustrations. Cut-away view 300 is of a typical green-wavelength (560-520 nm) handheld laser. Li-ion batteries 303 and 304 supply DC current to the terminals 309 of pump laser driver ("LD") 305 housed within laser module 306. Cut-away view 301 shows details of laser module 306. DC current from terminals 309 actuates LD 310. Light focused by pump focusing lens 312 is expanded by expanding lens 314. 312 is a pump focusing lens; 307 is the laser gain medium (crystal type, commonly Nd:YVO4, neodymium-doped yttrium vanadate); and 308 is the frequency doubling device (typically KTP, titanyl phosphate crystal). At collimating lens 316 the beam travels to IR filter 318 whence it travels outward into the ambient environment.

For purposes of problem analysis, a typical COTS handheld portable laser (Spyder® S3 Krypton Series 1000 mW class 4 handheld 520 nm green laser) is assumed. Although it would be relatively easy for an attacker to augment this type of laser with means for steadying, such as mounting it within a vehicle and pointing the laser through a vehicle aperture, no adjustments to the beam modeling are necessary due to simplifying assumptions that: (1) "wanding" of the laser is likely, i.e. continuous up/down and/or otherwise back-and-forth wielding by attacker; (2) intermittent or strobing beams are generally as undesirable as continuous ones; and (3) unless lateral movement of the beam source is determined by the system, once a WING has achieved desired position and velocity then ideally (e.g., no interim crosswinds occur) a System Engaged Patrol ("SEP") as described in FIG. 5 occurs with the laser beam blocked from the time of initial beam interception (which occurs at or after time $T_1$ ) through and including time $T_2$. Other types of beams and beam sources considered include higher-power (>2 W) lasers e.g. vehicle-mounted, similar to "technicals" (conventional automatic weaponry mounted in the bed of a pickup truck) used by unconventional forces in various third-world conflicts. The invention is scalable such that attacks via some higher-powered lasers and certain kinds of alternative (non-handheld) mountings (vehicles, trees, seaborne craft, other fixed or mobile positions) does not affect problem analysis, however in some cases other mountings (airborne, e.g. adversary drones) represent threats which the invention is not designed to address. In general, the system is not designed to counter airborne laser threats.

Figure 3B:
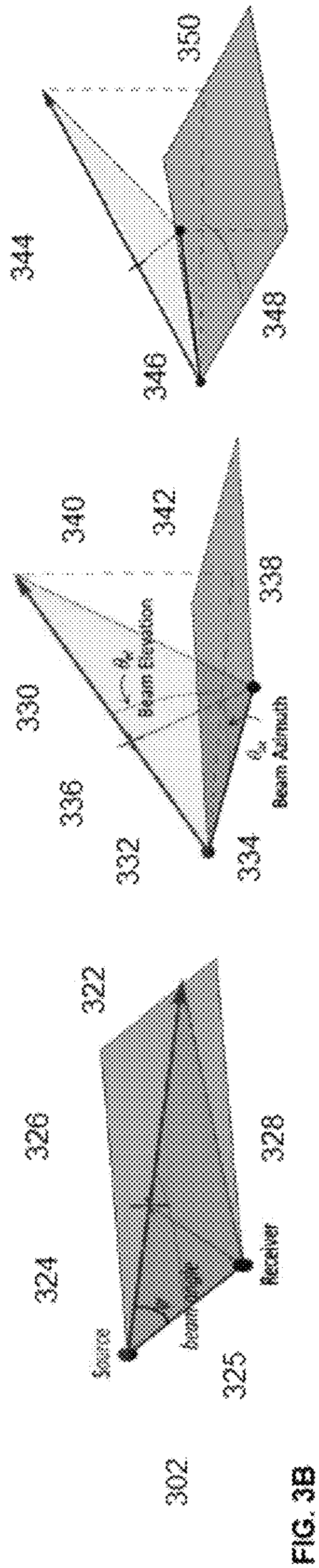
FIG. 3B is a diagram depicting three laser beams represented in (x, y, z)-coordinate spaces.

FIG. 3B is a diagram depicting three laser beams represented in (x, y, z)-coordinate spaces and is adapted from illustrations found in de Grassie J. et al., "A Hierarchy of Atmospheric Effects and Laser Beam Detection". Off-axis detection is more problematic to undertake than is on-axis, within the context of the invention, though more likely due to the low probability that a hostile laser aimed at an aircraft would happen to directly strike an on-axis detector. Current methods have been developed such that atmospheric conditions affecting beam detection have been recently categorized into a useful hierarchical scheme. Known methods of off-axis detection are described in F. Hanson, et al., "Off-axis detection and characterization of laser beams in the maritime atmosphere", *Applied Optics* 50, 3050-3056 (2011); and Hanson, et al., U.S. Pat. No. 8,908,178, "Method for Atmospheric Laser Beam Detection Using Remote Sensing of Off-Axis Scattering", which describe scattering analysis as applied to off-axis detection of laser beams in the near-earth atmosphere.

Planned improvements to current off-axis detection means include detectors mounted on airborne drones or airplanes (e.g. an RQ-7) and use of multiple-imaging systems mounted in land-based assets. If both detection types occur simultaneously or almost simultaneously on-axis detectors are given precedential priority over off-axis detectors. If remote detection occurs simultaneously or almost simultaneously with local detection, precedential priority is given to local detection.

With further reference to FIG. 3B, environs 302 depicts three different basic geometries for a handheld laser beam whose source is located at ground level, coordinates (0, 0, 0). Geometry 'A' 325 shows a horizontally disposed beam path tracing along at ground level. Geometries 'B' 332 and 'C' 344 depict similarly disposed beam paths which are slant rather than horizontal, the only difference between Geometry 'B' 332 and Geometry 'C' 344 being that in Geometry 'B' 332 receiver 334 is located at ground level while in Geometry 'C' 344 receiver 348 is located above-ground. For each of the three geometries A, B and C a typical line-of-sight distance from source to receiver is approximately 3.0 km. Geometry 'A' is representative for beam characteristics including angle $\psi$ 325 which is a function of azimuth $\theta_{az}$, laser elevation $\theta_{el}$ and receiver height. By way of example, a typical beam angle v 325 of interest ranges from 0° to 60°. Corresponding beam characteristics are shown for beam angles 334 and 346, with corresponding beam azimuths, laser elevations, and receiver heights, numbered respectively as shown in FIG. 3B.

FIG. 4 is a SIPOC diagram of preferred methods of operating various system sensor components with respect to determining a beam source location. SIPOC denotes "Sources, Inputs, Processes, Outputs, Customers". In a SIPOC diagram, Sources provide one or more Inputs to core Processes which produce Outputs supplied to one or more Customers which Customers can be any entity, object, or process. With regard to FIG. 4, process 401 describes that all of the system's local sensors provide input in the form of local sensor data acquired via the process of off-axis beam detection. When a suspect beam is detected, process 401 (off-axis, local) and process 403 (on-axis, local) are the highest-probability types of detection expected to occur. Output of processes 401 and 403 is in the form of geospatial coordinates (e.g. GPS) supplied as data input to CCCL-B. Processes 402 (off-axis) and 404 (on-axis) show similar tasking for detecting a beam remotely; sensor data is translated into geospatial coordinates supplied as output to CCCL-A. Process 405 describes that each of the aforementioned types of system sensors also provide their sensor output as data input for a core process of detecting whether a detected beam source remains stationary or is moving laterally. A companion process (not shown) similar to process 405 can operate to detect vertical motion of a beam source. Process 406 describes that the CCCL fuses all sensor data received from all sources, which sensor data informs CCCL calculation of beam source locations, DFPs, and MFPs. More specifically, in process 406 a CCCL supplies inputs (output of processes 401-405) in the form of collected sensor data and CCCL analytic-engine results to a core CCCL process of synthesizing all collected data within the relevant WING navigation model (Sk- or Sw-) and deciding whether to send a "Maintain DFP" to DGCL or instead to transmit to DGCL instructions which cause the WING to depart from DFP and seek a MFP. Process 407 describes that a DGCL receives input in the form of coded instructions to inform a DGCL's core process of determining whether a given WING should continue flying its DFP or instead to inform a DGCL's core process of issuing commands for the WING to fly a MFP. If a MFP is directed by CCCL for execution, the DGCL derives and transmits instructions to each WING's drones which instructions when executed cause servomechanisms and related modules within each drone to be actuated or modified with the result that a DFP will be departed from and a MFP flown. Process 408 supplies crosswind data to CCCL from local anemometers. Process 409 supplies ambient air pressure data to CCCL from local barometers. Process 410 supplies ambient air temperature data to CCCL from local thermometers. Process 411 similarly supplies ambient humidity data from local hygrometers.

With further reference to FIG. 4, remote sensors may be used to effectuate off-axis detection of a beam. Applicable methods are described in Hanson et al., U.S. Pat. No. 8,908,178.

With further reference to FIG. 4, LITSABR (Laser Identification through Scattering and Beam Recognition) sensors (mounted on patrol aircraft, i.e. on aloft aircraft which are other than system-protected aircraft) may also be used to assist with off-axis detection of a beam. Methods are adaptable from those described in various literature.

With further reference to FIG. 4, aircraft-based LWRs (laser warning receivers) which are mounted on the system-protected aircraft may be used to assist with on-axis detection of a beam. Methods are adaptable from those described in various literature.

With further reference to FIG. 4, land-based LWRs may also be used to assist with on-axis detection of a beam. Methods are adaptable from those described in various literature.

With further reference to FIG. 4, drone-based sensors may be used for off-axis detection of a laser beam, preferably sensors mounted on special reconnaissance drones (but could be mounted on Sk-O or Sw-O drones). Recent advances in detection using coherence properties of lasers (rather than intensity properties) now enable low-cost drone mountable sensors believed particularly useful for detecting low-power lasers of the type commonly used to attack aircraft. A current candidate for a reconnaissance drone of this type for use in preferred embodiments of the invention is the ZALA 421-16E2 UAV manufactured by Zala Aero Group with modifications (on-axis beam detection equipment in lieu of a conventional complement of surveillance cameras).

Processes set 400 shows core processes for beam detection undertaken by on-axis and off-axis sensors. A database (as further described below with regard to FIG. 5) includes all necessary tables, fields, and entity relationships to direct and monitor eleven primary core processes (tasks) and all subtasks thereof shown in FIG. 4. In task 401 data from local sensors is used to detect a beam location via off-axis sighting methods. In task 402 data from remote sensors is used to detect a beam location via off-axis sighting methods. In task 403 data from local sensors is used to detect a beam location via on-axis sighting methods. In task 404 data from remote sensors is used to detect a beam location via on-axis sighting methods. Location data derived in tasks 401 and 403 is transmitted to CCCL-A. Location data derived in tasks 402 and 404 is transmitted to CCCL-B. In task 405 data from all local and remote sensors (including data from photogrammetric-based real-time WING observation of a detected beam source) is used to detect lateral (along the ground) movement of a previously detected beam source and transmit resulting change-of-location data to CCCL. A companion process (not shown) similar to process 405 can operate to detect vertical motion of a beam source. In task 406 CCCL fuses all sensor data processed by CCCL-A and CCCL-B to calculate and recalculate all flight command sets required for all active Sk-WINGs and Sw-WINGs to remain on course (via DFPs and MFPs as described below with regard to FIG. 5). Data includes but is not limited to beam source location, aircraft speed and heading, aircraft rate of descent, and all data used in tasks 408-411. In task 407 DGCL receives flight path command sets from CCCL and converts them to commands recognizable by individual drones (e.g., servomotor command to adjust propeller pitch; increase power; fly to Waypoint XYZ). In task 408 prevailing wind speed and direction measured by local anemometers is rendered in a computationally appropriate format and transmitted to CCCL. In task 409 ambient air pressure measured by local barometers is rendered in a computationally appropriate format and transmitted to CCCL. In task 410 ambient temperature measured by local thermometers is rendered in a computationally appropriate format and transmitted to CCCL. In task 411 ambient humidity measured by local hygrometers is rendered in a computationally appropriate format and transmitted to CCCL.

The system's on- and off-axis beam sensors (satellite-, airborne-, and ground-based) supply input in the form of sensed data to CCCL for the core process of detecting suspect beams. Output from the core process is rendered by the CCCL into one or more sets of desired waypoint coordinates which are transmitted as inputs to the DGCL where the desired waypoint coordinates are in turn rendered into navigational command instructions for all active drones. Contemporaneously system sensors provide sensor output as data input to a core process for detecting whether a detected beam source is stationary or is moving laterally. Once each selected WING is active, i.e. flying a template-based intercept course, maintaining each WING on its desired course is largely a matter of detecting (via local sensors) wind gusting as early as possible and transmitting commands to the active drones which when executed compensate for the gusting. Gust sensing and rejection is a primary core process of CCCL, though lower priority than collision avoidance.

FIG. 5 is a spreadsheet diagram showing an exhaustive categorization of operational modes. As seen in FIG. 5, the system is operated in one of six mutually exclusive modes when it is up and running. The first four modes are operational: Ready Mode (RM), Normal Uneventful Patrol (NUP), Normal Eventful Patrol (NEP), and System Engaged Patrol (SEP). Two other ("nonoperational") modes are Maintenance Mode and Simulation Mode. In some embodiments the system must be manually keyed by system administrators to a selected mode. In preferred embodiments the system automatically determines an appropriate mode based on events of interest and toggles from one mode to another based on such events. For example, a NUP WING or NEP WING, after completing its mission and returning to base, would resume status as a RM WING (unless required maintenance causes the WING to be taken offline). As another example: a launch event transitions a WING's status from RM to NUP; events occur which transition the NUP to a NEP; a beam strike is then reported, causing the system to transition the WING into SEP.

Figure 24:
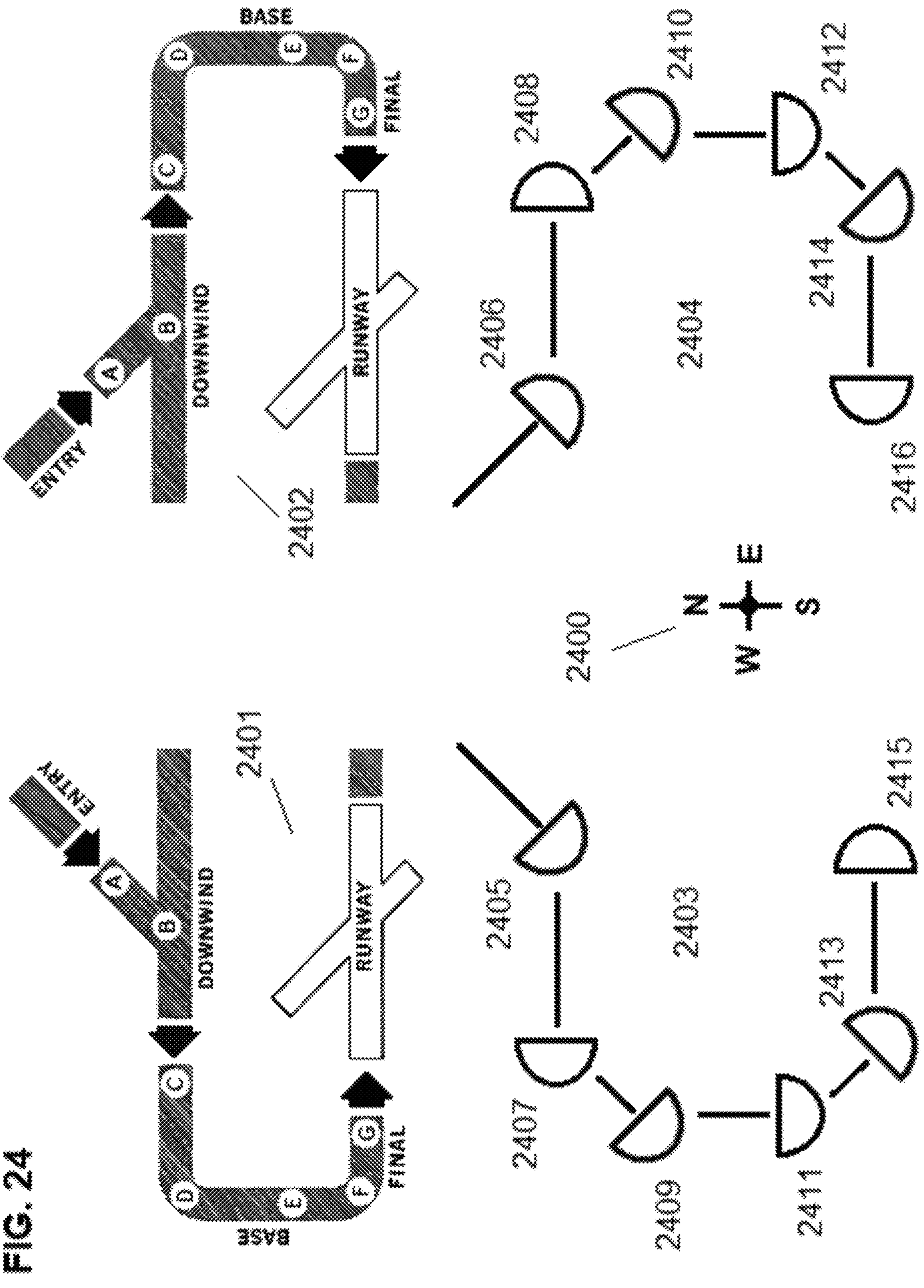
FIG. 24 is a depiction of two airfield traffic patterns and respective abstractive diagrams thereof.
Figure 25:
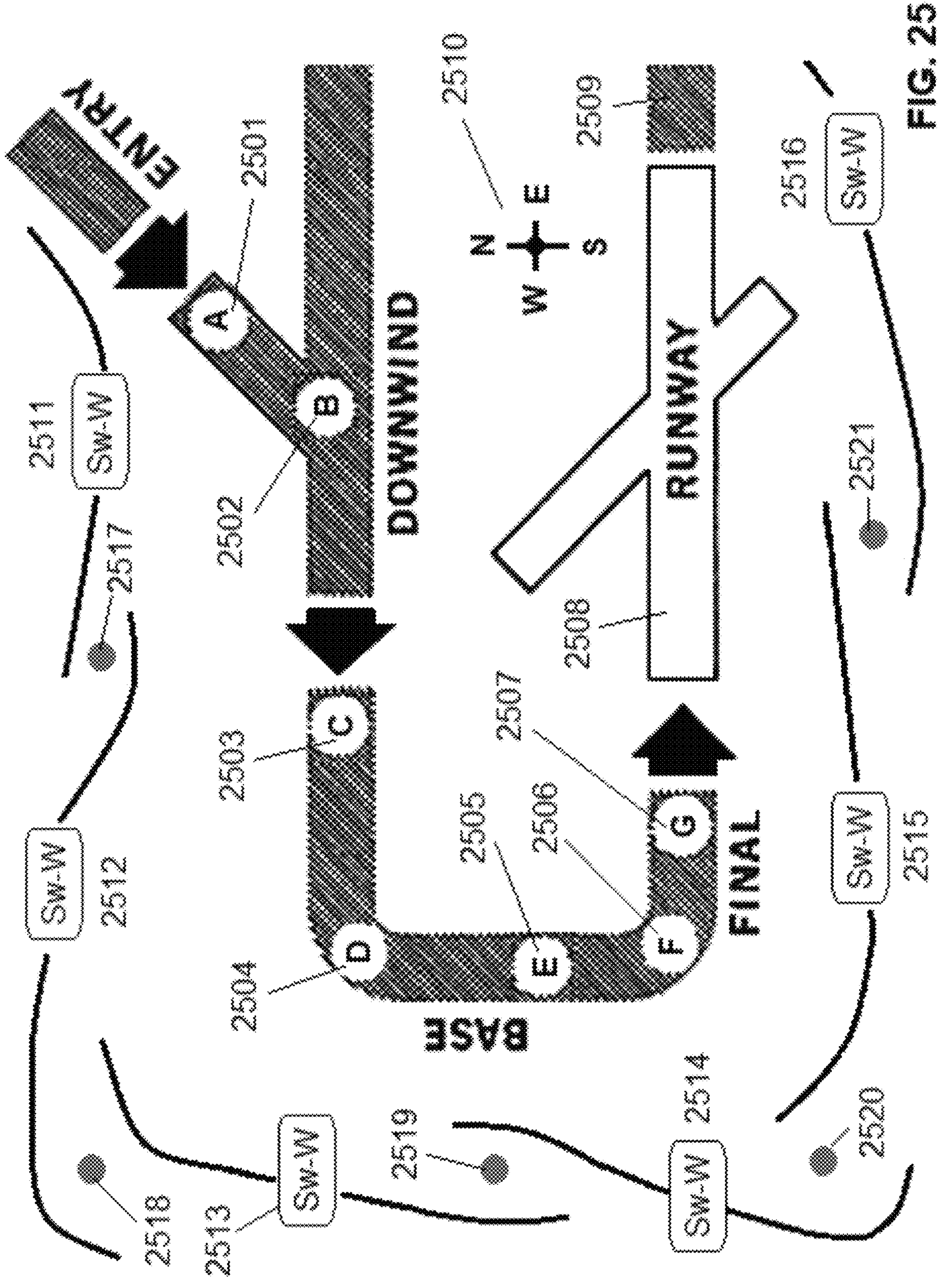
FIG. 25 is a partial view of the L-H traffic pattern area of FIG. 24, with additional elements.

Artificial intelligence (AI) is used by the invention in a number of different ways, including system setup and configuration at individual airfield areas as well as for template construction. Each of multiple templates for every airfield area describes flight plans generally bound by a curved toroid region wrapped about the airstrip (runway) facilities, modified as required for use with each individual airfield facility as depicted in FIG. 24 and FIG. 25. Generally speaking, Sk-Os attempt to classically shield the cockpit while Sw-Os attempt smother the beam source like a goalie (in sports, e.g. hockey) who emerges from the crease to improve the opportunity for blocking an approaching offensive player's shot-on-goal. The invention solves the problem by attempting one or both types of beam blockage. Currently available drones meet only minimal requirements for speed and maneuverability, so reliance on preprogrammed flight plan templates accessibly stored in a database is essential for ensuring fastest response times. All flight plans are based on templates developed for specific airfield runways. Recognition algorithms using data from all platforms filter out two sources of extraneous light: (a) navigational lights on the escorted aircraft; and (b) ambient light and any ground-based light sources unique to individual airfield areas such as communication tower lights, commercial building lights, airport utility vehicle lights, car headlights, and the like, when the invention is used at night or other low light conditions (e.g. dusk, rain). This is done based on positioning (light from known direction of airplane, light from known direction of ground vehicle headlights), and characteristics of extraneous light (car headlights filtered by wavelength). Many sources of such extraneous light can be identified, mapped, and factored into flight planning on a per-installation basis.

A database is populated and used by system administrators to manage: (1) a set of Template DFPs unique to a particular airfield area; and (2) sets of variables whose values when changed trigger one or more procedures for generation of MFPs. The database and its database management system is coded, implemented, and administered with all necessary functionality including but not limited to one or more servers, database binaries, entity-relationship mappings, tables, databases, schema, objects, administrator and user accounts, security configurations, access privileges, audit configurations, administrative and user interfaces, listener modules, triggers, stored procedures, performance tunings, backups, automatic and manual maintenance tasks, patches and upgrades, and customizations, required for generating, modifying and maintaining all templates based upon flight test data for a subject airfield. Preferably, stock DFP templates can be used either as-is by system administrators at individual airfields or airfield templates can be customized from vendor-supplied stock templates. In some embodiments, custom DFP templates may be created by system vendors based upon information provided by customers responsible for specific airfields.

Once a customized template has been created and tested for an individual airfield area, one or more appropriate Template DFPs may be selected automatically from the database and used to direct one or more WINGs to fly a beam-interceptive pattern through and including landing at a base station or returning to a designated patrol mode. The invention provides for a Sk-WING to fly roughly parallel to the approaching/landing aircraft such that it is generally interposed between the laser beam source and the aircraft cockpit, while a companion Sw-WING hovers along a similarly disposed path, though generally a much shorter path as the Sk-WING's, simultaneously, with the Sk-WING operationally disposed generally much nearer to the beam source than is the Sw-WING. If a Sk-WING fails to block the beam at a given moment, it is quite possible that the beam will be blocked by one or more of the Sw-Os. The O-GROUP itself is redundant in that the Sk-WING is designed to block a beam if Sw-WING fails to do so, and vice-versa.

Customized PID control functions for each individual airfield areas are used to populate each database and build a library of templates and sub-templates subsequently used to derive corrective flight maneuvers required for different operational WINGs to remain on-course with respect to representative DFPs. Actual DFPs flown during an Operational Mode (NUP, NEP, SEP) may follow template DFPs but in preferred embodiments are in some cases derived from values interpolated from various field values established in the template database. By way of example and not limitation, assumptions for typical Template DFPs might include field values which represent crosswind velocities as constant speed and direction (zero gusting), and aircraft deceleration as constant through a Protected Segment. As a result, Template DFPs cause generation of Intercept Paths ("IPs") which transition to Blocking Patterns ("BPs") of straight flight at correspondingly constant deceleration. Actual IPs and DFPs may in some cases be interpolated from a combination of a Template DFP and current measured values including but not limited to prevailing wind speed and direction. Many airfield areas are characterized by aircraft landings which frequently occur with many common aspects, and WING launch pad location values (as opposed to loiter patterns) generally remain constant (though launch pads may be moved, e.g. can be made easily portable, their location values are constants when the system is in an Operational Mode). Some airfield areas are better able than other areas to utilize Template DFPs without need for interpolations.

Trial runs at individual airfields having typically frequent standard approach and landing patterns can be undertaken (using Simulation Mode) without actual landing aircraft due to the relative ease with which such aircraft flights may be simulated. During trial runs, data regarding e.g. actual crosswinds may be logged and used for creation of customized IPs and DFPs. Specifically, once a library is built a priori PID control functions may be tested and refined. These initial PID control functions are then iterated over a specified number of trial runs over each approach pattern and landing pattern for each individual runway at each individual airfield area.

Once a preliminary template library is built, known artificial intelligence ("AI") methods are used to interpolate values for additional IPs and DFPs. In preferred embodiments such interpolated values are in some cases subsequently replaced by actual values logged during SEP Mode and in other cases are combined with SEP Mode values to produce hybrid values. In this way, AI is used to establish more refined customized IPs and DFPs over time. For example, one of the templates database field values used in templates creation is relative atmospheric humidity. A new table record may be created and written in between two existing table records A and B each of whose field values are identical except that Record A contains a value of 40% for Φ and Record B contains a value of 42% for o. Templates creation AI logic examines DFP commands to be issued as a result of a need for an IP in situations characterized by 40% Φ versus situations characterized by 42% Φ and interpolates modifications of such DFP commands for situations characterized by 41% Φ.

Templates database field values may include but are not limited to values representative of earth magnetic field directions as taken for one or more different reference points; barometric pressure; atmospheric temperature; relative atmospheric humidity; prevailing wind speed; prevailing wind direction; wind gusting; crosswinds; and all values required for drone geofencing (restricting use to AOPs regions as discussed below). In preferred embodiments library templates may be cloned and then used to create more refined templates with field values adjusted for individual types of landing aircraft common to individual airfield areas. For example, field values may be adjusted during new templates creation to account for the fact that a single-engine high wing aircraft is more vulnerable to crosswind gusting than are various similar-sized low wing aircraft landing at similar speed and as a result a template used for e.g. a Cessna 172 would produce Sk-WINGs which give a wider berth (in terms of distance from skein to cockpit) to the Cessna as compared with how much it gives a low wing aircraft landing at higher speed. System administrators may benefit from pooling template data from individual airfields, e.g. to establish federated databases with increasingly larger AI datasets useful for experimental operations in Simulation Mode.

One sub-task is to dampen jitter and avoid overshoot. For initial templates creation PID control functions are derived for NUP Mode at desired runways. In preferred embodiments a priori control functions are initially based only on P, then modified as PI control functions which incorporate datasets logged during P-controlled trial runs. PI control functions are then further modified as PID control functions which incorporate datasets logged during PI-controlled trial runs. PID control functions are then used to create the initial set of Operational Templates which can be augmented via interpolative methods described above for densely populated template libraries.

Deriving a priori PID functions for individual airfields. For a given r(t)=desired value and y(t)=measured value, error value e(t) is given by:

$$e(t) = SP - PV$$

where SP is the setpoint equal to r(t), and PV is the process variable equal to y(t)

A desired PID control variable u (t) is given by the equation:

$$u(t) = Pe(t) + I\int_0^t e(t')dt' + D\frac{de(t)}{dt}$$

where e(t) is the error value, P is the process variable and is proportional to the current value of e(t), I represents the integration of past e(t) values, and D represents a future trend based on the current rate of change.

Partly unique to each airstrip locale, but also sharing some characteristics of a general template, will be a databased map of likely adversary positions described in (x, y, z) and/or GPS coordinates. Incorporated into templates for likely source locations of adversarial laser beams, which in some cases will suggest best practices for optimization of skein and swarm loitering patrols and predetermination of likely swarm hovering locations.

Recording of template variables' values during plenary test flights is preliminary to final Templates construction. By way of example and not limitation, for a set of templates based on the conducting of eight flight tests with all variables holding steady, except for measured ambient light level yielding eight different values, the template construction process will yield eight separate different sub-templates. Given a reported beam whose location suggests invoking one of these eight sub-templates, the inventive method will select the sub-template that was constructed while measured ambient temperature was closest to that existing when the beam is reported. Similarly, for a set of templates based on the conducting of eight flight tests with all variables holding steady, except for measured atmospheric humidity yielding eight different values, the template construction process will yield eight separate sub-templates. Given a reported beam whose location suggests invoking one of those eight separate sub-templates, the inventive method will select the sub-template that was constructed while measured atmospheric humidity was closest to that existing when the beam is reported.

An adapted ABSGAM (Airbase Sortie Generation and Analysis Model) is used to implement the system at each individual airport or airfield area. Based on ABSGAM-type modeling, separate and different launch facilities are maintained by system administrators for Sk-WINGs and Sw-WINGs. Depending on an airfield area's specific needs, WINGs are launched from launch pads or catapults located at such facilities each time the system is triggered or toggled into one of the Engaged Modes. WINGs may be launched for either general patrolling or SEP Mode, and upon completion of a general patrol or a SEP mission are returned to base for battery recharge (electric-powered units) or refueling (internal combustion units) and required maintenance tasks including but not limited to compass recalibration, frame degaussing, and inspection of propeller blades for fatigue and other defects. In some embodiments human attendants are positioned near the launch pads to perform various preflight maintenance tasks and in preferred embodiments undertake manual, or oversee mechanical, transfer of drones from landing pads onto launch pads.

As seen in FIG. 5, processes set 500 shows six different processes 501-506 which collectively describe the six basic Operating Modes of the invention: 501 Ready Mode ("RM"); 502 Normal Uneventful Patrol ("NUP"); 503 Normal Eventful Patrol ("NEP"); 504 System Engaged Patrol ("SEP"); 505 Maintenance Mode ("MM"); and 506 Simulation Mode ("SM"). A brief description of processes 501-506, various events attending the processes, and miscellaneous notes regarding the events are set forth in FIG. 5. Such events, brief descriptions thereof, and notes are intended to be illustrative and not limiting.

Certain embodiments provide for leadership fail-over/succession (e.g., if a LEAD drone suffers a mechanical malfunction). In case of leader drone inflight mechanical malfunction, one of the secondary drones assumes the leadership role, and remaining secondary drones will re-optimize as discussed above, i.e. maximize cross-sectional coverage area behind the new leader.

Figure 6:
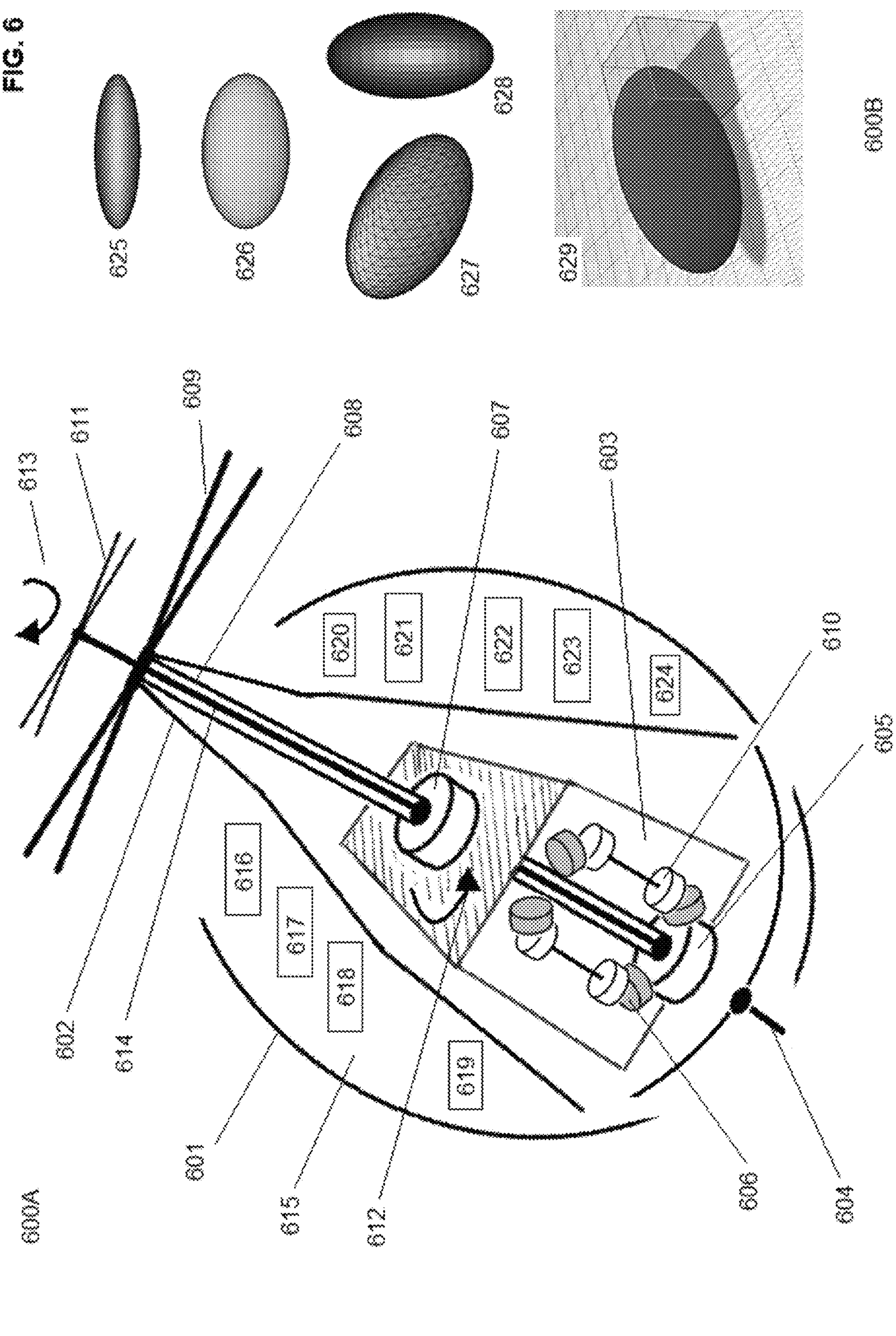
FIG. 6 is a cut-away view depicting various geometric and mechanical features of a typical skeining drone (Sk-O type).

FIG. 6 is a cut-away view depicting various geometric and mechanical features of an example skeining drone (Sk-O type). An oblique perspective cut-away view is provided of a portion of the surface 601 of frame (drone fuselage) section 615 of Sk-O 600A and various components of Sk-O 600A. Motor housing 602 contains black box motor 603, rotating drum 605, non-rotating drum 607, outer prop-shaft 608, inner prop-shaft 614, and gearing mechanisms 606 and 610. Power is supplied to black box motor 603 as DC electric current from suitable Li-ion batteries (not shown) but could be supplied by other suitable means. Communications antenna 604 passes through frame section 615 and is connected to an Onboard Communication Unit ("OCU") (not shown) contained within Sk-O 600A. Black box motor 603 when running and engaging transmission gearing mechanism 606 causes toothed rotating drum 605 to turn about its longitudinal axis. This in turn causes spinning of outer prop-shaft 608 forcing large propeller blades 609 to rotate in the direction indicated by the (generally counter-clockwise) vertical component of arrow 612. Actuation of transmission gearing mechanism 606 and resulting rotation of drum 605 also causes rotation of transmission gearing mechanism 610, which rotation performs directional translation and causes inner prop-shaft 614 to spin in the direction opposite that of outer prop-shaft 608. Spinning of inner prop-shaft 614 causes smaller propeller blades 611 to rotate in the direction indicated by the (generally clockwise) vertical component of arrow 613. Non-rotating drum 607 provides stability for outer prop-shaft 608.

In some embodiments two counterrotating propellers are disposed from a motor and motor housing within the interior region of each individual Sk-O drone and extend via attached rotors through the drone frame in a conventional manner as generally shown in FIG. 6. Counterrotating propellers or sets thereof (e.g. for different types of coaxial copters) may be disposed generally above and below the center of gravity of the drone. A power supply and a communications module are housed inside each drone and a small antenna 604 is disposed. In some embodiments a rudder may serve as a control surface and also extend a communications antenna.

With further regard to FIG. 6, additional components of Sk-O 600 include but are not limited to the following. ECU (Engine Control Unit) 616 includes an onboard flight controller for interpreting flight commands and includes integrated electronic speed controls. External camera 617 is a CCD (digital video camera) device mounted on one side of surface 601 such that it may be used for real-time photogrammetric analysis in connection with stored onboard maps of an individual airfield area. In preferred embodiments, one such camera 617 is mounted on the port side of the Sk-O drone and an identical camera is mounted on the starboard side of the Sk-O drone, and each such camera may be utilized selectively by system administrators depending on the orientation of flight plan. For Sw-O drones, in preferred embodiments a single camera is mounted on Sw-LEAD drones only and is used during semiautonomous patrols (swarm can react on its own) in response to luminous anomalies as described below. Receiver unit 618 is responsible for reception of radio signals (navigational commands) sent to the drone from DGCL. Transmitter unit 619 is responsible for transmission of radio signals (location and performance data) sent by the drone to the DGCL. GPS unit 620 is responsible for provision of drone longitude, latitude, and elevation points. Photogrammetric processing unit 621 stores one or digitized maps of an individual airfield area and in some embodiments is used by a LEAD drone to report and/or otherwise react to luminous anomalies (i.e. potential beam source locations) via real-time comparison of ambient light sources as against onboard maps selected based upon time-of-day and weather conditions. IMU (Inertial Measurement Unit) 622 uses one or more accelerometers and gyroscopes to measure acceleration and rotation and provide position data. LIDAR sensor 623 is used as one means of providing collision avoidance. LIDAR processing unit 624 renders data from LIDAR sensor 623 for use by the individual drone.

With further regard to FIG. 6, additional components of Sk-O 600 include LIDAR 623 and LIDAR processing unit 624. Drones of all general types contemplated for use with the present invention are capable of full flight stoppage within expectedly acceptable parameters when confronted with stationary walls and proof of concept has been demonstrated for LIDAR use at higher speeds. COTS systems are available with 360° LIDAR. In preferred embodiments a 360° LIDAR subsystem is attached to one or more Sk-Os for aircraft collision avoidance as well as for avoiding collision with all other Sk-Os. In some embodiments only a Sk-LEAD's LIDAR is keyed for avoiding collision with aircraft while Sk-O follower drone LIDAR is keyed only for avoiding collision with their Sk-LEAD and fellow Sk-Os. Based upon optimal Sk-WING flight regimes as described below with regard to FIG. 9 and FIG. 10 it is likely that Sk-WING collision with aircraft is an extremely remote possibility, ex ante (without use of LIDAR) and could result only from rare catastrophic event sequences. LIDAR is a fail-safe, in sense of providing a collision-avoidance backup method for geofencing. TOF (Time of Flight) limitations can also be placed on WING missions as an additional fail-safe method.

In preferred embodiments collision avoidance is given priority over all other general tasks. In the present invention, for example, avoiding collision with the subject aircraft is a higher priority than is avoiding collision with all O-GROUP drones and avoiding collision with any rogue drone which violates the airspace restriction of the airfield area. Collision avoidance is also a higher priority than that of all geofencing implemented via GPS way-pointing or other means. If LIDAR indicates for example unacceptable likelihood of collision with aircraft, a WING is diverted or ditched even if geofencing fails to indicate such likelihood of collision.

A current candidate for a skeining drone of this type for use in various preferred embodiments of the system is a gasoline-engine powered quadcopter capable of a top airspeed on the order of 163 mph. The Sk-O is designed to fly at a maximum speed of approximately 170 KAS or roughly the landing speed of a Boeing 747 jet airliner, generally the top speed among types of aircraft the system is designed to protect. At least one COTS gas-powered quadcopter currently exists which can achieve 163 mph and 170+ KAS is believed to be the approximate airspeed of Experimental class fixed-wing drones currently in general commercial and/or academic development. Recent jet-powered VTOL drones have been claimed to reach speeds of approximately 250 mph. In one preferred embodiment, the shape of a Sk-O frame is an oloid which approaches a perfect sphere.

One physical aspect of a drone, its general shape, makes it a good candidate for being the sole blocking object (i.e. by using its frame generally, as opposed to using e.g. a trailing tail ribbon or some combination of the frame and a trailing shape such as tail ribboning). Of particular interest is size of cross-sectional profile, which admits of a general trade-off; that is, increasing the size of a given cross-sectional profile provides more surface area to block a laser beam but renders the drone less aerodynamic; and that in the absence of additional power, and/or techniques used to render a candidate airfoil more aerodynamic, the desired performance capability for a particular candidate drone may be unavailable (a different Sk-O airfoil might not achieve required speeds).

Preferred embodiments of a Sk-O frame are formed from any suitably hard, durable material such as plastic, composite graphite, fiberglass, etc. These materials are readily available, and those of skill in the art are familiar with the properties of such materials. Other materials are available that would be suitable for embodiments of the subject matter of the disclosure. Examples are wood, metallic materials such as aluminum and magnesium and/or alloys thereof, polycarbonate materials, other composite ceramics, and any other composition or combination of materials capable of being formed into a suitable frame. Those skilled in the art will understand that any suitable material, now known or hereafter developed, may be used in forming the frames described herein. In one embodiment, the Sk-O frame is composed of a lightweight, composite material at least one surface of which advantageously absorbs, and minimally reflects, visible light. In some embodiments the Sk-O frame is composed of solid pyrolytic carbon or coated with pyrolytic carbon material. In some embodiments approximately half of the Sw-O drones in a swarm have frames composed of or coated with a relatively paramagnetic material and the other approximately half of the drones in such swarm have frames composed of or coated with a relatively diamagnetic material, and the drones in such swarm are generally disposed when stationkeeping such that each Sw-O drone is adjacent only to drones of a differing type of frame material.

In terms of its general exterior shape a single blocking object has a number of characteristics usable to develop tunable parameters used by the invention. A primitive single blocking object (hereafter "O" for "Object" in "Sk-O" or "Sw-O") admits of a three-dimensional, generally unitary physical shape (i.e., it is recognizable as a geometric primitive, e.g. sphere, cylinder, torus, disc, cube, oloid, or else is recognizable as a generally simple first-order derivation therefrom) which is treated herein as a transversely viewed 2D cross-sectional region describable with conventional techniques of algebraic geometry. The invention uses two different types of Os. The first type is a "skeining" drone ("Sk-O") and the second is a "swarming" drone ("Sw-O"). The general shape of the Sk-O is optimized for blocking a laser beam with the Sk-Os deployed relatively far from the beam source and relatively close to the cockpit (relative as compared to the general operational area of the Sw-O drone type), while the general shape of the Sw-O is optimized for blocking a laser beam when its formation (swarm) is disposed relatively near to the beam source (as compared to the general operational area of the Sk-O drone type). Sk-Os block beams nearer to a targeted cockpit while Sw-Os block the beam closer to the beam source via interposing a specialized swarm formation between the cockpit and the beam source and intelligently swamping the relative general vicinity (essentially, as close as it can get thereto, within acceptable safety parameters) of the beam's source via use of the disclosed flight control method. Unless otherwise specified, however, the methods described herein treat WINGs (not individual drones) as blocking objects.

What determines whether Sk-Os and Sw-Os are role-optimized, however, depends upon more than just shape and cross-sectional profile. These are flying objects which must achieve and maintain significant speed to fly an in-route-modifiable course, and execute maneuvers calculated to maintain blockage of a beam. The shapes are considered initially as simple airfoil bodies which must achieve and maintain required velocities and accelerations over operationally definable flight regimes. Preferably, Sk-O frames are oloids whose measured extent when disposed in flight is larger vertically than horizontally, and to which fixed port and starboard wings are attached.

With further regard to FIG. 6, view 600B shows various perspectives on a typical preferred oloid-shaped Sk-O frame (two-dimensional views of a three-dimensional drone frame (fuselage)). 625: top (or bottom) view; 626: side view; 627: oblique view; 628: front (or rear) view; 629: oblique view with perspective cube.

In some embodiments drone frame surfaces are reflective of various color schemes which color schemes are selectable for variable conditions such as weather, time-of-day, and terrain. This will also reduce the likelihood of the system presenting an attractive nuisance to the general public. In preferred embodiments frame sides which face towards the runways are painted so as to afford pilots a useful but not distractive view of Sk-drones. For example, Sk-Os protecting the port side of a runway can be rendered drab blue on their own port side (to minimize visibility from the beam source direction during late afternoon hours on clear days) and by contrast identifiably marked in a conspicuously noncamouflaged manner (e.g. striping, contrast, symbols) on their starboard side for easier sighting by pilots and ground-based human administrators.

Figure 7:
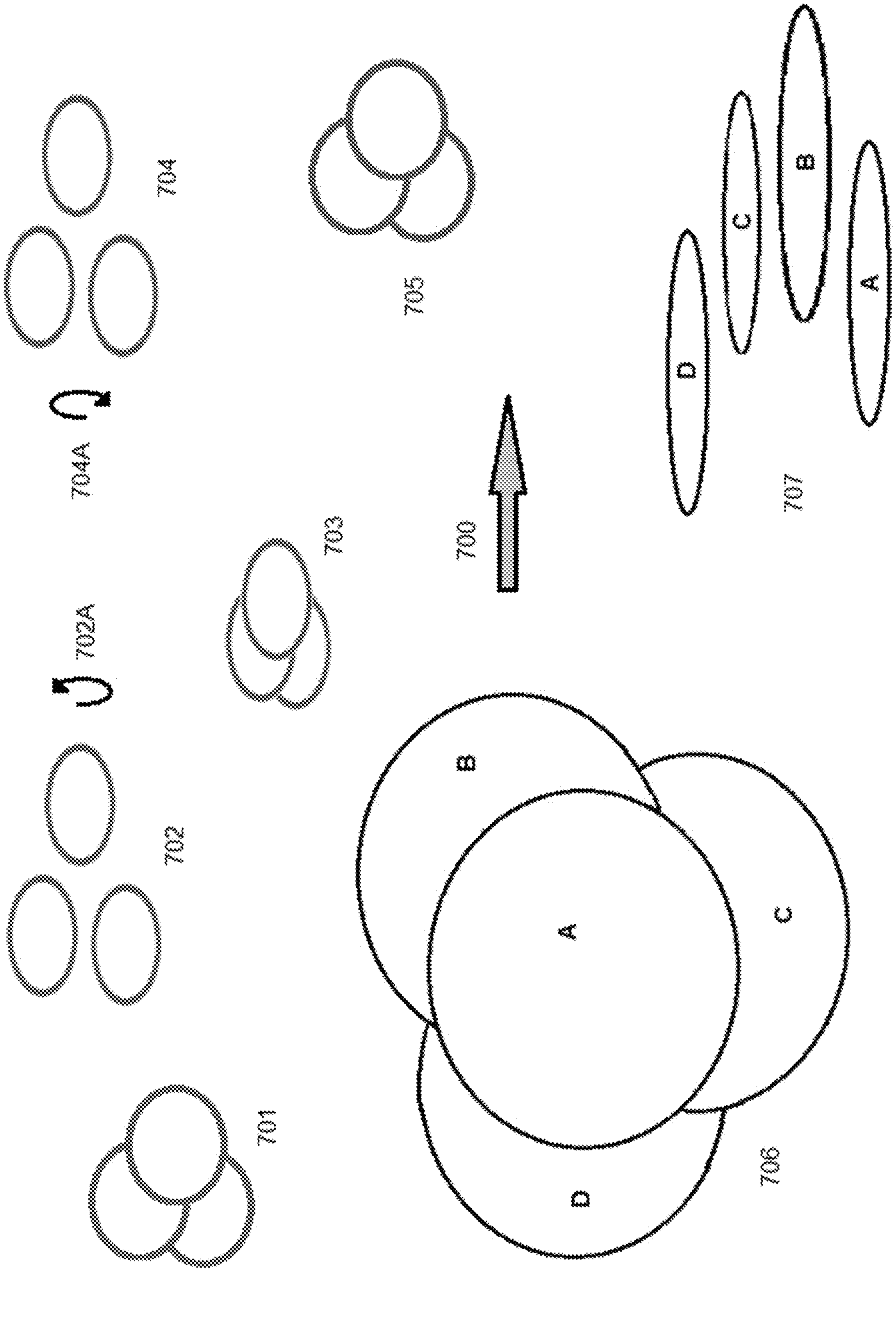
FIG. 7 shows five views of a skeining drone WING (Sk-WING) composed of three Sk-Os and shows two views of a Sk-WING composed of four Sk-Os.

FIG. 7 shows five views of a skeining drone WING (Sk-WING) composed of three Sk-Os and shows two views of a Sk-WING composed of four Sk-Os. Directional arrow 700 indicates direction of flight for all drones and drone formations depicted in FIG. 7.

With further regard to FIG. 7, side view 701 shows a desired formation for a three-drone Sk-WING. Redundant (overlapping) coverage is provided for beam blockage with maximal overlap near the center of the formation. Side view 702 shows the three Sk-Os of view 701, but with flattened transverse horizontal profiles due to the Sk-Os banking slightly into a crosswind. Side view 703 shows the three Sk-Os of view 702, but the Sk-Os have re-formed to provide maximal overlap near the center of the formation during the sustained crosswind. Side view 704 shows the three Sk-Os of view 703, but the crosswind has relaxed and the formation is shown with flattened transverse horizontal profiles because the Sk-WING is re-forming to its original shape. Side view 705 shows the Sk-WING back to the original shape also shown in view 701.

With further regard to FIG. 7, the Sk-WING of view 701 is generally disposed in an optimal shape for beam blocking during flight in the direction indicated. For cases involving VTOL aircraft such as helicopters, the Sk-WING would be disposed differently e.g. it would be depicted in FIG. 7 as flying downward and would be rotated 90° clockwise. During normal flight, the Sk-WING is subjected to a crosswind (not shown) which causes the Sk-WING to drift from its flight plan and in a direction toward the subject aircraft (not shown) for example toward the observer of FIG. 7. To compensate for such crosswind, the advent of which was detected by local sensors, CCCL informs DGCL of the crosswind data (speed and direction) and DGCL commands the Sk-WING to increase the pitch of all Sk-Os in a direction away from the aircraft, which direction is shown by arrow 702A. Increasing pitch of the Sk-Os causes the Sk-WING to present correspondingly flattened profiles athwart the beam, shown in view 702 within which view 702 the Sk-Os are depicted as relatively separated for visual convenience. Because the crosswind is somewhat sustained, the Sk-WING with its flattened profiles re-forms to optimize overlapping coverage as shown in view 703. As the crosswind relaxes, CCCL so informs DGCL and the Sk-WING is commanded to increase pitch of its Sk-Os in a direction toward the aircraft, which direction is shown by arrow 704A. Gust rejection is completed when the crosswind disappears, and the Sk-WING re-forms to its original shape as shown in view 705.

With further regard to FIG. 7, side view 706 shows a desired formation for a four-drone Sk-WING. Redundant (overlapping) coverage is provided for beam blockage with maximal overlap near the center of the formation. Top view 707 shows the same four-drone Sk-WING of side view 706 but shows the Sk-WING in top view. Clearance between Sk-Os is approximately three drone-spans.

With further regard to FIG. 7, side view 706 shows Sk-O 'A' as the Sk-LEAD (closest to the subject aircraft), "B" is a follower Sk-O forward of Sk-O 'A', and follower Sk-O 'C' lags both Sk-LEAD 'A' and follower Sk-O 'B'. Follower Sk-O 'D' lags Sk-LEAD 'A', follower Sk-O 'B' and follower Sk-O 'C'. Top view 707 shows the same four-drone Sk-WING of side view 706, with Sk-LEAD 'A' closest to the aircraft, Sk-O 'B' depicted slightly larger than Sk-LEAD 'A' to indicate that Sk-O 'B' is located slightly above Sk-LEAD 'A', Sk-O 'C' depicted slightly smaller than Sk-LEAD 'A' to indicate that Sk-O 'C' is slightly below Sk-LEAD 'A', and Sk-O 'D' depicted as sized similarly to Sk-LEAD 'A' to indicate that Sk-O 'D' is flying at approximately the same height (altitude) as Sk-LEAD 'A'. Gust rejection is accomplished by a four-drone Sk-WING in a manner similar to that described above for a three-drone Sk-WING; however, Sk-WINGs with increasingly larger numbers of Sk-Os (e.g. as in FIG. 8 below) must be governed by collision avoidance algorithms which generally admit of increasing safe distances used for keeping the Sk-Os spaced widely enough apart.

Figure 8:
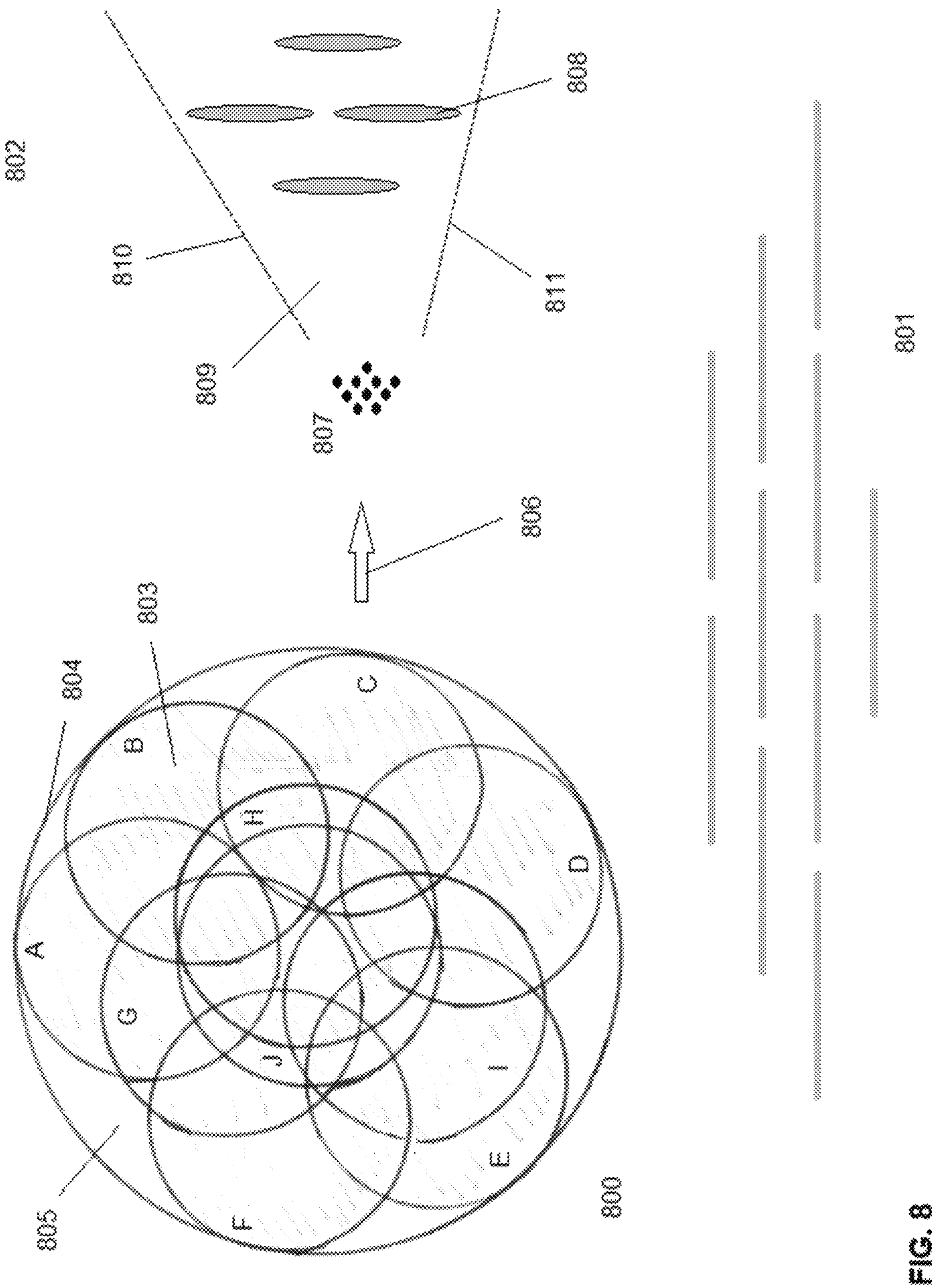
FIG. 8 depicts various views of an exemplary formation for a Sk-WING comprising ten Sk-O drones.

FIG. 8 depicts various views of an exemplary formation for a Sk-WING comprising ten Sk-O drones. Circular area 800 is a side view of 2D cross-sectional area representative of a 10-drone Sk-WING 804 with maximal 2D cross-sectioning of each of the WING's Sk-Os. The cross-sections are not to scale because a subset of the WING is located slightly further from the perspective's POV, but for simplicity are shown as being of equal size; actual cross-sections in the aft part of the WING are slightly smaller than are actual cross-sections located forward (toward an observer). Cross-section 803 is typical. Circular area 800 indicates the desired outer extent of the maximum cross-sectional area which the Sk-WING should occupy. At any given time during a NUP Mode run, Sk-WING 801 might cover the full extent of circular area 800, however due to wind gusts, instrumental jitter, communication latencies, and other factors it is likely that Sk-WING 801 will cover most but not all of circular cross-sectional area 800 and suffer from gaps as shown. Gap 805 illustrates that beam blocking redundancy is higher nearer the center of the formation (as viewed from the perspective afforded). View 801 is a top view of a Sk-WING 804 showing the tops of the Sw-Os as idealized 2D cross-sections. View 802 shows beam 806 as it travels toward a deployed Sk-WING 807 (consisting of ten Sk-Os). Four of the ten Sk-Os are further shown as a subgroup 808 in order to depict blocking coverage redundancy (overlap) with respect to the beam's direction. Conic section 809 is indicated by bounding dotted lines 810 and 811 and generally depicts both beam dispersion and the extent of beam blocking by deployed Sw-WING 807.

The CCCL can for example derive and transmit a DITCH command which overrides all DFP-based navigational instructions being currently executed by all Sk-Os of a WING which DITCH command instantly causes the Sk-Os to dive and fly in a direction generally opposite of that being flown by the protected aircraft and return to base ("DITCH mission"). Alternatively, the DITCH command could switch the Sk-Os' motors off ("DITCH flight"). In some embodiments, a human administrator is stationed on the ground, near one or more subject runways, and via a handheld remote defeat switch can cause one or more Sk-WINGs to ditch its flight plan and either return to base or simply turn away from a deemed potential collision. In such embodiments, a human administrator preferably observes a single Sk-WING and via a joysticked controller may ditch or nudge the Sk-WING in any desired direction as long as the resulting flight would not violate any collision avoidance restrictions performed by LIDAR and would not violate any airfield area geofencing (for example, flying into areas outside of the AOPs) used in the method. Hand gesture control of individual drones is well known in the art of control systems and has recently been extended to collision-free control of both autonomous and semi-autonomous drone swarms, including via use of a priori models which improve method performance over time via known techniques of machine learning. In some embodiments a conventional joystick is used with appropriate modifications for use over six degrees of freedom. In some embodiments a joystick is not used, and an equivalent or superior baseline functionality is achieved via use of a specialized hand controller similar to that described in U.S. Pat. No. 10,990,190 (Hand sensing controller). In some embodiments such equivalent or superior baseline functionality is achieved via use of a handheld flexible sensor utilizing methods similar to that described in U.S. Pat. No. 10,928,180 (Flexible deformation sensor). By way of nonlimiting example in some embodiments a slow "pinching" gesture may be both recognized and translated via known methods adaptable to the present invention so as to uniformly decrease the distance between all stationkept drones of a controlled semiautonomous swarm, subject to damping methods and restriction methods whereby a user-supplied minimum threshold distance (required for collision avoidance) is maintained. In such embodiments the pinching gesture is subordinated to collision avoidance measures which take precedence, such as geofenced restrictions and any LIDAR-supplied indications of proximity to known airfield structures such as buildings, fences, towers, etc. Similarly, a "nudge" gesture (such as a fast, brief open-palm hand movement in a user-determined direction) may be recognized and translated so as to cause a stationkeeping swarm to move a user-determined distance (e.g. 0.5 meters) in the direction of the nudge and successive nudge gestures may thereby be used to effect such motion with user-determined granularity. In some embodiments a rapidly raised single clenched first comprises a signal which commands a swarm to scrub its instant mission and return to base, and two rapidly raised clenched fists comprises a signal which commands a swarm to ditch its instant mission and effectuate instant shut-off of the motor of each swarm drone. In some embodiments a human field controller can slam his or her hand into a touchpad to cause such ditch command(s) and also yell NO-NO-NO-NO into an audio receiver for the purpose of redundancy. In some embodiments colored gloves are used rather than naked hands. In some embodiments a multi-modal control method is used which comprise a combination of methods known in the art of control systems, including but not limited to hand gestures, speaking sounds into a microphone or other audio receiver, touching a touchpad, and direct brain interface to the control hardware, which multimodal control method exploits one or more advantages of each type of component control.

Figure 9:
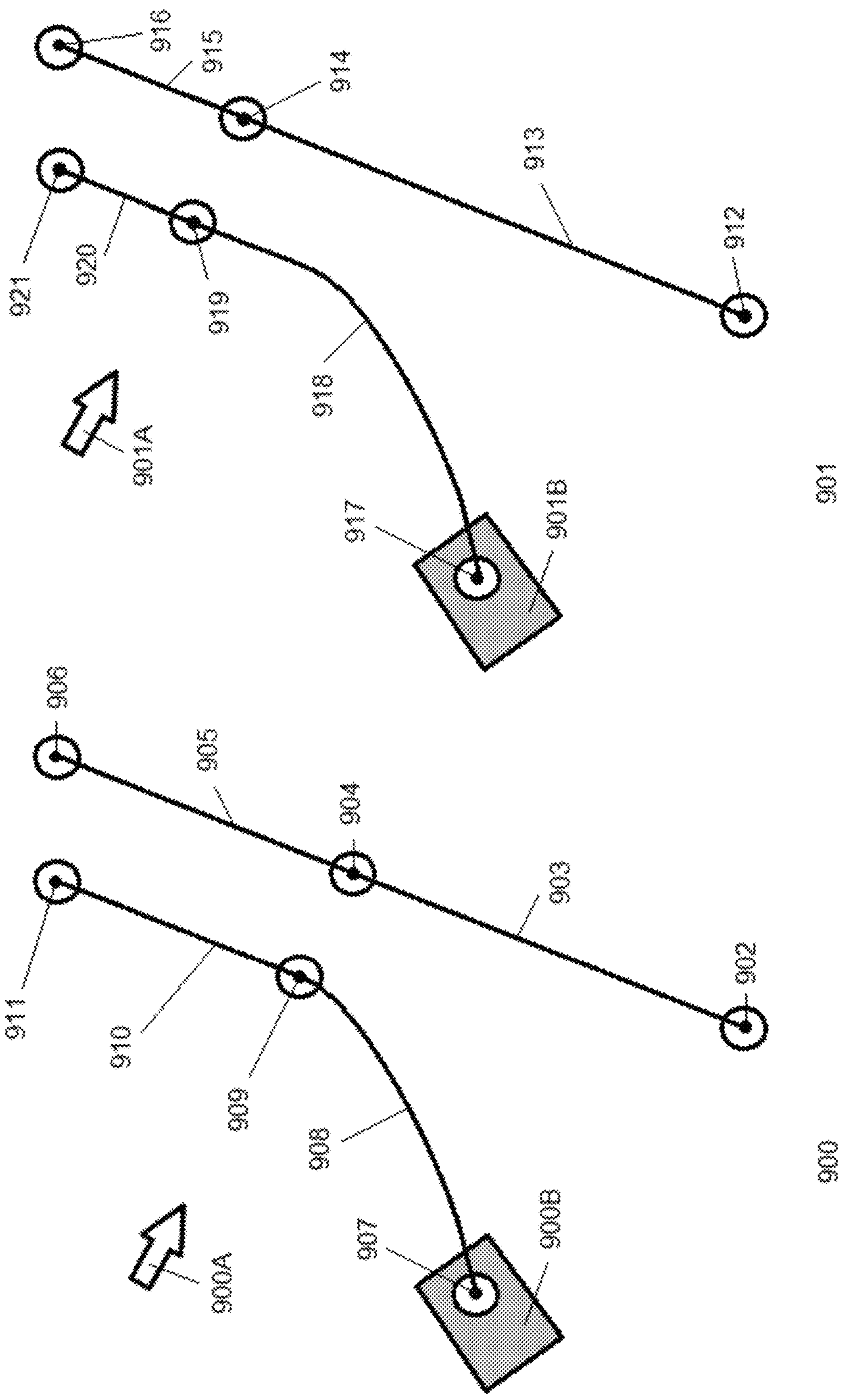
FIG. 9 is a drawing of two different typical aircraft approach paths analyzable by the system to determine if each approach path can be protected by a Sk-WING and/or Sw-WING(s).

FIG. 9 is a drawing of two different typical aircraft approach-to-landing flight paths analyzable by the system to determine if each approach path can be protected by a Sk-WING and/or a Sw-WING. Airfield areas 900 and 901 contain flight paths 906 and 916, respectively, which flight paths are flown by two different inbound aircraft whose approach-to-landings begin at locations 902 and 912, respectively. Prevailing wind directions 900A and 901A characterize airfield areas 900 and 901, respectively. Flight path 903 courses as a straight line beginning at P-P-O location 902 through and including middle location 904 and terminating at ending location 906. Flight path 913 courses as a straight line beginning at P-P-O location 912 through and including middle location 914 and terminating at ending location 916. Flight sub-path 905 begins at P-P-O location 904 and terminates at ending location 906, and is contained within flight path 903. Flight sub-path 915 begins at P-P-O location 914 and terminates at ending location 916, and is contained within flight path 913.

As further seen in FIG. 9, Sk-WING launch pad 900B within airfield environs 900 is a ground-level flat launching surface preferably composed of any suitable durable non-magnetic material and in preferred embodiments includes an adjacent shock absorbing surface (landing pad; not shown) for drone landings. Sk-WING launch pad 900B contains location 907 as the beginning point of a Sk-WING flight path 908 that courses through middle location 909 and terminates at ending location 911. Sk-WING launch pad 901B contains P-P-O location 917 as the beginning point of a Sk-WING flight path 918 that courses through middle location 919 and terminates at ending location 921. Sk-WING flight sub-path 910 begins at P-P-O location 909 and terminates at ending location 911, and is contained within flight path 908. Sk-WING flight sub-path 920 begins at P-P-O location 919 and terminates at ending location 921, and is contained within flight path 918.

CCCL calculates a line-of-sight shortest distance path which in FIG. 9 is depicted as line segment 906 which segment begins at point 902 and ends at point 903. Line segment 906 is termed the Vulnerability Segment and represents a line traversing from the then-current location of the cockpit to and including the (calculated) TDP point.

CCCL calculates whether any available Sk-WINGs and/or Sw-WINGs can be usefully interposed itself at any point along the Vulnerability Segment (calculated line segment 906 in FIG. 9).

A subset segment of the Vulnerability Segment is calculated as the Protectable Segment which in FIG. 9 is shown as line segment 904 which segment begins at point 905 and ends at point 903. As part of Template DFP set construction, system administrators will have previously determined a minimum threshold distance (termed the Threshold Value, as measured from the TDP point) below which system engagement is deemed not worth the risk in certain situations and the method is therefore not used. Threshold Values are hard-coded into the templates and can vary significantly according to the individual runway in use, type of aircraft being protected, and other variables including but not limited to numerical values associated with weather conditions. By way of example, for a typical length runway upon which a Learjet 45 is attempting a 2,000 FT (short-field) landing, protecting only the final 10% of a Vulnerability Segment might be deemed not worth the risk of a Sk-WING launch although one or more less risky Sw-WINGs might be deemed useful. The calculable objective is to cause the involved Sk-WING to block the beam by flying along the Protectable Segment. Optimal flight is generally parallel to the aircraft's path although in some cases Sk-WINGs may be directed to drift gradually toward the beam source.

If the Protectable Segment is greater than or equal to the Threshold Value, CCCL calculates one or more Intercept Flight Plans ("IFPs") and sends generated IFPs as commands to DGCL which IFPs the DGCL translates into a sequence of navigational commands for transmission to one or more Sk-Os. Each involved Sk-WING thereafter flies an Intercept Pattern (IP) which (unless required to be modified by in-route MFPs) terminates as the final waypoint of the WING's current DFP.

Figure 10A:
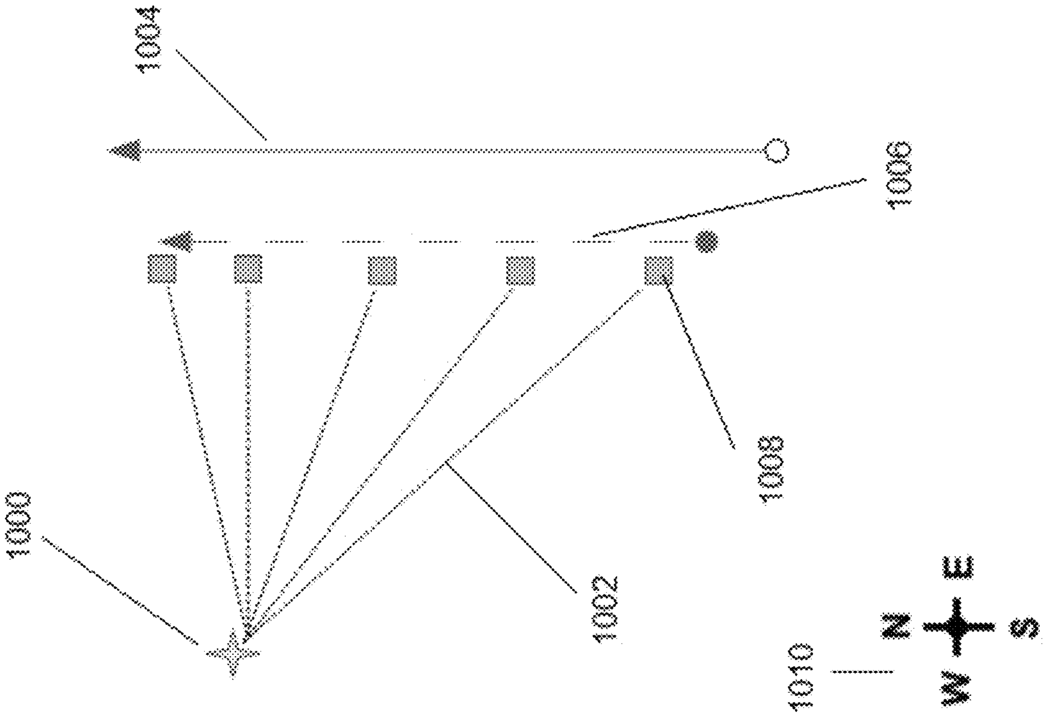
FIGS. 10A and 10B represent bird's-eye views from above a single airfield area which views occur at different times.
Figure 10B:
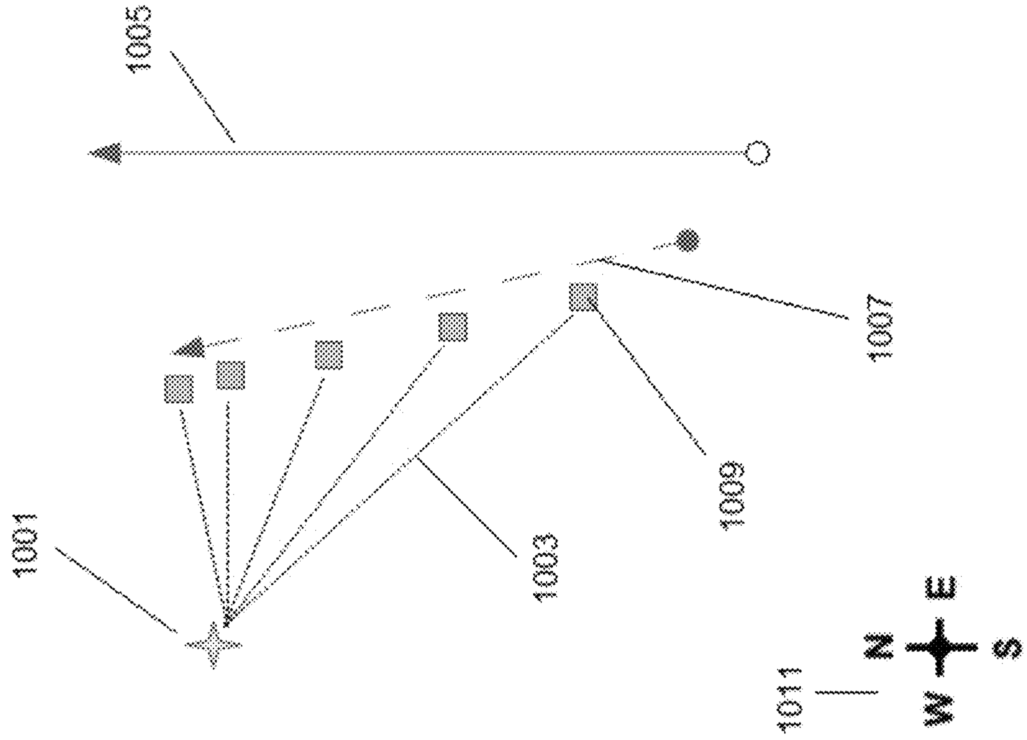

FIGS. 10A and 10B represent bird's-eye views from above a single airfield area which views occur at different times. As seen in FIG. 10A, beam source 1000 emits beam 1002 which is wielded in a generally horizontal, one-way single sweeping motion as depicted via five ray segments each originating at beam source 1000 and terminating at one of five small gray squares each of which squares represents a separate and distinct location of Sk-WING 1008 as along its flight path and while subject to beam strike. The segment(s) of flightpath throughout which a subject aircraft is vulnerable to attack from a known beam location is termed the beam sweep profile and depends upon the beam source location, and current position, bearing, and rate of descent of the subject aircraft as well as any obstacles which block the beam. As further seen in FIG. 10A, aircraft flight path 1004 is an approach-to-landing path of an inbound aircraft which aircraft flight path is represented as a ray segment beginning at the aircraft (depicted as a small white circle) and terminating at its directional arrow. Sk-WING 1008 has a Sk-WING flight path 1006 which Sk-WING flight path is represented by the dotted-line ray segment beginning at Sk-WING 1008 (shown as a small gray circle) and terminating at its directional arrow. Aircraft flight path 1004 and Sk-WING flight path 1006 course parallel with respect to one another. As seen in FIG. 10B, beam source 1001 emits a beam 1003 wielded in a horizontal, one-way single sweeping motion (generally south-to-north athwart an eastern horizon). As further seen in FIG. 10B, aircraft flight path 1005 is represented as a ray segment beginning at the aircraft (depicted as a small white circle) and terminating at its directional arrow. Sk-WING 1009 has a Sk-WING flight path 1007 which Sk-WING flight path is represented by the dotted-line ray segment beginning at the Sk-WING (shown as a small gray circle) and terminating at its directional arrow. Sk-WING flight path 1007 courses generally north-by-northwest and generally diverges with respect to aircraft flight path 1005.

With further regard to FIG. 10A, Sk-WING 1008 is shown as the termination point of beam 1002. Sk-WING 1008 is understood to be depicted as being in five different locations which represent its position when viewed at five successive points in time. In FIG. 10B, Sk-WING 1009 is similarly depicted at five successive points in time. Due to the aerodynamic performance requirements of Sk-Os, the Sk-O geometry is less able to block a hostile beam at the first of the five locations depicted as positions of Sk-WING 1008 (the angle of incidence of a beam emanating from beam source 1000 will result in less WING surface area exposable for blocking at the first location, which is furthest from beam source 1000, than will the other locations whereat with respect to the beam the WING presents a more perpendicularly disposed blocking surface). For this reason, it is deemed that Sw-WINGs may provide better coverage than Sk-WINGs during the early phase of Sk-WING interceptive flight, and that both types of WINGs are required for optimal coverage.

Figure 11A:
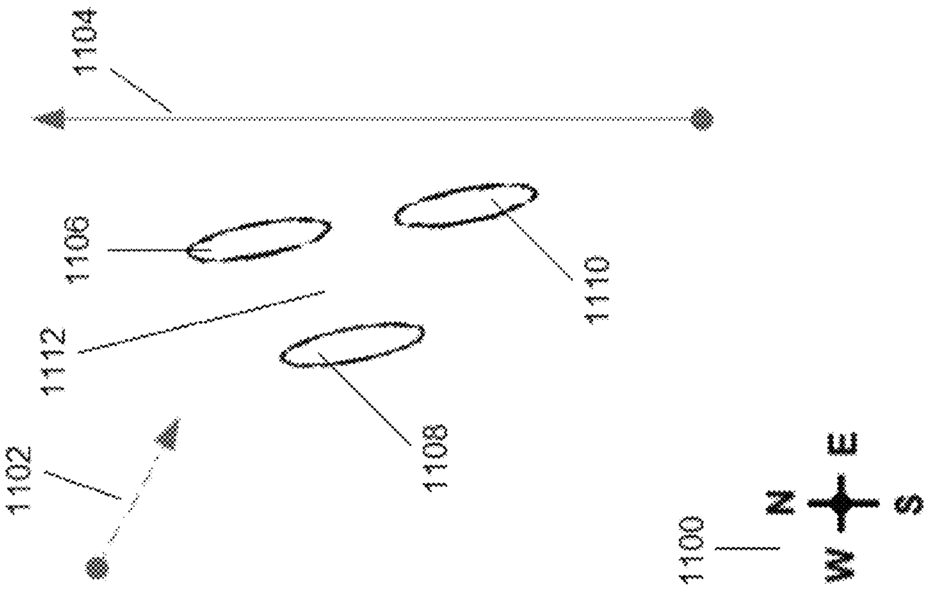
FIGS. 11A and 11B represent bird's-eye views from above a single airfield area.
Figure 11B:
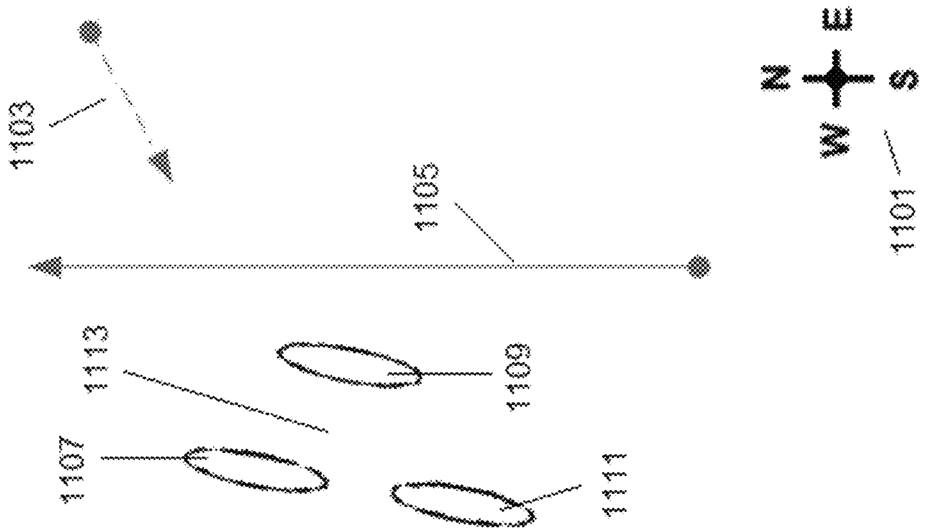

FIGS. 11A and 11B represent bird's-eye views from above a single airfield area. As seen in FIG. 11A, orientation indicator 1100 shows N-S-E-W directions. Aircraft flight path 1104 courses in a S-N direction. Prevailing wind 1102 is shown as a directional dashed arrow and bears upon Sk-WING 1112 in a generally SE direction. Sk-WING 1112 comprises three Sk-O drones 1106, 1108, and 1110 and its leader drone is designated Sk-LEAD 1108 (Sk-O 1106 and Sk-O 1110 are "follower drones"). Although Sk-O 1106 and 1110 are follower drones, in FIG. 11A Sk-O 1106 "leads" Sk-LEAD 1108 along the axis of travel in the same sense that Sk-O 1110 "lags" Sk-LEAD 1108 along the axis of travel. (It is to be noted that a follower drone may have either a positive offset value or a negative offset value with respect to its leader drone.) As seen in FIG. 11B, orientation indicator 1101 shows N-S-E-W directions; aircraft flight path 1105 is identical to the aircraft flight path 1104 shown in FIG. 11A; prevailing wind 1103 bears upon Sk-WING 1113 in a generally SW direction; Sk-WING 1113 comprises three Sk-O drones 1109, 1111, and 1113 and its leader drone is designated as Sk-LEAD 1109 (Sk-O 1107 "leads" Sk-LEAD 1109 along the axis of travel and Sk-O 1111 "lags" Sk-LEAD 1109 along the axis of travel).

Figure 12:
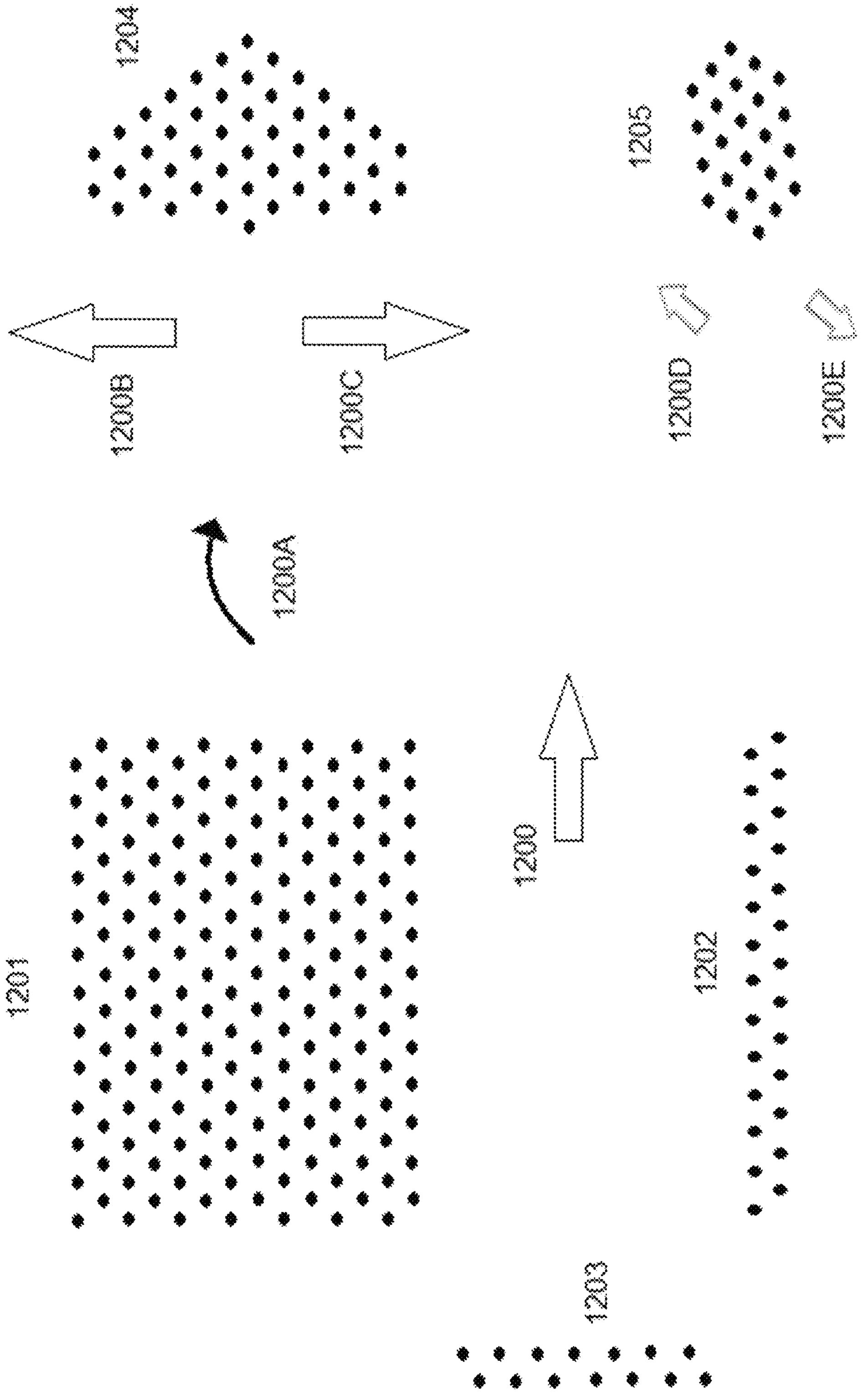
FIG. 12 depicts several views of a Sw-WING swarm in two different formations.

FIG. 12 depicts several views of a Sw-WING swarm in two different formations. View 1201 shows a side view of the Sw-WING as the swarm appears during a normal patrol. View 1202 is a top view of the same Sw-WING. View 1203 is a rear view of the same Sw-WING. Directional arrow 1200 indicates direction of flight for the Sw-WING (with respect to the swarm as depicted in view 1201 and view 1202). The Sw-WING in a patrol formation as shown in views 1201-1203 is generally dispersed in a rectangular grid pattern in order to present a wide target for purposes of beam sighting. For example, all Sk-Os in the Sk-WING may be equipped with low-cost laser warning receivers. View 1204 is a top view of the same Sw-WING but disposed in a generally conic formation. View 1205 is a side view of the same Sk-WING shown disposed in view 1204.

With further regard to FIG. 12, arcing arrow 1200A indicates that the Sw-WING in a patrol formation as shown in views 1201-1203 undertakes an optimized translation of swarm geometry which results in the generally conic formation depicted in view 1204. Because it is unknown (prior to a sighting) which direction a beam source may be located relative to the swarm's current patrol location, in preferred embodiments during normal patrols the Sw-LEAD drone occupies a position nearest the center of the swarm and in the row further from the subject aircraft (and hence closer to the beam than the Sw-LEAD would immediately be were it situated in the row closer to the aircraft). Following swarm translation, however, the Sw-LEAD occupies the position at the vertex (point) of the conic formation and as the swarm ceases horizontal flight and hovers the Sw-WING thereby "points at" the beam source location. Precise vertical and horizontal orientation of the conic formation depends case-by-case upon the location of the aircraft and location of the beam source, but once the swarm begins station-keeping at the initial hover location it will generally be required only to descend gradually (in concert with the subject aircraft's descent) and gradually loiter in the aircraft's direction of landing (e.g. as shown by directional arrow 1200B) however if lateral movement of the beam source is detected the swarm may be required to loiter e.g. in the opposite direction (shown by directional arrow 1200C). Corresponding swarm hover directions for the Sw-WING depicted in view 1205 are shown by directional arrows 1200D and 1200E. Similar follow-the-leader flight commands are used as between swarm flight in normal patrol mode and swarm flight in hovering mode, however the amount of clearance required by collision avoidance algorithms as between Sw-Os in the normal patrol formation is generally larger than the amount of clearance required as between Sw-Os in the stationary (hovering) formation used for optimal beam blocking. Methods for follow-the-leader flight planning and navigation are known in the art and described generally in C. Rice, et al., "Autonomous Close Formation Flight Control with Fixed Wing and Quadrotor Test Beds".

Figure 13:
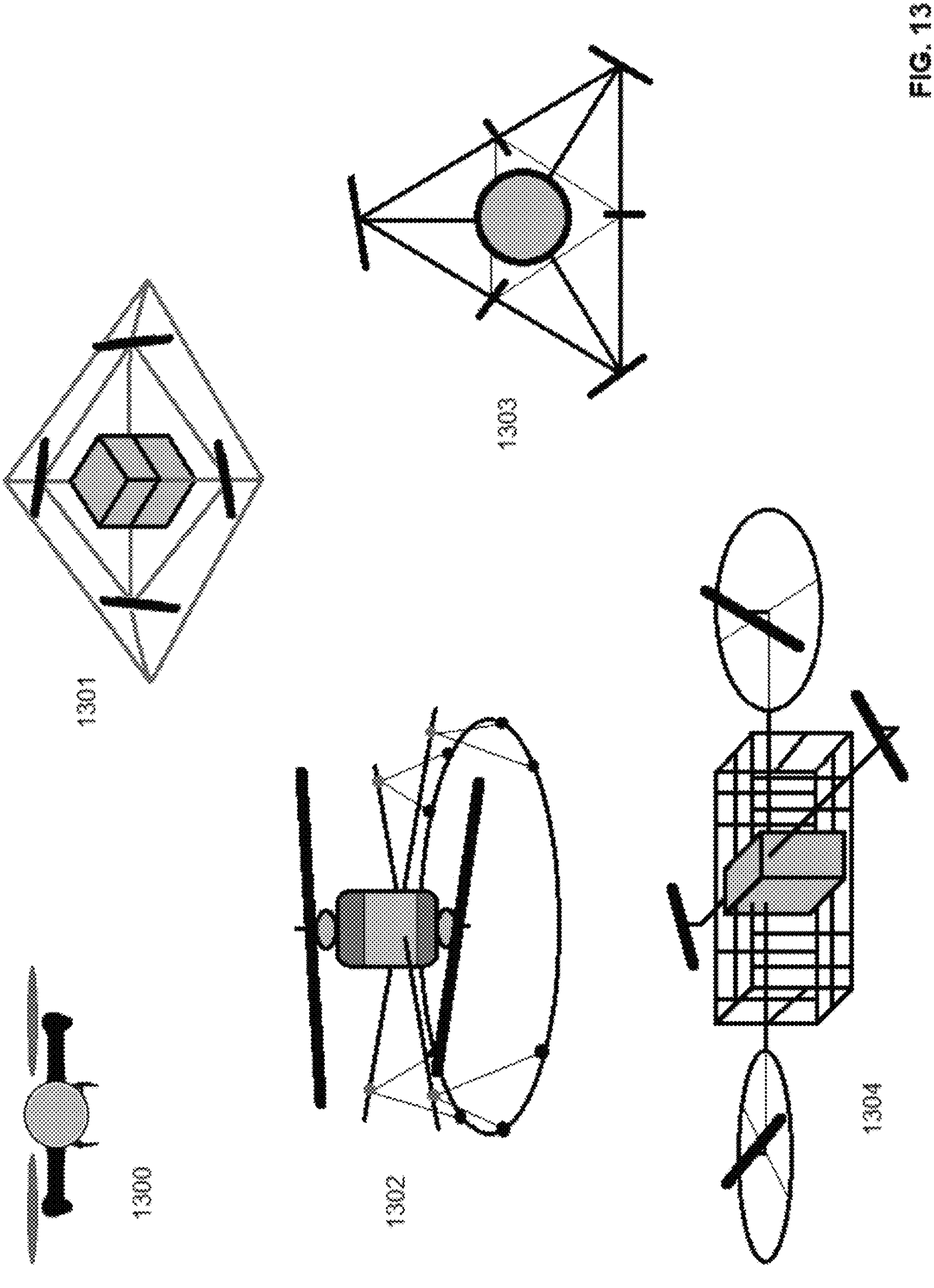
FIG. 13 depicts preferred swarming drones (Sw-O type). Five different geometries are shown.

FIG. 13 depicts types of preferred swarming drones (Sw-Os). Five different geometries are shown. Geometry 1300 depicts a generally conventional quadcopter drone. Geometry 1301 depicts an unconventional quadcopter similar to an X4 (StarMAC II). Geometry 1302 depicts an unconventional bicopter capable of thrust, roll, pitch, and yaw from only two motors. Drone geometries 1303 and 1304 are especially useful for maintaining stability in higher winds. Geometry 1303 depicts a type of unconventional quadcopter similar to a known design similar to an X4. Geometry 1304 depicts a coaxial hexacopter optimized for high-wind environments. In preferred embodiments Sw-Os have a frame design generally similar to that of geometry 1304 (unconventional coaxial hexacopter configuration with three counterrotating bottom-side propellers equally offset from three topside propellers) with at least an inner body portion of the drone fuselage (frame) adapted from an oloid shape which approaches a perfect sphere.

A good present candidate (with appropriate modifications) for a Sw-O is the X4 (STARMAC II) or a Perdix. The Perdix drone for example is capable of a maximum speed of approximately 70 KAS which is considered suitable for the Sw-O role.

Figure 14:
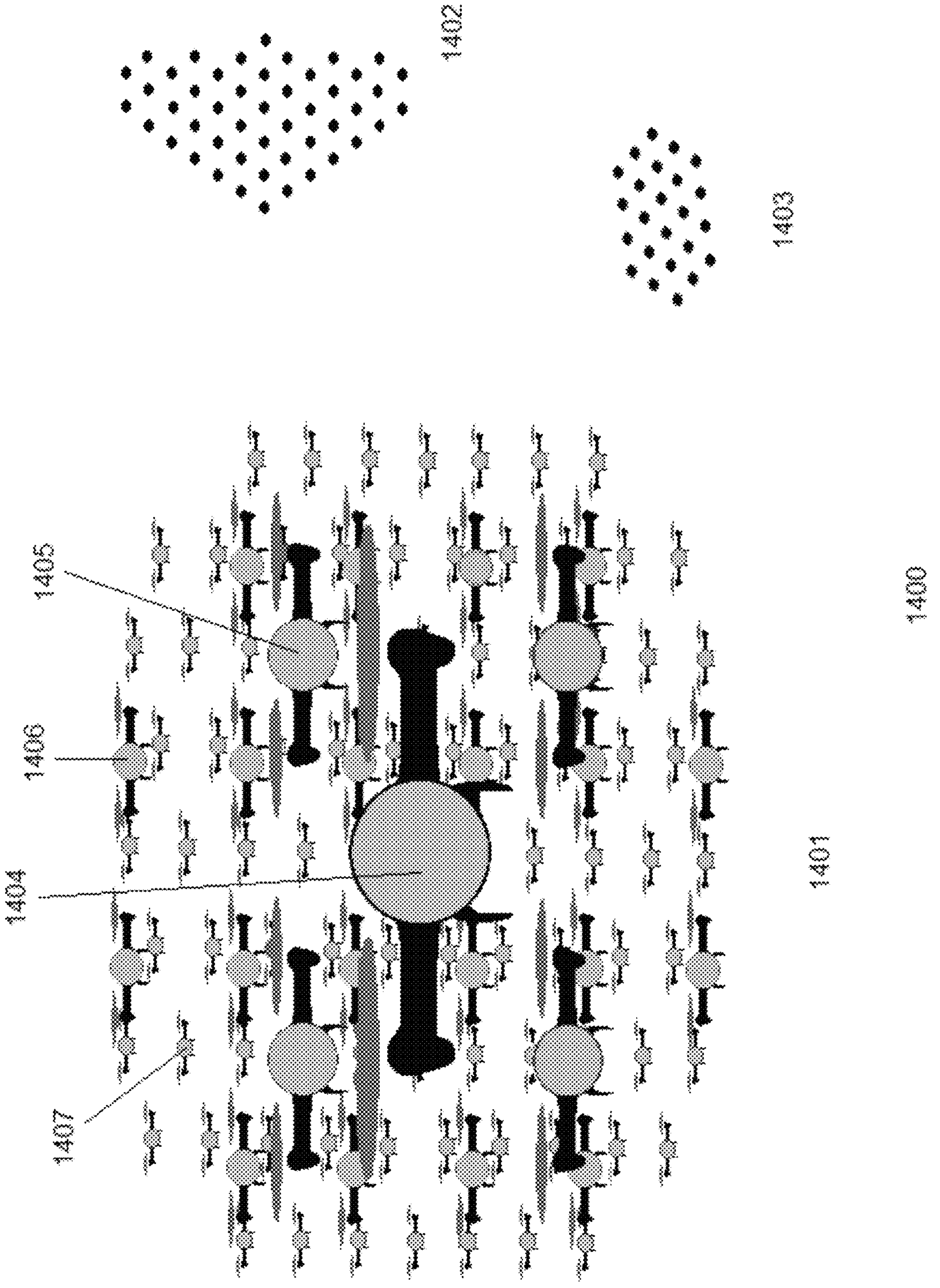
FIG. 14 depicts a Sw-WING formation comprising a plurality of Sw-O drones.

FIG. 14 depicts a Sw-WING formation comprising a plurality of Sw-O drones (three different views are shown). The Sw-O drones comprising Sw-WING 1400 are disposed in a roughly pyramidal cone formation with its vertex intended to point outward (away from) a runway. View 1401 is a frontal view of the first four rows (only) of Sw-WING 1400, which includes one Sw-LEAD 1404 (1 row, 1 column); four secondary Sw-Os (2 rows, 2 columns); nine tertiary Sw-Os (3 rows, 3 columns); sixteen quaternary Sw-Os (4 rows, 4 columns) for the 30-drone (partial) Sw-WING. Larger WINGs can be appropriate multiples required for any generally pyramidal shape given desired overlapping (redundant coverage), and subject to spatial restrictions imposed by the AOPs locations of the particular airfield area. The number of rows need not equal the number of columns. View 1402 shows an oblique sidelong view of Sw-WING 1401. View 1403 is a side view (eleven columns) and based on symmetry could also represent a top or bottom view. Optimal swarm dimensions will vary by individual airfield areas but could span for example 48' width, 16' height, and 32' depth.

In some preferred embodiments a linear algorithm is used to optimize swarm convergence upon a beam source. Collision avoidance clearance between Sw-Os is approximately five drone-spans.

With further regard to FIG. 14, the various views of Sw-O 1400 show that Sw-O forms a flying wedge which forms up and converges on the beam source and optimally blocks the beam by occupying a hybridized conic (seen from view 1402) and trapezoidally prismatic (seen from view 1403) region such that with each successive row/column an increased number of Sw-Os are positioned along the beam path. How dense a swarm cone must be for optimal blocking of beams given the general dispersion (sparsity) required for collision avoidance depends on: prevailing wind speeds, number of drones comprising the Sw-WINGs, and various other factors unique for each airfield area. The swarm can rapidly pounce to the desired (optimal beam-blocking) hover location by flying not in a simple horizontal translation en masse, but rather in a way such that Sw-Os located outermost from the beam source fly faster around the swarm center of mass and the Sw-Os re-form into a cone at the hover location. This optimized swarm "pouncing" is however subject to collision avoidance algorithms which ensure safe movement of large swarms.

Figure 15:
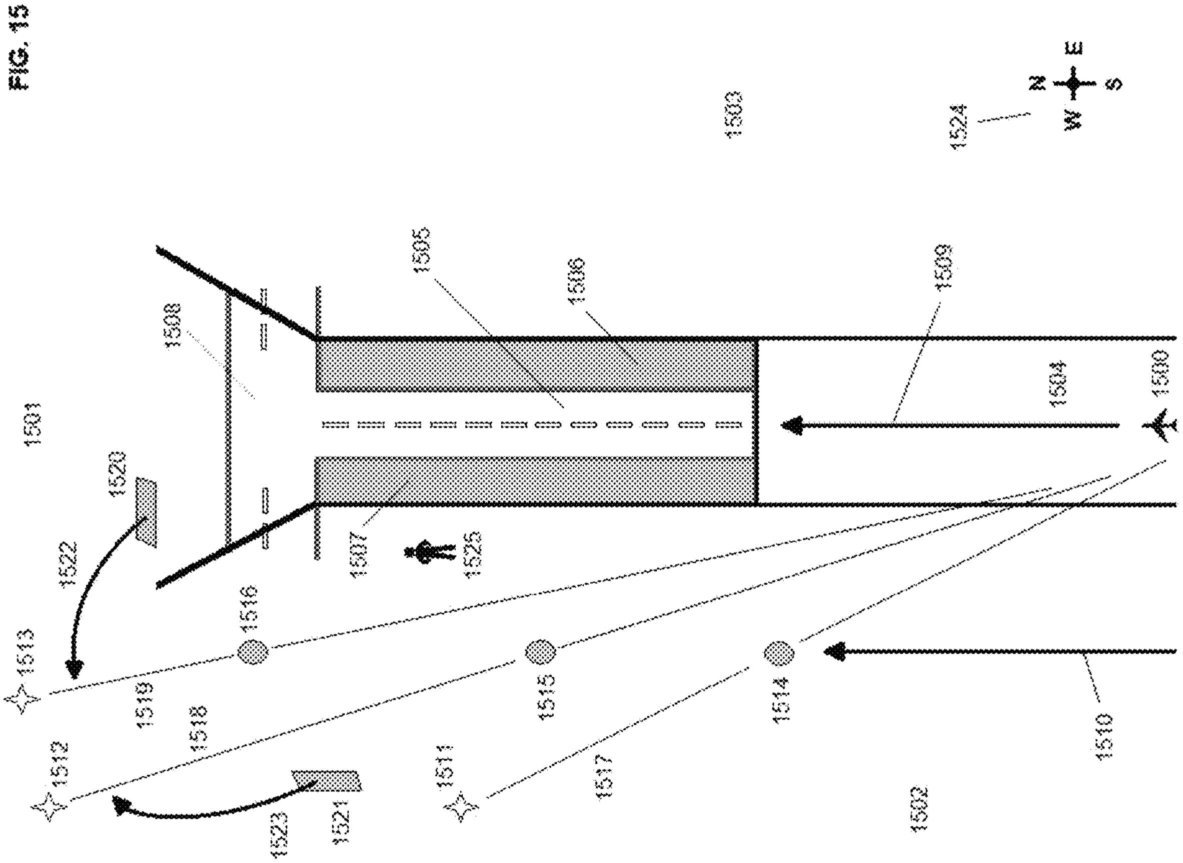
FIG. 15 depicts a bird's-eye view of an airfield area, with an aircraft on final approach and protectable by use of an O-GROUP comprised of one Sk-WING and a plurality of Sw-WINGs.

FIG. 15 depicts a bird's-eye view of an airfield area with an aircraft 1500 on final approach and deemed to be protectable by use of an O-GROUP comprised of one Sk-WING and a plurality of Sw-WINGs. With regard to FIG. 15, aloft airplane 1500 has a heading of 0° (North) on final approach path 1509 within AOPs-S 1504 over the airfield area. Forward from the vantage point of aircraft 1500 are AOPs-F 1502 and runway 1505. AOPs-P 1503 and AOPs-S 1504 are located port and starboard, respectively, of aircraft 1500. Aprons 1506-1507 flank runway 1505. Intersection 1508 terminates runway 1505 and is used for aircraft taxiing. Sk-WING flight path 1510 courses roughly parallel to that of aircraft final approach path 1509. Ground locations 1511-1513 represent three different possible beam source locations from which laser beam paths 1517-1519 can emanate, respectively. All three beam source locations are susceptible to WING operations undertakable exclusively within AOPs-P. Airspaces 1514-1516 represent three different possible positions for a Sk-WING in SEP mode over the airfield area. Sw-WING launch facilities 1520-1521 comprise two separate launch pads and equipment therefor. Sw-WING flight paths 1522-1523 are paths usable by two different Sw-WINGs (not shown) which Sw-WINGs are stationed at Sw-WING launch facilities 1520 and 1521, respectively. Orientation indicator 1524 shows N-S-E-W directions.

With further regard to FIG. 15, human field controller 1525 is stationed within AOPs-P with a controller module (not shown) in order to co-control either Sw-WING operable within AOPs-P. In some embodiments human field controller 1525 also has the ability to cause an Sk-WING (not shown) to terminate a current mission mid-flight and cause such Sk-WING to return to base or, at said human controller's option, cause such Sk-WING to shut-off all its Sk-Os' power.

In preferred embodiments, unless a specific airfield area layout dictates otherwise every AOPs-F is usable by Sw-WINGs and by Sk-WINGs, every AOPs-S and every AOPs-P are usable both by Sw-WINGs and Sk-WINGs, and every AOPs-A is unusable by either type of WING except e.g. if system administrators desire to re-position a WING between different AOPs areas.

Figure 16:
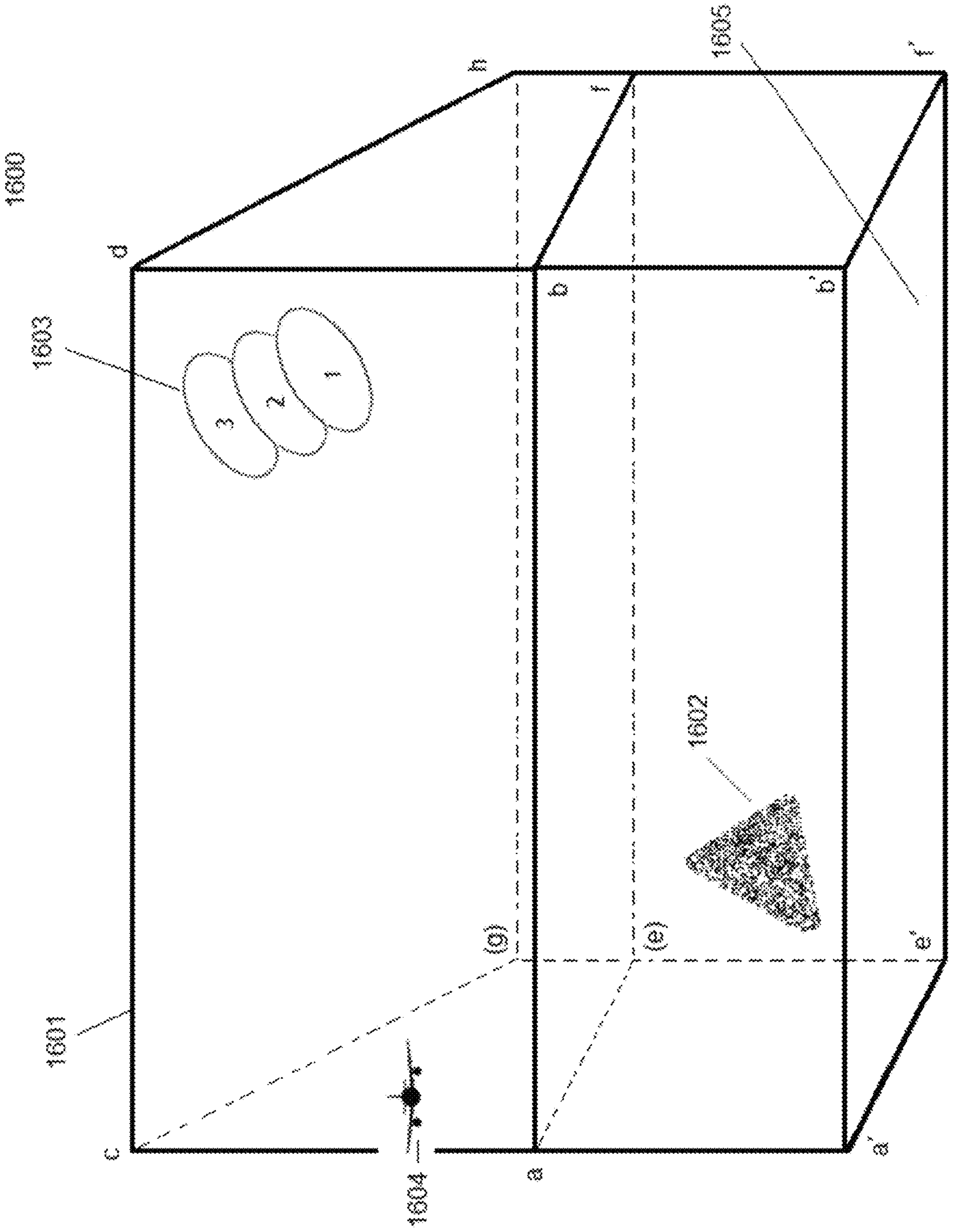
FIG. 16 depicts a Sk-WING and a Sw-WING deployed in near-earth airspace above a typical airfield area.

FIG. 16 depicts a Sk-WING and a Sw-WING deployed in near-earth airspace above a typical airfield area. Spatial region 1600 depicts a 2D-view of a three-dimensional bounded region of airspace generally symmetric about its volumetric center-point and within which various elements operate above a portion of an airfield area. Airspace 1601 is defined by the block region displayed having corner points a-h as shown which map (via dotted rearward lines 1610-1612) directly onto a rectangular region 1605 of ground area defined by points (a', b', e', f'). Airspace 1601 is representative of airspace located above a typical runway and aprons. Corners (e) and (g) are labeled parenthetically to indicate non-visibility due to rearward positioning in the perspective view provided. Sw-WING 1602 and Sk-WING 1603 operate within airspace 1601. Trailing plane 1604 has a forward view of airspace 1601. Airspace 1601 is contained within an AOPs-P in which Sw-WING 1602 is disposed toward the left edge of airspace 1601 and Sk-WING 1603 is disposed at a higher altitude and toward the rightmost outer edge of airspace 1601.

Communication between central control (system administrators and/or CCCL) and O-GROUPs active in airspace 1601 occurs as follows. CCCL uses two separate communication channels, one between CCCL and Sk-WINGs (via DGCL) and one between CCCL and Sw-WINGs. These communication channels are used to transmit flight commands (via DGCL) to active WINGs, and for active WINGs to transmit flight data either directly to CCCL or via DGCL. Additionally, two special dedicated communication channels may exist between CCCL and each WING as high-priority channels in case a DITCH signal needs to be transmitted, in case a skein or swarm should begin to drift in an unsafe direction, violate geofencing restrictions, experience impending collision, or suffer from perceived mechanical malfunction. Such dedicated communication channels are direct (not via DGCL) and high-priority in terms of all concurrent threading and scheduling undertaken with respect to other channel traffic and computing operations being carried out by any and all mission-engaged drones. Another channel may exist between the aircraft cockpit and either or both WINGs however it is surmised that the only cockpit channel in operation would be with the Sk-WING, either for launching or ditching but probably only the latter. Whether or not a capability for aircraft pilots to cause a Sk-WING to DITCH is intentionally left unreduced to practice pending field testing. All communication channels rely for security upon device identification ("device ID") and device fingerprinting as further described below.

Geofencing may be implemented via a number of non-mutually exclusive means. Drone adherence to GPS waypoints while the invention is operative is itself a form of geofencing, with COTS GPS components offering 30 cm accuracy and use of a geofence-driven killswitch. Geofencing proper may be implemented by hard coding the GPS boundaries of all restricted areas of a subject airfield, which is done in preferred embodiments. Geofencing can also be accomplished via use of wireless transmitters and receivers, with a plurality of Wi-Fi transceivers strategically distributed about the airfield area in accordance with known methods. In this manner, authorized wireless access points indicate their wireless access point identifiers for WINGs (or, in some embodiments, for WING LEADs) which interrogate the wireless access points. Wireless access point identifiers can include the Extended Service Set Identification (ESSID), Internet Protocol (IP) address, Media Access Control (MAC) address, and/or a device fingerprint of the wireless access point. In one preferred embodiment, the wireless access points transmit their wireless access point identifiers which identifiers are recognized by operative WINGs. Device ID is used for communication security and enables methods by which geofencing is used for collision avoidance.

To meet expected safety requirements and to meet performance requirements, all drones used in the inventive method utilize device identification ("device ID") and zone-restricting logic. The zone restricting logic can determine whether an IDU is located within the restricted access zone, or outside the restricted access zone. Based on the location of the IDU, the zone restricting logic can, for example, shut off the drone's motor and cause it to ditch. As another example, the zone restricting logic can, based on an IDU's GPS or waypoint location, permit it to continue in flight.

Digital fingerprints are known and described e.g., in U.S. Pat. No. 5,490,219. A digital fingerprint is herein a unique identifier of an onboard individual computing device of an individual drone unit (or "IDU") that identifies unique individual components of hardware and/or software and/or the system configuration of the drone's Engine Control Unit (ECU). A digital fingerprint or "device fingerprint" (or "IDU fingerprint") may comprise a bit string or bit array that includes or is derived from user-configurable and non-user-configurable data specific to the IDU. Non-user-configurable data includes data such as drone model numbers, serial numbers, and version numbers, drone date of manufacture, drone motor speed in rated RPMs, FAA drone aircraft class, hardware component model numbers, serial numbers, and version numbers, and hardware component parameters such as processor speed, voltage, current, signaling, and clock specifications. User-configurable data includes data such as registry entries including but not limited to a User ID and a password. In an embodiment, a device fingerprint can include, for example, drone manufacturer name, drone model name, drone ECU serial number, a User ID, and a strong User Password.

Generation of a drone's device fingerprint may include a combination of operations on the data specific to the drone being fingerprinted, which may include processing using a combination of: sampling, concatenating, appending (for example, with a nonce value or a random number), obfuscating, hashing, encryption, subjection to physically unclonable functions and/or subjection to randomization algorithms to achieve a desired degree of uniqueness. For example, the desired degree of uniqueness may be set to 99.999999% or higher, to achieve a probability of less than 1 in 100,000,000 that any two IDUs will generate identical device fingerprints. In addition, it is possible to periodically generate new device fingerprints for use with the methods disclosed, for example as device components degrade over time and thus may provide different values as input to digital fingerprint generation processes and corresponding device identification and authentication processes, the changed values may be utilized for periodic re-fingerprinting. It is verifiable that no two IDU fingerprints are identical as between any drones used at a single airfield area, and as part of the procedure for entering Ready Mode all device IDs are verified and remain constant (until and unless recalculated during Maintenance Mode) and unique.

To determine the location of an IDU, the zone restricting logic can utilize information contained in the zone data. The zone data can include authorized wireless access points identifiers, and a predetermined threshold of authorized wireless access points identified. Optionally the zone data can also include a predetermined signal strength threshold.

In one embodiment, the application logic of the CCCL is executable software stored within the memory thereof. The CCCL functions as an OODA (Observe, Orient, Decide, Act) loop decision engine informed by all flight data transmitted from drone instruments described in FIG. 6 while a WING is flying a selected template-based flight plan. The CCCL decision engine algorithms coded therein are limited by precedential algorithms for collision avoidance which are based on zone data and zone restricting logic stored in the CCCL's addressable memory. Various IDU functional capabilities may be locked or unlocked based on the location of the IDU. Such features are termed restricted capabilities. For example, the restricted capabilities may include restricting the IDU from entering airspace located anywhere beyond the borders of airspace 1601. The IDU will operate normally within an AOPs, whereas if IDU is located outside the restricted access zone, the IDU will be subject to real-time course correction commands including but not limited to a command to ditch its mission or ditch its flight.

The IDU can also include a zone restricting logic and a zone data. The zone restricting logic can determine whether the IDU is located within a restricted access zone, or is located outside of a restricted access zone. Based on the location of IDU, its and/or the CCCL's zone restricting logic can enable the zone mode of IDU, thereby enforcing those restricted features of the IDU.

FIG. 17 is a SIPOC diagram of a preferred method for operating a Sk-WING. Processes set 1700 describes core processes for operating a Sk-WING. Process 1701 provides that CCCL can verify that the Sk-WING is maintaining its template-based time-controlled flight path and CCCL can derive flight commands required to position the Sk-WING back on course given its template. Process 1701 provides that CCCL maintains a Sk-WING time-controlled flight path by deriving flight instructions for transmission to DGCL, the instructions being derived using one or more of: GPS data (or similar data from any type of usable positioning system) characterizing the aircraft, the beam source location, and the Sk-WING; binary flags (e.g. Sk-LEAD is "ON COURSE" or "OFF COURSE" with respect to the Sk-WING's DFP; or, COLLISION WARNING is "ON" versus "OFF"); and numerical values for navigational variables such as aircraft AG altitude, aircraft bearing, aircraft rate of descent, aircraft attitude, Sk-O AG altitude, Sk-O bearing, Sk-O rate of descent, Sk-O attitude, prevailing wind speed, prevailing wind direction, desired Sk-O airspeed, desired Sk-O attitude, desired Sk-O bearing, desired Sk-O motor temperature, desired Sk-O motor RPMs, desired Sk-O attitude of flight, last Sk-WING waypoint traversed, next Sk-WING waypoint to be traversed, and successive Sk-WING waypoints to be traversed. Real-time values for Sk-O airspeed, Sk-O bearing, Sk-O rate of descent, Sk-O attitude, Sk-O motor temperature, and Sk-O motor RPMs, are reported to CCCL by the WING (either directly or via DGCL) while operating environment variables such as ambient atmospheric temperature, pressure, and humidity are reported to CCCL via local sensors.

With further regard to FIG. 17, Process 1702 provides that a conversion module (which can be physically located within the CCCL) will convert beam detection data to GPS coordinates, and/or to other useful coordinates relative to a point of reference e.g. relative to PLOT POINT ZERO. Predicted numerical values for detected crosswinds' impending impact timings, directions, durations, and magnitudes are also reported to DGCL by CCCL as part of process 1702. Input data for process 1702 is contained in the CCCL's instructions to DGCL. Process 1703 provides that a Sk-WING will remain on its DFP unless otherwise directed by DGCL which can provide positional data (in the form of template-based waypoints) and command instructions (to fly to and/or through such waypoints) to all Sk-Os in a WING (the Sk-WING may adopt and fly a MFP). Process 1704 provides that an input of beam detection may trigger launch of a Sk-WING by a system administrator. Process 1705 provides that an Sk-O or a system administrator may terminate the Sk-WING's mission by causing a RETURN TO BASE command or a RETURN TO PATROL command to be executed by a Sk-WING for example to avoid time-of-flight restrictions or due to a perceived mechanical malfunction. Alternatively, a Sk-WING may be directed by a system administrator to fly a new patrol rather than its previous patrol. Process 1706 provides that an Sk-WING or a system administrator may terminate the Sk-WING's flight by causing each Sk-O to execute a DITCH command for example to avoid an impending collision, to avoid violating geofencing-restricted airspace, to avoid time-of-flight restrictions, or due to a mechanical malfunction.

FIG. 18 is a SIPOC diagram of a preferred method for operating a Sw-WING. Processes set 1800 describes core processes for operating a Sw-WING. Process 1801 provides that CCCL can verify that the Sw-WING is maintaining its event-controlled flight path and CCCL can derive flight commands required to position the Sw-WING on a different course given occurrence of one or more events (typically, lateral movement of a beam source). Process 1801 provides that CCCL maintains a Sw-WING time-controlled flight path by deriving flight instructions for transmission to DGCL, the instructions being derived using one or more of: GPS data (or similar data from any type of usable positioning system) characterizing the aircraft, the beam source location, and the Sw-WING; binary flags (e.g. Sw-LEAD is "ON COURSE" or "OFF COURSE" with respect to the Sw-WING's optimal hovering station; or, COLLISION WARNING is "ON" versus "OFF"); and numerical values for navigational variables such as aircraft AG altitude, aircraft bearing, aircraft rate of descent, aircraft attitude, Sw-O AG altitude, Sw-O bearing, Sw-O rate of descent, Sw-O attitude, prevailing wind speed, prevailing wind direction, desired Sw-O airspeed, desired Sw-O attitude, desired Sw-O bearing, desired Sw-O motor temperature, desired Sw-O motor RPMs, last Sw-WING waypoint traversed, next Sw-WING waypoint to be traversed, and successive Sw-WING waypoints to be traversed. Real-time values for Sw-O airspeed, Sw-O bearing, Sw-O rate of descent, Sw-O attitude, Sw-O motor temperature, and Sw-O motor RPMs, are reported to CCCL by the WING (either directly or via DGCL) while operating environment variables such as ambient atmospheric temperature, pressure, and humidity are reported to CCCL via local system sensors.

With further regard to FIG. 18, process 1801 generally provides that following report of a beam a Sw-LEAD is directed to place its Sw-WING into a determined location and desired swarm configuration. This is initially accomplished simply by directing the Sw-WING to fly based on the appropriately selected template. The selected template supplies the waypoints required for the Sw-WING to fly the calculated intercept course until and unless the Sw-WING must be directed otherwise based on sensor inputs provided to and analyzed by CCCL. The CCCL receives various system inputs including prevailing wind speed and direction, GPS data, event-controlled flight path jitter, time signals. This data is then fused as parameters which are translated into navigational commands based on adherence to a template and the aircraft's variance (if any) therefrom. E.g.: Sw-WING maintain present altitude and current speed on continued bearing of 240° for 50.00 meters, slow to hover, then loiter in predesignated position with GPS coordinates of (40.748440, −75.984559) and flock in the predesignated swarm formation depicted in FIG. 14. In preferred embodiments, as with respect to shared control of Sw-WINGs a human administrator is stationed on the ground, near one or more subject runways, and via a handheld remote defeat switch can cause one or more Sw-WINGs to ditch its current flight plan and either return to base or dive away from an observed potential collision. In such embodiments, a human administrator preferably observes and co-controls only one Sw-WING at a time, using one handheld controller. Multiple active Sw-WINGs are preferably so overseen by equally many human administrators.

With further regard to FIG. 18, Process 1802 provides that a conversion module (which can be physically located within the CCCL) will convert beam detection data to GPS coordinates, and/or to other useful coordinates relative to a point of reference e.g. relative to a designated patrol waypoint. Such coordinates are used to direct the Sw-WING to attain and maintain an optimal hovering station for beam blocking. Station-keeping (gust rejection) is performed independently by the Sw-WING. Input data for process 1802 is contained in the CCCL's instructions to DGCL. Process 1803 provides that a Sw-WING will remain at its hovering station unless otherwise directed by DGCL which can provide positional data (in the form of template-based waypoints) and command instructions (to fly to such waypoints) to all Sw-Os in a WING (the Sw-WING may drift through successive hover stations to counter lateral movement of a beam source). Process 1804 provides that an input of beam detection may trigger launch of a Sw-WING by a system administrator. Process 1805 provides that an Sw-O or a system administrator may terminate the Sw-WING's mission by causing a RETURN TO BASE command or a RETURN TO PATROL command to be executed by a Sw-WING for example to avoid time-of-flight restrictions or due to a perceived mechanical malfunction. Alternatively, a Sw-WING may be directed by a system administrator to fly a new patrol rather than its previous patrol. Process 1806 provides that an Sw-WING or a system administrator may terminate the Sw-WING's flight by causing each Sw-O to execute a DITCH command for example to avoid an impending collision, to avoid violating geofencing-restricted airspace, to avoid time-of-flight restrictions, or due to a mechanical malfunction.

FIG. 19 is a diagram showing a bird's-eye view, from above a typical airfield area and its control facilities, including local Areas of Operations ("AOPs"). FIG. 19 is intended to be representative of an airfield's general operations area; salient features are considered as representing any typical runway facility e.g. at an airport, airbase, airfield, or airstrip. Methods described herein, however, can be adapted for other types of landing areas including but not limited to helipads and similar landing zones. Airfield area 1900 includes administration building 1901 and associated curtilage area 1902; system control facility 1903 within which is housed CCCL 1909; runway 1904; aprons 1906 and 1907; and four local Areas of Operation used by the invention: 1910 (AOPs-P, "P" indicating "Port"); 1911 (AOPS-A, "A" indicating "Aft"); 1912 (AOPs-S, "S" indicating "Starboard"); and 1913 (AOPs-F, "F" indicating "Forward"). These AOPs designations are based on direction of landing (here, eastward as indicated by directional arrow 1914). In some embodiments AOPs designating is configurable in that AOPs may be conveniently renamed, i.e., AOPs-A is renamed to AOPs-F (and vice-versa) and AOPs-P is renamed to AOPs-S(and vice-versa) for example if prevailing wind direction shifts 180° and an aircraft is directed to a different runway.

Control facility 1903 contains various electronic devices used by the CCCL and is typically situated near enough to runways to enable radio communication of a desired strength as between the control facility and active WINGs, given particular distribution of patrol patterns and template-based DFPs for individual airfield areas. CCCL 1909 comprises electronic equipment similar to that described e.g. in Levien, Base Station Multi-Vehicle Coordination (U.S. Pat. No. 9,540,102); however, Levien discloses only a very generic base station and claims circuitry which requires that a UFV (unoccupied flying vehicle) autonomously determines an inability to accomplish one or more portions of a mission. Levien fails to teach or suggest a method for blocking a hostile laser beam.

As seen in FIG. 19, the direction (bearing) of the depicted aircraft's approach and landing are the same i.e. there are no turns in the aircraft's approach, it is simply a straight-ahead approach and landing unlike the left-hand/right-hand traffic patterned approach and landing paths depicted in FIG. 24.

As also seen in FIG. 19, the direction of travel for the Sk-WING is depicted as being parallel to the direction of travel for the approaching/landing aircraft.

Figure 20:
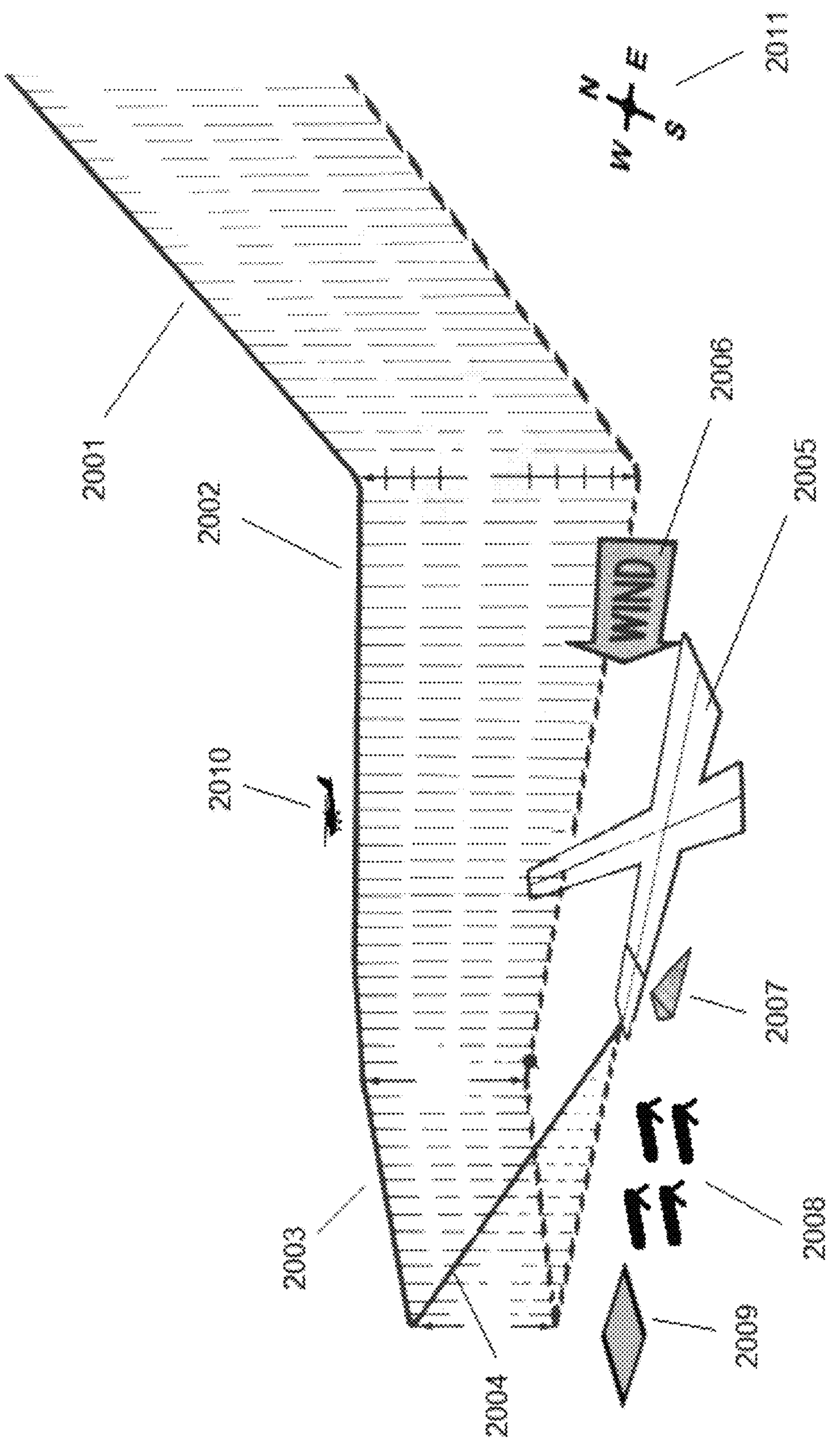
FIG. 20 depicts a control-tower view of a typical airfield area runway which runway is similar to that shown in FIG. 19.

FIG. 20 depicts a control-tower view of a typical airfield area runway similar to that shown in FIG. 19. FIG. 20 is similarly adapted from a COTS illustration. As seen in FIG. 20, 2001 is an entry leg of a typical traffic pattern. 2002 is the corresponding downwind leg. 2003 is the base leg. 2004 is the final approach leg. 2005 is the runway. 2006 is an arrow showing prevailing wind direction (generally westward). 2007 is a directional tetrahedron. 2008 shows four drone catapults used for launching skeining drones. 2009 is a launch pad for swarming drones. 2010 shows an aircraft flying on the downwind leg of the traffic pattern. 2011 is a N-S-E-W directional indicator.

Figure 21:
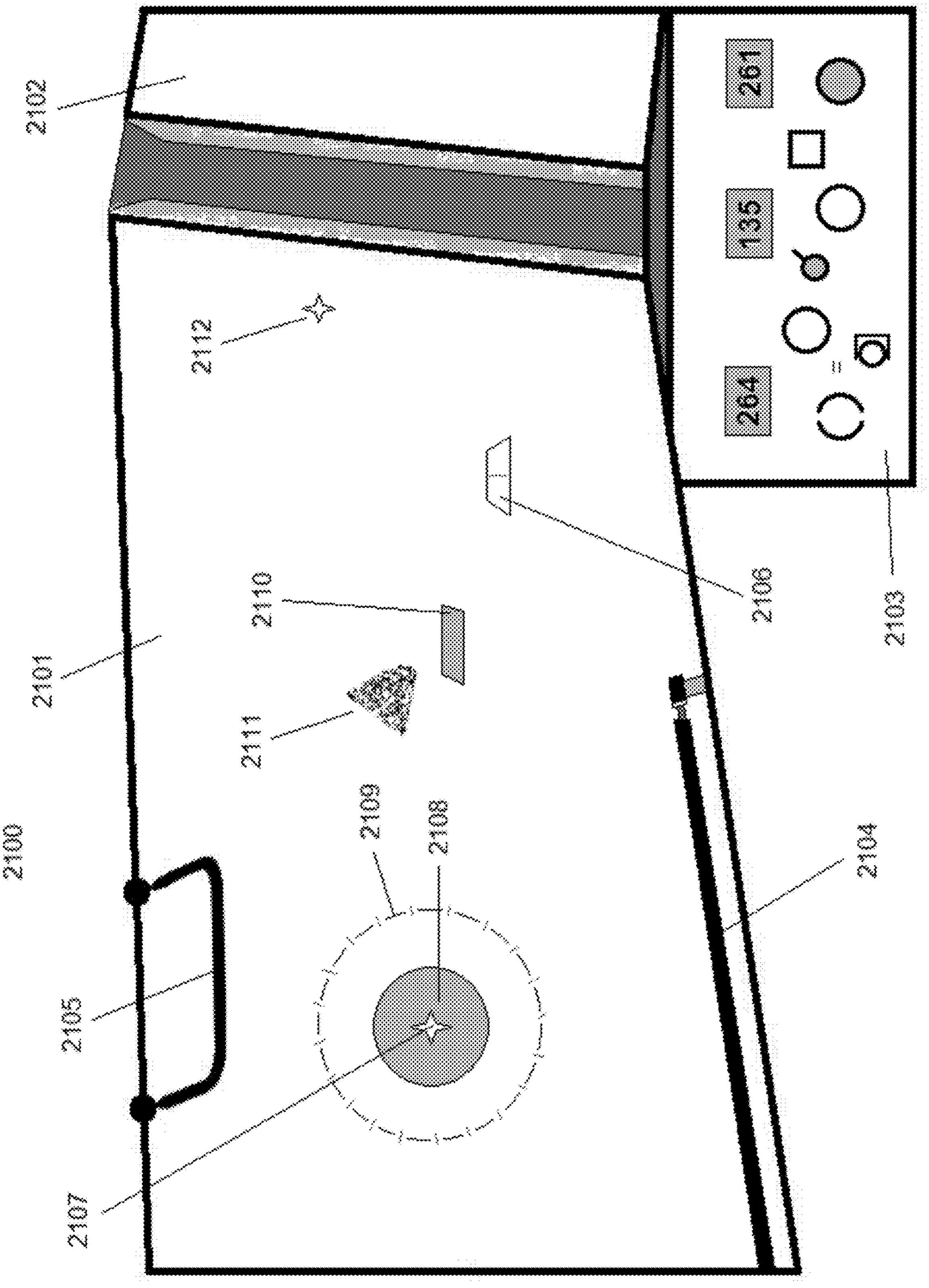
FIG. 21 is a cockpit view depicting what a pilot may sense when the invention operates in an example context.

FIG. 21 is a cockpit view depicting what a pilot may sense when the invention operates in an example context. View 2100 depicts a pilot's-eye view of various features found in a typical inflight aircraft cockpit and of terrain features in or near an airfield area which cockpit and terrain features are visible to a pilot (not shown) who views such features through windshield section 2101. Also shown in FIG. 21 are a portion of windshield section 2102, instrument panel 2103, windshield wiper 2104, and handgrip 2105. Within the pilot's field of vision through windshield section 2101 is runway 2106, beam illumination 2107 emanating from a ground-level beam source (although only drab spot 2108 and possibly 2109 residual glare are visible by the pilot), Sw-WING 2111, and tarmac 2110 from which tarmac 2110 Sw-WING 2111 may be preferably launched and adjacent to which Sw-WING 2111 may be landed on a specialized shock-absorbing pad. Drab spot 2108 is drab to indicate how the pilot sees a Sk-WING. Residual glare 2109 about drab spot 2108 may or may not be seen by the pilot. A second beam illumination 2112 (visible by the pilot) is depicted in the upper right part of the windshield.

With further reference to FIG. 21, in preferred embodiments the pilot can call out a signal to System Control Facility administrative personnel (not shown) which signal informs the personnel and simultaneously informs the CCCL (not shown) of a general location for a suspected hostile beam. By way of example and not limitation, the pilot in FIG. 21 calls out "LASER-LASER, NINE-O'CLOCK" or e.g. "LASER-LASER, PORT SIDE". Pilot callouts are instantly transmitted via audio signal to Control Facility personnel and also signal the CCCL. In preferred embodiments, the system can recognize a variety of similar call-outs (e.g. "LASER, PORT SIDE, NINE-O'CLOCK", LASER-LASER LEFT SIDE") as functionally identical and react appropriately including via use of database techniques such as use of a thesaurus and SQL SOUNDEX (or similar) functionality. This type of very general call-out is intended to be compliant with FAA regulations that pilot distractions be kept to a minimum particularly during a landing phase and that pilots must not be given additional tasks without good reason. It is also in keeping with advisory guidance that pilots do not attempt to precisely discern a beam source's location. In this respect the invention partially mimics current methods which include pilot reporting of hostile beams via use of smartphones. In some embodiments a pilot can simply call out "LASER-LASER" and the system will take an appropriate action(s) based in part upon previously determined likely threat patterns.

With further reference to FIG. 21, following pilot call-out the system SEP Mode is activated either manually by CF personnel or in some embodiments automatically triggered as described above. With the system SEP Mode activated, Sw-WING 2111 launches from tarmac 2110 and begins flying in a controlled formation based on a calculated IFP as described above with respect to FIG. 9. If and as more precise data regarding the beam source location is provided by system sensors, the IFP is correspondingly modified in real time by the CCCL. For example, as a Sw-WING approaches a beam source location and adopts a loitering position it can reduce its size in order to increase its coverage density. In the event more precise data regarding beam source location is not provided to CCCL, or cannot be provided in time for CCCL to calculate and transmit command instructions to DGCL, or if CCCL determines that transmitted instructions cannot be executed in time for a WING to respond as desired, no MFP is transmitted and in FIG. 21 a Sw-WING of default sparsity is deployed. In many cases default configurations of swarms will be useful without modification.

With further reference to FIG. 21, second beam illumination 2112 depicts what causes a pilot to call out e.g. "LASER, TWO O-CLOCK RIGHT, HIGH" in response to a particular additional beam sighting. In preferred embodiments, "middle" is a default range i.e. "LOW" or "HIGH" need be called out specifically else "MIDDLE" will be assumed. "MIDDLE" may be called out specifically but need not be.

For example, a pilot calls out simply "LASER, LEFT, LOW" and the Sw-WING launches. Thereafter, once Sw-WING assumes a near-beam loiter position, in preferred embodiments the Sw-LEAD carries instruments capable of recognizing a photogrammetrically produced mosaic map which enables the swarm to achieve and remain in a desired position. If the pilot had instead called out "LASER, EIGHT-O'CLOCK, LOW" it would indicate a beam sighting more from the port side of the aircraft than from ahead of the aircraft compared to the previous example. In this case, an already escorting Sk-WING launches (or if already loitering, adjusts its flight path) via CCCL commands as described above because a useful Protected Segment was calculated by CCCL. This occurs in addition to a Sw-WING launch. In a preferred embodiment, a pilot can simply gesture (via arm motion) toward a beam location (or simply shields his eyes) while calling out "LASER" and sensors located within the cockpit area e.g. on a flight suit attempt to infer a hostile beam source location at a level of generality similar to that described above for pilot call-outs.

Some of the methods disclosed herein represent not only a potential piloting distraction but also a physical navigational hazard. Pilots must not be unnecessarily burdened or distracted, especially during the approach and landing phases of flight, and FAA guidelines mandate that there be no changes in pilot behavior required, especially during the landing phase, insofar as possible whenever any new technology is introduced to flight operations. In order to keep pilot burden and distraction to a minimum, some preferred embodiments enable system operation only by authorized ground personnel who are on station. In some embodiments no control over the system is given to cockpit personnel. In other embodiments pilots may issue DITCH commands.

Figure 22:
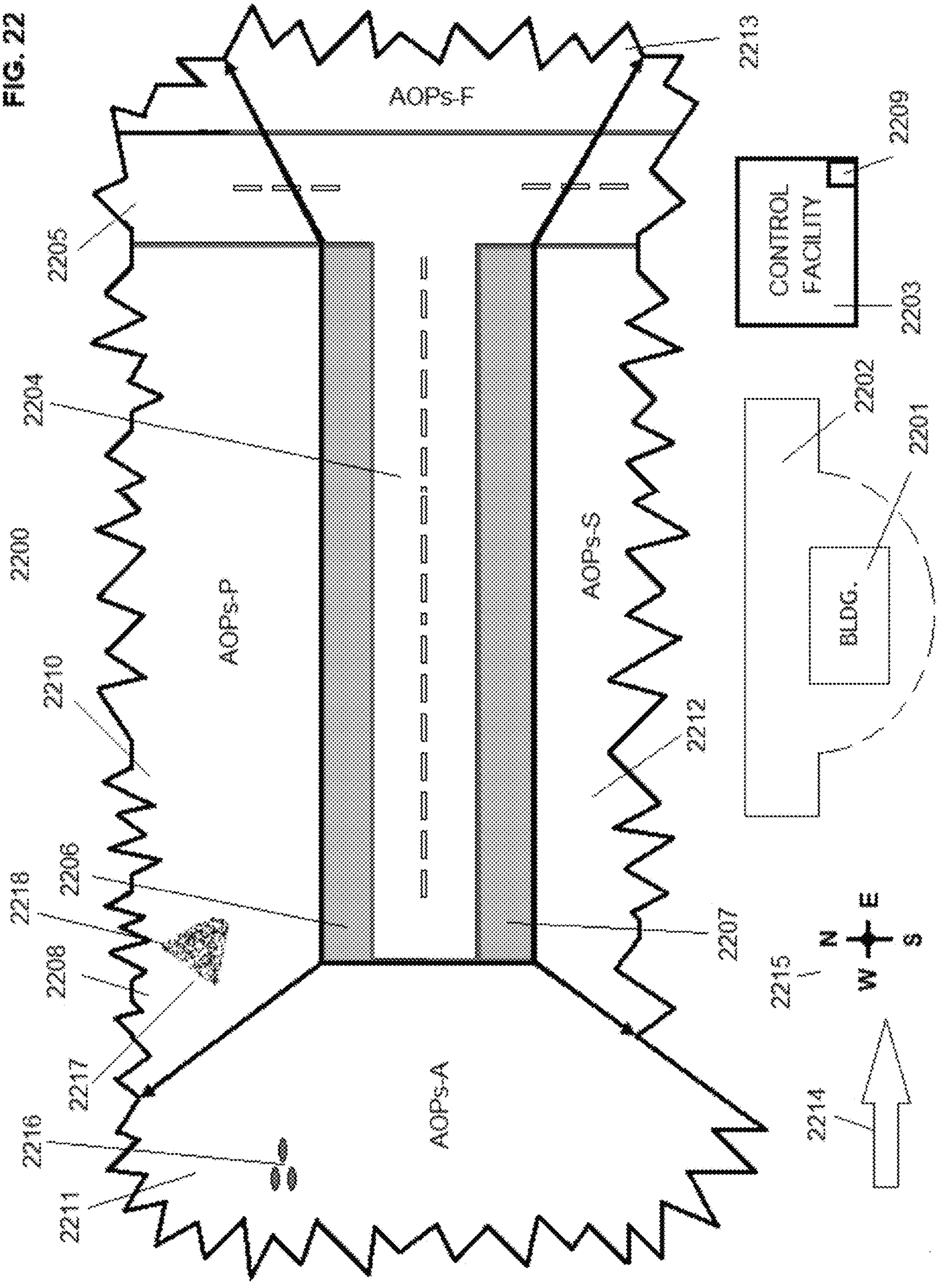
FIG. 22 is a bird's-eye view of an operational O-GROUP comprising one Sk-WING and one Sw-WING above a typical airfield area runway which runway is similar to that shown in FIG. 19.

FIG. 22 is a bird's-eye view from above a typical runway, which runway is similar to that shown in FIG. 19, depicting an O-GROUP comprising one Sk-WING and one Sw-WING. FIG. 22 shows a runway, an administration building, another building which is the Control Facility for the CCCL, and four Areas of Operation (AOPs) designated -A, -F, -P, and -S, respectively (Aft, Forward, Port, and Starboard). The approach direction for landing aircraft is shown such that landing aircraft travel from AOPs-A forward toward AOPS-F. In this configuration, AOPs-A extends backward at 45-degree angular abutment with AOPs-P and AOPs-S; also, AOPs-F represents a custom-shaped region abutting areas AOPs-P and AOPs-S; however, other configurations are possible and it is intended that the invention allow for deployments based upon unique layouts of different airfields.

With further reference to FIG. 22, airfield area 2200 includes administration building 2201 and associated curtilage 2202; system control facility 2203 within which is housed CCCL 2209; runway 2204; aprons 2206 and 2207; and four Areas of Operation "AOPs") used by the invention: 2210 (AOPs-P); 2211 (AOPs-A); 2212 (AOPs-S); and 2213 (AOPs-F). Prevailing wind direction (eastward) is indicated by directional arrow 2214 with respect to directional reference 2215. Also depicted are Sk-WING 2216 and Sw-WING 2217. Sw-WING 2217 is shaped in the form of a cone whose vertex is pointed away from runway 2204 as indicated by vertex indicator 2218.

In FIG. 22, Sk-WING 2216 and Sw-WING 2217 are aloft and deployed in Normal Patrol Mode. Sk-WING 2216 is flying a patrol pattern and Sw-WING 2217 is loitering on patrol. Sw-WING 2217 is disposed generally in the form of a trapezoidal prism. It is to be noted that very complex, highly specific patrol patterns may be utilized and that "loitering" may designate a non-specific, though flight-controlled, mission component which unless otherwise indicated is considered as a type of patrol. FIG. 22 also shows, via directional arrow 2214, prevailing wind direction (coincidentally, aircraft's landing) direction, as well as Sk-WING 2216's direction of flight.

Adjusting of intercept flight plans can be visualized as an analogue of a Boomerang III® system technique for locating the source of conventional arms fire trained against Boomerang-fitted military vehicle (similar to a ShotSpotter® system). The way the invention determines the location of a laser-beam source "visually" is conceptually similar to how a Boomerang system determines a source of conventional fire acoustically (a firearm discharge is located via a specialized triangulation or trilateration method implemented in an apparatus within the locating system; the sound trained upon is the report of the target's ordnance; and the information is used to train counterfire upon the target's estimated position). In one embodiment of the invention, initial determination of a target's position is made solely by a CCCL based solely on sensor data, and the position estimate to-be-transmitted to a WING is thereafter augmented with a determination of beam source location as made by one or more drones using an onboard photogrammetric map against which an illuminating laser position is observed (typically by a lead drone) to contrast, though other drones may also use an onboard map and report locations of beam sources.

Figure 23:
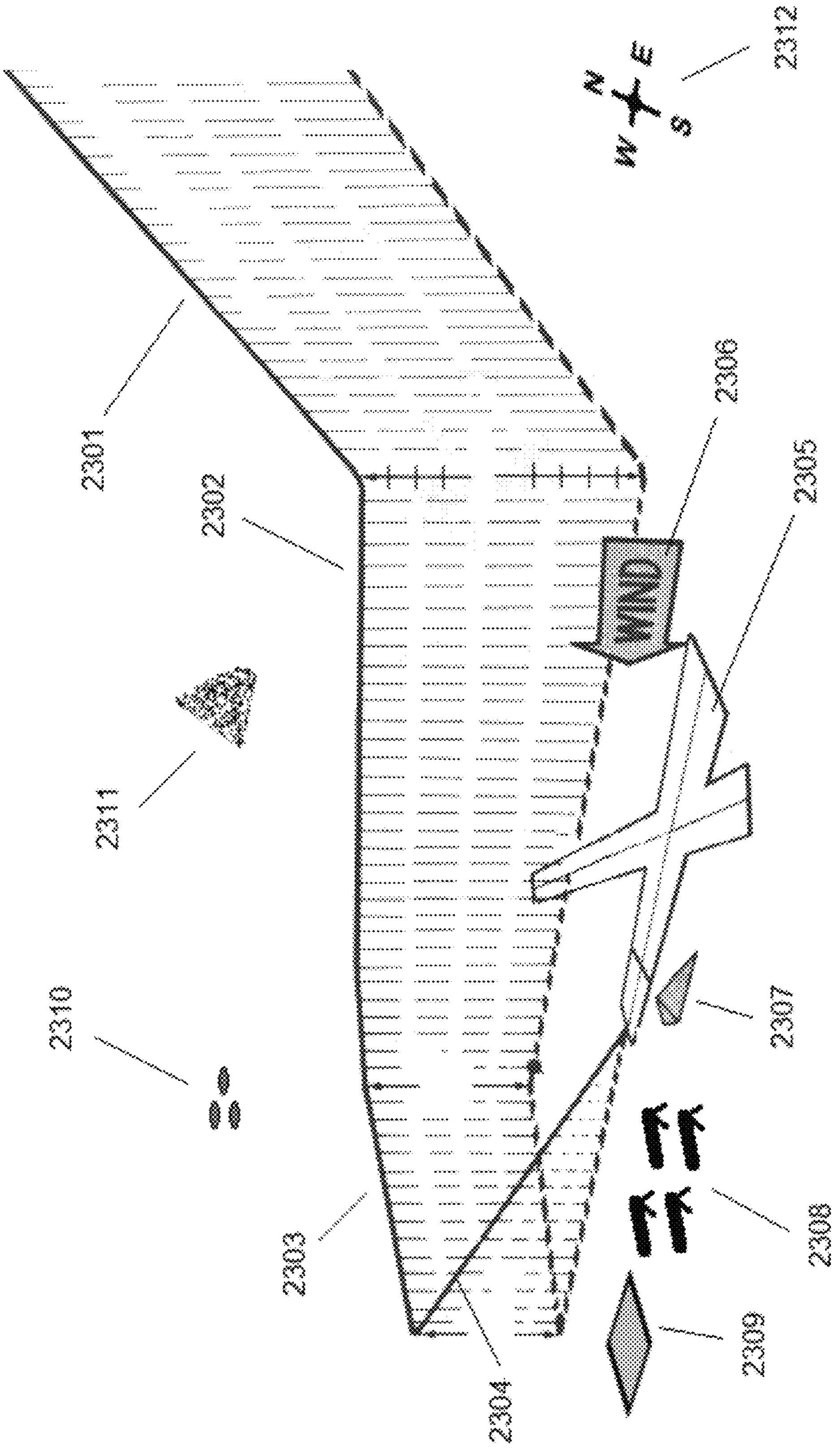
FIG. 23 depicts a control-tower view of a typical airfield area runway which view, and runway differ from that depicted in FIG. 22.

FIG. 23 depicts a control-tower view of a typical airfield area runway which view and runway differ from that depicted in FIG. 22. FIG. 23 is adapted from a COTS illustration. As seen in FIG. 23, 2301 is the entry leg of a traffic pattern. 2302 is the downwind leg. 2303 is the base leg. 2304 is the final approach leg. Runway 2305 courses generally east to west. 2306 is an arrow showing wind direction (generally westward). 2307 is a directional tetrahedron. A set of four drone catapults 2308 is used for launching skeining drones. 2309 is a launch pad for swarming drones. 2310 is a Sk-WING comprising three skeining drones. 2311 is a Sw-WING comprising a plurality of swarming drones. 2312 is a N-S-E-W directional indicator.

The runway catapult for skeins can be swiveled/aimable like an RQ-7 catapult, but more powerful.

FIG. 24 is a depiction of two airfield traffic patterns and respective abstractive diagrams thereof and is adapted from a COTS illustration. Orientation indicator 2400 shows N-S-E-W directional layout for each of two airfield traffic patterns, left-hand (L-H) traffic pattern 2401 and right-hand (R-H) traffic pattern 2402. Within each traffic pattern 2401 and 2402 are seven identification points 'A'-'G'. Point 'A' marks the beginning of an Entry Leg for a traffic pattern and may represent a calculated waypoint as described above with regard to FIG. 10. Point 'B' designates a region wherein an Entry Leg transitions to a Downward Leg. Point 'C' designates a Downward Leg. Point 'D' designates a region wherein a Downward Leg transitions to a Base Leg. Point 'E' designates a Base Leg. Point 'F' designates a region wherein a Base Leg transitions to Final Approach Leg. Point 'G' designates a Final Approach Leg which terminates near the beginning section of a runway.

Diagram 2403 represents a geometric abstraction of L-H traffic pattern 2401. Odd-numbered 180° arcs 2405-2415 each represent a horizontal field-of-view arc indicative of a pilot's visual sweep capability (port to/from starboard) during each respective leg of L-H traffic pattern 2401, and, correspondingly, the range of directions from which a hostile laser beam could menacingly strike the cockpit of an aircraft while the aircraft is flying the traffic pattern. Arcs 2405-2415 are two dimensional only, vertical dimensionality being ignored because a laser beam would be expected to emanate only from below an aircraft and never from a level at or above the aircraft. Similarly, diagram 2404 represents a geometric abstraction of R-H traffic pattern 2402. Even-numbered 180° arcs 2406-2416 each represent a horizontal field-of-view arc indicative of a pilot's visual sweep capability (port to/from starboard) during each respective leg of R-H traffic pattern 2402, and, correspondingly, the range of directions from which a hostile laser beam could menacingly strike the cockpit of an aircraft while the aircraft is inside the traffic pattern.

| Left Pattern: | Right Pattern: |
|---|---|
| A. 135°-315° | A. 45°-225° |
| B. 135°-315° | B. 45°-225° |
| C. 180°-0° | C. 0°-180° |
| D. 135°-315° | D. 45°-225° |
| E. 90°-270° | E. 90°-270° |

-continued

| Left Pattern: | Right Pattern: |
|---|---|
| F. 45°-225° | F. 135°-315° |
| G. 0°-180° | G. 180°-0° |

FIG. 25 is a partial view of the L-H traffic pattern area of FIG. 24 with additional elements described and is adapted from a COTS illustration. Legs 'A'-'G' (2501-2507) terminate at runway 2508, which runway 2508 terminates at area 2509. Orientation indicator 2510 shows the N-S-E-W directional layout of the traffic pattern area.

Six different Sw-WINGs 2511-2516 are shown as being deployed about the traffic pattern area depicted in FIG. 25. Each Sw-WING is either ready to launch from a ground-based launch pad, or is aloft. If aloft, the Sw-WING is either hovering in place (station keeping) or else flying in a loiter mode associated with its designated patrol pattern. For each Sw-WING 2511-2516, a designated patrol pattern is depicted as solid line segments extending from each of two directional sides (either N and S, or E and W) of each Sw-WING. In some cases, Sw-WING patrol patterns overlap in order to provide redundant coverage at the seams. The seam areas are shown as disposed about several anti-collision zones 2517-2521 which zones 2517-2521 are geofenced regions avoided by each of the two Sw-WINGs whose patrol patterns approach them. Different Sw-WING flight plans protect the aircraft during different stages of each of four separate stages of landing. Sw-WING 2511 protects the aircraft through the entry leg and the first half of the downwind leg. Sw-WING 2512 protects the aircraft for the second half of the downwind leg and turning through to the base leg. Sw-WING 2513 protects the aircraft through the first half of the base leg. Sw-WING 2514 protects the aircraft through the second half of the base leg and turning through to the final leg. Sw-WING 2515 protects the aircraft through the first half of the final leg. Sw-WING 2516 protects the aircraft through the second half of the final leg.

The overall WINGs choreography is driven by the Plot Point Zero (P-P-0) calculations.

1 (aircraft is entry-legged; Sw-W4, because Sw-W3 needs to patrol along base leg)
2 (Sw-W1 patrols alongside, Sw-W2 hovers in station-keep mode ahead of downwind aircraft)
3 (Sw-W2, hands off to Sw-W3, Sw-4 hovering in station-keep dead ahead of base-legged aircraft)
4 (Sw-4 patrols alongside final-approached aircraft)

```
(pseudocode for CCCL listening)
  CCCL_Listen_A( ) for report of suspected beam;
  ON report of suspected beam:
    CCCL_Listen_B( ) for report of suspected beam source location;
  ON report of suspected beam source location:
    { inform DGCL; }
    CALL(Sk-WINGs_Determination);
    CALL(Sw-WINGs_Determination);
  CCCL_Listen_C( ) for data continuously reported from Subject_Aircraft;
(pseudocode for CCCL active/engaged )
  listen for data from Subject_Aircraft;
  receive data from Subject_Aircraft;
  calculate PLOT POINT ZERO ( declare PP-0_Location = beginning of entry leg);
  based on altitude, airspeed, etc. of Subject_Aircraft at PP-0,
    { determine whether each Sk-WING can protect which segment(s), and when }
    { determine whether each Sw-WING can protect which segment(s), and when }
  { launch whichever Sk-WING will protect Subject_Aircraft along the first protectible
  segment }
  repeat for other Sk-WINGs, if any
  { launch whichever Sw-WING will protect Subject_Aircraft along the first protectible
  segment }
  repeat for other Sw-WING(s), if any
(pseudocode for left pattern template, based on FIG. 25)
```

-continued

```
ON reportage of lazing event:
  BEGIN Sk-WINGs Determination;
  Database_Lookup(Aircraft_Params);
  CALCULATE if Sk-WING beam interdiction possible given (Beam_Locale,
  Aircraft_Params);
  IF interdiction by one or more Sk-WINGs is possible:
  CCCL_Listen_D( ) determines whether interdiction by Sk-WING(s) is requested;
  IF interdiction by one or more Sk-WINGs is possible AND requested:
    {determine which Sk-WING to set first for interdiction, designate as Sk-
WING_1; }
  IF Sk-WING_1(patrolling) THEN CALCULATE Sk-WING_1_Intercept_Course;
    EXECUTE(Sk-WING_1_Plummet);
    EXECUTE(Sk-WING_1_Intercept);
  ELSE IF Sk-WING_1(grounded) THEN CALCULATE Sk-
WING_1_Intercept_Course;
    EXECUTE(Sk-WING_1_Launch( );
    EXECUTE(Sk-WING_1_Intercept);
  REPEAT determination for (if) other Sk-WINGs, designate as Sk-WING_2, Sk-
  WING_3, etc.
  BEGIN Sw-WINGs Determination;
  Database_Lookup(Aircraft_Params);
  CALCULATE if Sw-WING beam interdiction possible given (Beam_Locale,
  Aircraft_Params);
  IF interdiction by one or more Sw-WINGs is possible:
  CCCL_Listen_E( ) determines whether interdiction by Sw-WING(s) is
countermanded;
  IF interdiction by one or more Sw-WINGs is possible AND NOT countermanded:
    {determine which Sw-WING to set first for interdiction, designate as Sk-
WING_1; }
  IF Sw-WING_1(patrolling) THEN calculate Sw-WING_1_Intercept_Course;
    EXECUTE(Sw-WING_1_Intercept);
  ELSE IF Sw-WING_1(grounded) THEN calculate Sw-WING_1_Intercept_Course;
    EXECUTE(Sw-WING_1_Launch);
    EXECUTE(Sw-WING_1_Intercept);
  CALCULATE(Sw-WING_1_Loiter_Position_Flight_Plan);
    EXECUTE(Sw-WING_1_Loiter_Position_Flight_Plan);
  REPEAT determination for all other Sw-WINGs, designate as Sw-WING_2, Sw-
  WING_3, etc.
```

An example sequence:

(a) Launch Sk-WING_1. Sk-WING_1 flies a heading due west (270°) for 23.0 seconds and on same heading climbs to 330 feet AGL. On attaining desired altitude Sk-WING_1 dives on a heading of 90° and levels off at altitude 200 feet AGL at a speed of 150 mph to fly alongside subject aircraft.

(b) Launch Sw-WING_1. Sw-WING_1 flies a heading due north (0°) for 8.0 seconds and on same heading climbs to altitude 29.0 feet AGL. On attaining desired altitude Sw-WING_1 holds station for 7 seconds, then drifts on a heading of 90° at a speed of 12.0 mph until subject aircraft lands.

Figure 26:
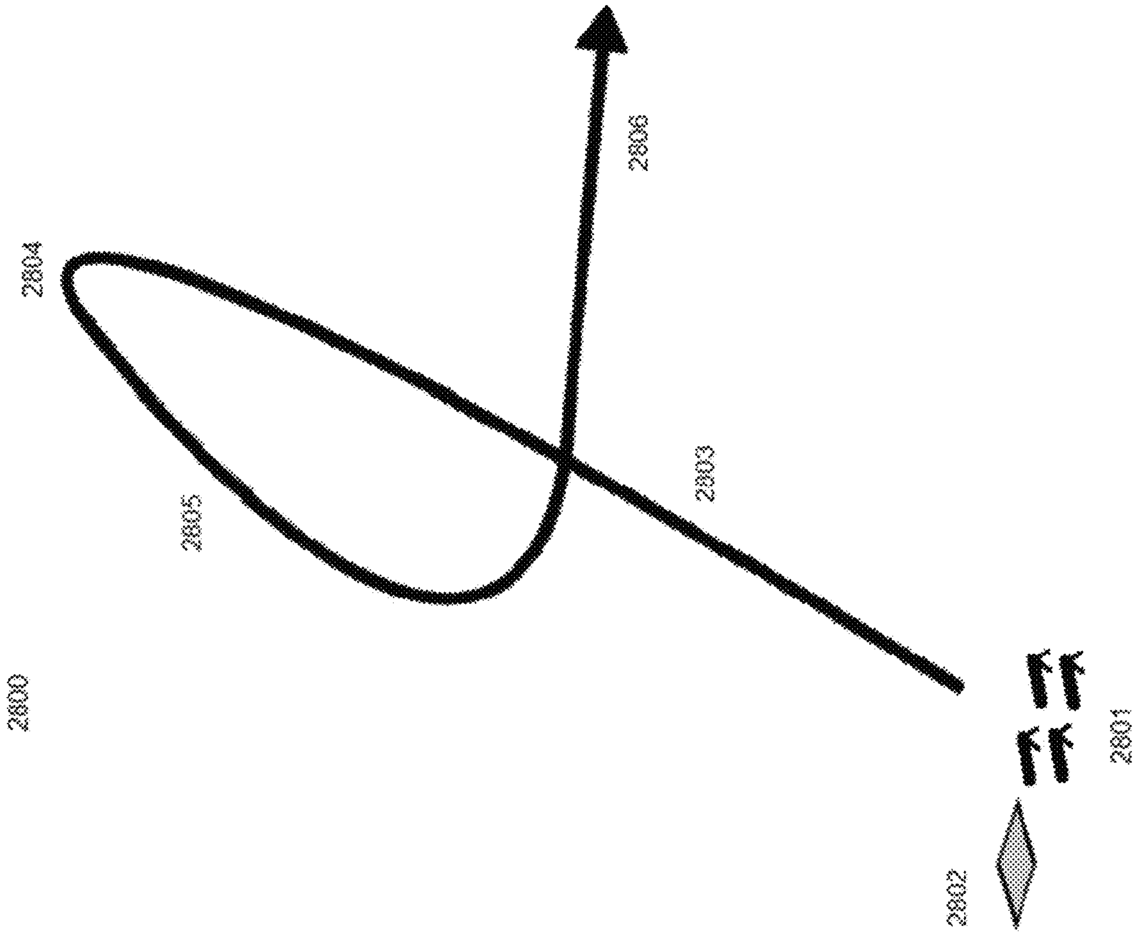
FIG. 26 depicts a typical initial flight path of a rapidly deployed catapult-launched Sk-WING.

FIG. 26 depicts a typical initial flight path of a rapidly deployed catapult-launched Sk-WING. Within airspace 2800, Sk-WING launch catapults 2801 are located near Sw-WING launch pad 2802. An Sk-WING (not shown) launched from launch catapults 2801 attains an initial climb 2803 and continues climbing to apex location 2804 whence the Sk-WING initiates a controlled dive 2805 in order to achieve a CCCL-designated speed and bearing commensurate with intercept path 2806.

Integration with existing systems. Although the invention is capable of achieving its stated purpose, particularly with regard to subject aircraft protectable following an unprotected strike on an initial aircraft, and is designed to facilitate compliance with certain applicable current FAA rules and/or FAA guidelines, it is surmised that extensive testing will be required as a prerequisite to obtaining regulatory approval. For this reason, certain features of the invention (e.g., whether the pilot of a subject aircraft can terminate a WING mission) are herein purposely left unreduced to practice.

It should be appreciated that, while the particular context for which the invention is implemented in this illustrative example is civilian airfields and airports, the dual-drone system as deployed in the manner described herein can be used in numerous other contexts. For example, a helipad might want to provide protection against handheld laser attacks versus helicopter pilots.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A system for protecting an inflight aircraft against a laser beam attack into the aircraft's flight path during approach to and takeoff from a landing area an airfield, comprising:

at least one skeining drone adapted to fly an interference pattern parallel to the aircraft;

a plurality of swarming drones, the plurality adapted to fly toward a source of the laser beam and loiter in a formation between the source and the aircraft;

a sensor configured means for detecting the to detect a laser beam within the flight path;

control logic a means which, when executed by a processor, performs steps for deriving, for transmitting, responsive to the sensor detecting the laser beam, laser beam interceptive flight path instructions;

transmitting the instructions to the at least one skeining drone and to the plurality of swarming drones; and directing means for launching the at least one skeining drone and the plurality of swarming drones to follow flight paths according to the instructions to provide redundant blockage of the laser beam wherein redundant blockage of the laser beam means that at least two drones are interposed between the aircraft and the laser beam.

2. The system of claim 1, wherein the at least one skeining drone is capable of a top airspeed of approximately a landing speed of a jet airliner.

3. The system of claim 1, wherein the at least one skeining drone has an oloid-shaped frame.

4. The system of claim 1, wherein each swarming drone is capable of a top speed of approximately 70 KAS.

5. The system of claim 1, wherein at least one of the swarming drones is a hexarotor type and is coaxial with each of three bottom-side propellers being offset and counterrotating as against three topside propellers.

6. The system of claim 1, further comprising a conversion module for converting data representing detection of the laser beam to GPS coordinates for beam blocking.

7. The system of claim 6, wherein the laser beam interceptive flight path instructions are derived from the GPS coordinates.

8. The system of claim 1, wherein the laser beam interceptive flight path instructions instruct the at least one skeining drone to fly parallel to the aircraft.

9. The system of claim 1, wherein the laser beam interceptive flight path instructions instruct the plurality of swarming drones to loiter in a redundant blocking formation near the source of the laser beam.

10. The system of claim 1, wherein the means for detecting the laser beam includes at least one reconnaissance drone.

11. The system of claim 1, wherein the sensor detects the laser beam by comparing a machine-visual field to a mosaic map of the airfield area.

* * * * *